(12) United States Patent
Coe

(10) Patent No.: US 11,753,530 B2
(45) Date of Patent: Sep. 12, 2023

(54) INTER-PENETRATING ELASTOMER NETWORK DERIVED FROM GROUND TIRE RUBBER PARTICLES

(71) Applicant: William B. Coe, Wrightwood, CA (US)

(72) Inventor: William B. Coe, Wrightwood, CA (US)

(*) Notice: Subject to any disclaimer, the term of this patent is extended or adjusted under 35 U.S.C. 154(b) by 115 days.

(21) Appl. No.: 17/135,775

(22) Filed: Dec. 28, 2020

(65) Prior Publication Data

US 2021/0115230 A1 Apr. 22, 2021

Related U.S. Application Data

(60) Continuation of application No. 17/002,659, filed on Aug. 25, 2020, now Pat. No. 10,920,047, which is a division of application No. 16/168,518, filed on Oct. 23, 2018, now Pat. No. 10,800,906, which is a continuation-in-part of application No. 16/053,708, filed on Aug. 2, 2018, now Pat. No. 10,626,275, and a continuation-in-part of application No. PCT/US2018/045061, filed on Aug. 2, 2018, said application No. 16/168,518 is a continuation-in-part of application No. PCT/US2018/028656, filed on Apr. 20, 2018, said application No. PCT/US2018/045061 is a continuation-in-part of application No. PCT/US2018/028656, filed on Apr. 20, 2018, said application No. 16/053,708 is a continuation-in-part of application No. PCT/US2018/028656, filed on Apr. 20, 2018.

(60) Provisional application No. 62/703,366, filed on Jul. 25, 2018, provisional application No. 62/621,465, filed on Jan. 24, 2018, provisional application No. 62/613,744, filed on Jan. 4, 2018, provisional application No. 62/569,374, filed on Oct. 6, 2017, provisional application No. 62/541,610, filed on Aug. 4, 2017, provisional application No. 62/489,878, filed on Apr. 25, 2017.

(51) Int. Cl.

| | | |
|---|---|---|
| C08L 19/00 | (2006.01) |
| C08L 9/06 | (2006.01) |
| C08L 15/00 | (2006.01) |
| C08L 15/02 | (2006.01) |
| C08L 23/22 | (2006.01) |
| C08L 17/00 | (2006.01) |
| C08L 11/00 | (2006.01) |
| C08J 11/26 | (2006.01) |
| C08J 5/18 | (2006.01) |
| C08J 3/24 | (2006.01) |
| C08K 5/56 | (2006.01) |
| B60C 1/00 | (2006.01) |
| C08F 236/14 | (2006.01) |
| C08F 210/12 | (2006.01) |
| B32B 25/00 | (2006.01) |
| C08J 11/00 | (2006.01) |
| C08L 7/00 | (2006.01) |

(52) U.S. Cl.
CPC ............ *C08L 19/003* (2013.01); *B32B 25/00* (2013.01); *B60C 1/0008* (2013.01); *B60C 1/0016* (2013.01); *B60C 1/0025* (2013.01); *C08F 210/12* (2013.01); *C08F 236/14* (2013.01); *C08J 3/246* (2013.01); *C08J 5/18* (2013.01); *C08J 11/00* (2013.01); *C08J 11/26* (2013.01); *C08K 5/56* (2013.01); *C08L 9/06* (2013.01); *C08L 11/00* (2013.01); *C08L 15/005* (2013.01); *C08L 15/02* (2013.01); *C08L 17/00* (2013.01); *C08L 23/22* (2013.01); *C08J 2307/00* (2013.01); *C08J 2309/00* (2013.01); *C08J 2309/06* (2013.01); *C08J 2317/00* (2013.01); *C08L 7/00* (2013.01); *C08L 2205/22* (2013.01)

(58) Field of Classification Search
CPC .. C08L 19/00; C08L 9/06; C08L 15/00; C08L 15/02; C08L 11/00; C08K 5/56; C08J 11/26; C08J 3/24; B32B 25/00; B60C 1/00
USPC ......................................... 524/573
See application file for complete search history.

(56) References Cited

U.S. PATENT DOCUMENTS

| | | | |
|---|---|---|---|
| 4,458,095 A | 7/1984 | Wingfield et al. |
| 5,742,943 A | 4/1998 | Chen |
| 6,169,128 B1 | 1/2001 | Vivaudou |
| 6,268,427 B1 * | 7/2001 | Wang .................... C08L 51/006 525/74 |
| 6,313,220 B1 | 10/2001 | Materne |
| 6,558,773 B2 | 5/2003 | Edson |

(Continued)

FOREIGN PATENT DOCUMENTS

| | | |
|---|---|---|
| CN | 1528815 | 9/2004 |
| CN | 101218287 | 7/2008 |

(Continued)

OTHER PUBLICATIONS

Anthony, 2006, Technology to separate rubber crumb from fiber, Applied Engineering in Agriculture, 22(4):563-570.

(Continued)

*Primary Examiner* — Deve V Hall
(74) *Attorney, Agent, or Firm* — Knobbe Martens Olson & Bear, LLP

(57) ABSTRACT

Crumb rubber obtained from recycled tires is subjected to an interlinked substitution process. The process utilizes a reactive component that interferes with sulfur bonds. The resulting treated rubber exhibits properties similar to those of the virgin composite rubber structure prior to being granulated, and is suitable for use in fabricating new tires, engineered rubber articles, and asphalt rubber for use in waterproofing and paving applications.

18 Claims, 31 Drawing Sheets

(56) References Cited

U.S. PATENT DOCUMENTS

| | | |
|---|---|---|
| 6,703,440 B2 | 3/2004 | Edson |
| 7,425,584 B2 | 9/2008 | McFarlane |
| 8,808,445 B2 | 8/2014 | Coe |
| 8,926,742 B2 | 1/2015 | Coe |
| 8,992,118 B2 | 3/2015 | Coe |
| 9,057,163 B1 | 6/2015 | Coe |
| 9,074,328 B1 | 7/2015 | Coe |
| 9,127,413 B2 | 9/2015 | Coe |
| 9,169,606 B2 | 10/2015 | Coe |
| 9,347,187 B2 | 5/2016 | Coe |
| 9,481,967 B2 | 11/2016 | Coe |
| 9,551,114 B2 | 1/2017 | Coe |
| 9,551,117 B2 | 1/2017 | Coe |
| 9,624,625 B2 | 4/2017 | Coe |
| 9,637,870 B1 | 5/2017 | Coe |
| 10,626,275 B2 | 4/2020 | Coe |
| 10,662,320 B2 | 5/2020 | Coe |
| 10,711,123 B2 | 7/2020 | Coe |
| 10,800,906 B2 | 10/2020 | Coe |
| 10,920,047 B2 | 2/2021 | Coe |
| 10,982,096 B2 | 4/2021 | Coe |
| 11,286,376 B2 | 3/2022 | Coe |
| 2002/0077373 A1 | 6/2002 | Hudson |
| 2005/0067122 A1 | 3/2005 | Kasem et al. |
| 2005/0279965 A1 | 12/2005 | Arrison et al. |
| 2006/0116431 A1 | 6/2006 | McFarlane |
| 2010/0048752 A1 | 2/2010 | Vignola et al. |
| 2010/0102279 A1 | 4/2010 | Kim et al. |
| 2010/0307380 A1 | 12/2010 | Fader |
| 2010/0314162 A1 | 12/2010 | Gardner |
| 2012/0048446 A1 | 3/2012 | Kaszaz |
| 2012/0189819 A1 | 7/2012 | Chang |
| 2015/0080504 A1 | 3/2015 | Coe |
| 2015/0210839 A1 | 7/2015 | Mendoza |
| 2015/0247020 A1 | 9/2015 | Sekhar |
| 2016/0096960 A1 | 4/2016 | Pillai et al. |
| 2016/0152805 A1 | 6/2016 | Jasiunas et al. |
| 2017/0009044 A1 | 1/2017 | Sekhar |
| 2019/0017233 A1 | 1/2019 | Coe |
| 2019/0033189 A1 | 1/2019 | Coe et al. |
| 2022/0049101 A1 | 2/2022 | Coe |

FOREIGN PATENT DOCUMENTS

| | | |
|---|---|---|
| CN | 101759869 | 6/2010 |
| CN | 102108018 | 6/2011 |
| CN | 104326907 | 2/2015 |
| CN | 105714638 | 6/2016 |
| CN | 105924815 | 9/2016 |
| DE | 102010031892 | 1/2012 |
| EP | 1 142 944 | 10/2001 |
| EP | 1 435 372 | 7/2004 |
| GB | 2350839 | 12/2000 |
| JP | 50-45070 | 12/1975 |
| JP | 64-22962 | 1/1989 |
| JP | 11-172039 | 6/1999 |
| JP | 2000-344936 | 12/2000 |
| JP | 2018-095777 | 6/2018 |
| KR | 10-1442216 | 9/2014 |
| RU | 2383562 | 3/2010 |
| RU | 2580130 C2 | 4/2016 |
| RU | 2611492 | 2/2017 |
| WO | WO 04/074594 | 9/2004 |
| WO | WO 11/036670 | 3/2011 |
| WO | WO 11/066249 | 6/2011 |
| WO | WO 12/007949 | 1/2012 |
| WO | WO 13/181378 | 12/2014 |
| WO | WO 15/117862 | 8/2015 |

OTHER PUBLICATIONS

Roland, Jan. 2013, Interpenetrating Polymer Networks (IPN): Structure and Mechanical Behavior, in Encyclopedia of Polymeric Nanomaterials, Berlin, Heidelberg, Springer Berlin Heidelberg, pp. 1-9; doi:10.1007/978-3-642-36199-9_91-1, ISBN 978-3-642-36199-9.

* cited by examiner

ELEMENT ONE: An electro-mechanical reactor environment (EMRE) which provides an effective "Phase Space" environment to: 1) unpack the GTRP, re-set the vulcanization pre-cursor for 2) subsequent sulfidic bridge realignment, 3) with minimal alteration to the native, elastomer-filler matrix.

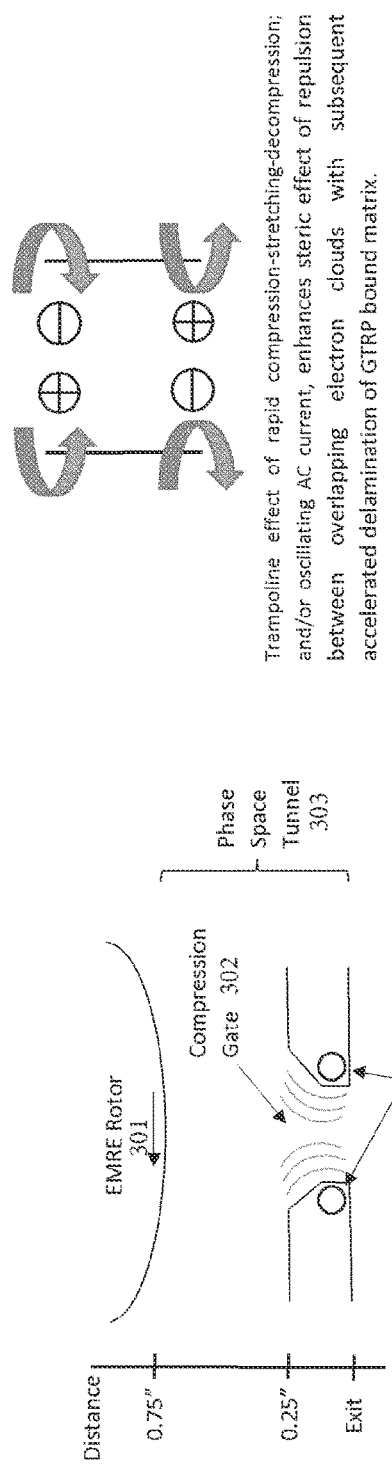

| COMPONENT | METHOD OF CONTROL | ABBREV. | FIRST ORDER RESULT | | DATA GATHERING HARDWARE |
|---|---|---|---|---|---|
| RUBBER-TO-WATER DENSITY | PRE-BATCH RECIRCULATION RESERVOIR MIX | R:W | HIGHER:<br>LOWER: | INCREASE PHASE SPACE TUNNEL PARTICLE COLLISION<br>LOWER REACTOR YIELD; MORE PRECISE END PRODUCT/ENERGY | BATCH MASS:VOL PROGRAMMABLE ELEMENT VISCOSITY DELTA OUPUT |
| CHEMICAL (OMC) SEQUENCE | INTERMITTANT BULK 'DROPS' OR METERED | OMC ADDED | INTER-MITTANT:<br>METERED: | FASTER BATCH TIMES W/ LARGER FINAL PARTICLE SIZE<br>EFFICIENT-TARGETED OMC METATHESIS | METERING PUMP CONTROLLED BY APP |
| SLURRY TEMPERATURE | RECIRCULATION RESERVOIR JACKET TO HEAT &/or COOL | TEMP. | HIGHER:<br>LOWER: | INCREASE OMC COORDINATION COMPLEX FUNCTION; PLUS PENETRATION OF AQUEOUS MEDIUM TO PARTICLE CORE<br>DEFER PHASE SPACE PARTICEL MANIPULATION TO CAVITATION EFFECT & PHOTON BLOCKADE | MULTI-POINT SENSORS TO CORRELATE W/ OTHER SENSOR INPUT FOR INTEGRATED OPTIMIZATION |
| SLURRY PRESSURE ACHIEVED WHERE SLURRY PUMPED THROUGH (PCMR) IN-SERIES | PARALLEL CONTINUOUS FLOW MICRO-SYNTHESIS REACTOR 2ND STAGE SERPENTINE PIPE MODULE WHERE SLURRY TEMPERATURE: PRESSURE MANIPULATE VAPOR/LIQUID PHASE OCILLATIONS | VAPOR LIQUID OCCILATI ON | HIGHER:<br>LOWER: | AUGMENTS PHOTON BLOCKADE PRESERVES ENTROPY LOSS W/ MORE PARTICLE SIZE REDUCTION/UNIT OF INPUT ENERGY<br>DEFERS PHASE SPACE PARTICLE MANIPULATION TO ELECTROMAGNEICS OF DUAL ELECTRODE ELEMENT IN STATOR SLOT | TEMPERATURE & PRESSURE SENSORS PLUS IRIS VALVE CONTROLS TO SET NUMBER OF PRESSURE GRADIENT CHANGES DURING PCMR PASSAGE TIED TO MASTER PROGRAM |
| POST REACTOR PARTICLE DE-WATERING SELECTION | FILTER-PRESS THEN DEHYDRATE OR FULL DEHYDRATION | OMC RESIDUE | HIGHER:<br>LOWER: | REMAINING REACTIVE OMC ASSISTS IN HIGH SHEAR COMPOUNDING INTO MACRO-STRUCTURE BY DRY METATHESIS OF 'ORPHAN' BONDS<br>REDUCES OMC DEMAND IN SUBSEQUENT BATCH; FASTER POST REACTOR PROCESS TIME | MONITOR X LINK DENSITY; TENSILE STRENGTH AND RESILIENCE PROPERTIES OF COMPOUNDED RUBBER MACRO-STRUCTURE THEN CORRELATE FOR EFFICACY |
| PARTICLE SIZE REDUCTION; AND RATE OF REDUCTION | USE ALL OTHER SYSTEM VARIABLES IN BOTH SLURRY CONTROL AND EMRE CONTROLS | RATE OF REDUCTIO N | FASTER:<br>SLOWER: | SHORTER BATCH INTERVALS WITH ENERGY ECONOMIES W/O LOSS OF FINAL PURPOSE OF PROCESS<br>REDUCED POST-PROCESSING OF DRY, REACTOR MODIFIED GTRP | SAME AS V. SAMPLING, DURING BATCH W/ PARTICLE SIZE ANALYZER AND PHYSICAL SMEAR TEST OVER 5μ GRATING TO DETERMINE OUTER DIMENSION AVERAGE AND PARTICLE CORE RESILIENCY |

FIG. 4C

| COMPONENT | METHOD OF CONTROL | ABBREV. | | | FIRST ORDER RESULT | DATA GATHERING HARDWARE |
|---|---|---|---|---|---|---|
| SPEED ROTOR TIP RPM | VARIABLE FREQUENCY DRIVE | ROTOR TIP SPEED | FASTER: | SLOWER: | MORE DISTORTION REDUCED CAVITATION EFFECT | HARD WIRED, PROGRAM FREQ, RPM, AMP, VOLT: TO MOTOR |
| ROTOR TIP-TO-STATOR DISTANCE | MECHANICALLY ESTABLISHED PRIOR TO RUNNING | GAP | LARGER: | SMALLER: | INCREASE MIXING INGREDIENT & REACTION TIME MAINTAIN PARTICLE VELOCITY & MAXIMIZE CAVITATION EFFECT | CHART RESULT FOR DIFFERENT GAPS VS FINISHED PRODUCT AS DATA ENTRY POINT - PRGM |
| STATOR GAP APERATURE SHAPE & AREA | ADJUSTABLE, CONCENTRIC DUAL SHELL PLATES SET-UP BEFORE RUNNING OR ADJUSTABLE ON-THE-FLY | APERATURE | GREATER: | LESSER: | ACCOMMODATE SMOOTH FLOW OF LARGE PARTICLE AT START OF REACTOR RUN IMPROVE CAVITATION EFFECT OF SMALLER PARTICLE LATE IN RUN | PRE-BATCH FUNCTION TO BE DETERMINED AND ENTERED AS A PROGRAMMABLE ELEMENT/APP |
| RECIRCULATION RESERVOIR VOLUME | PRE-SET VOLUME FOR SINGLE OR MULTI-STAGE PROCESS TARGET(S) | VOLUME | LARGER: | SMALLER: | IMPROVED DIELECTRIC RELAXATION; UNIFORM GROUND STATE HIGHER PHASE SPACE TUNNEL ENERGY RETENTION | PRE-BATCH FUNCTION; CALCULATE AS PROGRAM ELEMENT APP |
| STATOR APERATURE PASSAGE WAY EMBEDDED, OVAL ELECTRODE GATE WIRED TO HIGH VOLTAGE AC SOURCE | POWER CONTROL MODULE WITH VARIABLE: FREQUENCY, VOLTAGE, AMPERAGE CONTROLS (V) (A) (f) = 3 VARIABLES | (V) (A) (f) | VARIABLE INCREASE | VARIABLE DECREASE | RAPID PHOTON BLOCKADE INFILL & CAPACITY TO TRIGGER PHASE CHANGE(S) ENHANCE PARTICLE CORE ELECTRON CLOUD REPLUSION; INNER DELAMINATION | VOLT AMP FREQUENCY METERS; TO BE INTEGRATED INTO PROGRAMMABLE APP |

FIG. 4D

ELEMENT FIVE. Chemotactic sulfidic-bridge-tether-effect (SBTE)

⊡ Pendant vulcanizate precursor @ predominant methyl carbocation (originally forms @ ~140°C)

△ Completed vulcanization @ allylic carbocation (subsequently forms @ ~160°C)

CARBOCATION STABILITY

Most Stable ⟶ Least Stable

ELEMENT SIX: Chemical Reaction Products and Timeline

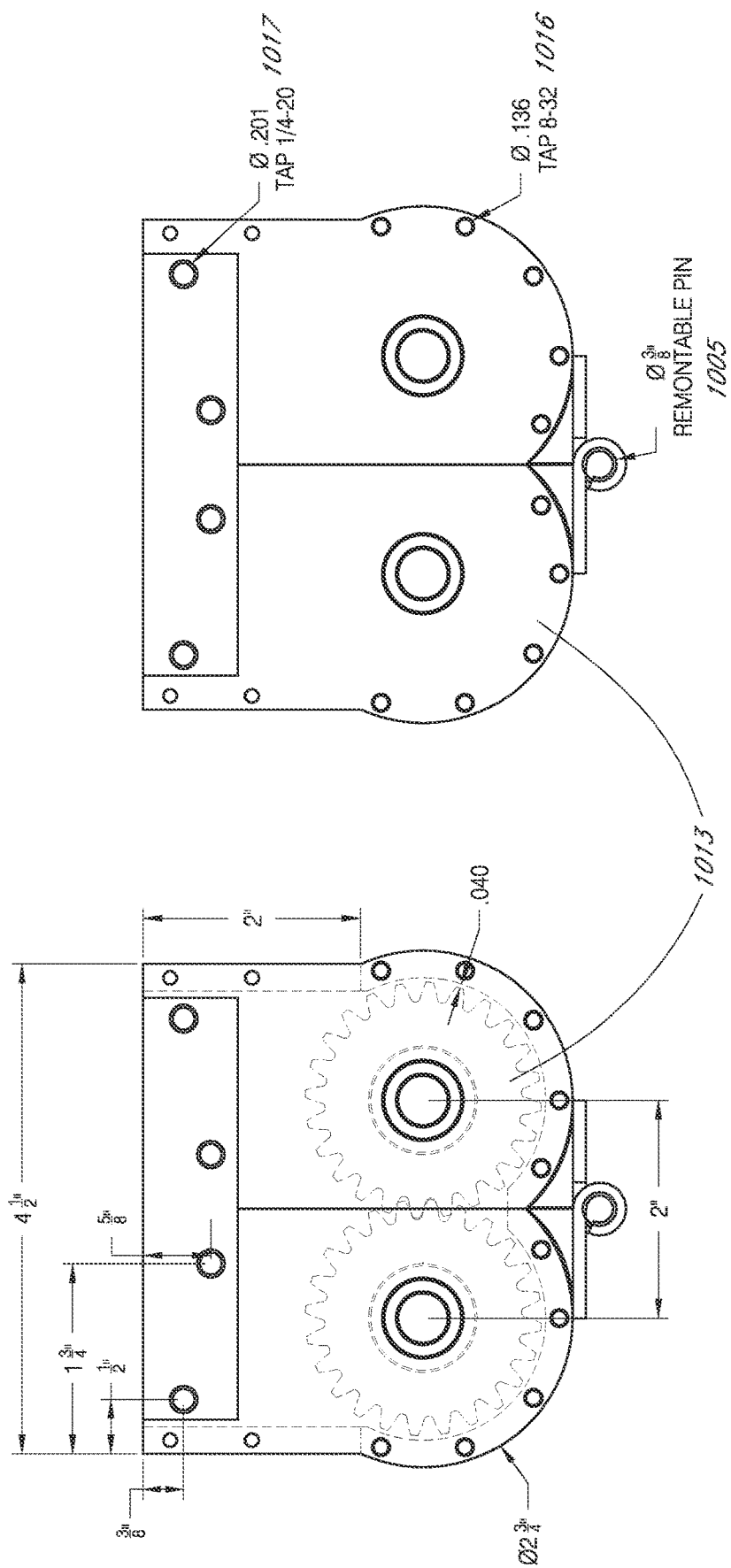

SAN JOAQUIN REFINING CO., INC

CERTIFICATE OF ANALYSIS
LABORATORY REPORT - ASPHALT PRODUCTS
Performance Graded Asphalt Binder per CALTRANS Specification

PRODUCT: PAVING ASPHALT PG 64-10     PRODUCT: 2185
AASHTO SPECIFICATION GRADE

| PROPERTY | Test Method | PG 64-10 SPEC | PG 64-10 TEST |
|---|---|---|---|
| ORIGINAL BINDER | | | |
| Flash Point, Minimum C | T-48 | 230 | 296 |
| VOC's, % | ASTM D402 | <0.5%v | 0.0 |
| Solubility, Minimum % | T-44 | 99 | 99.8 |
| Viscosity at 135 C, Maximum, Pa's | T-316 | 3.0 | 0.256 |
| Dynamic Shear, | T-315 | | |
|   Test Temp. at 10 rad/s, C | | 64 | 64 |
|   Minimum G*/sin(delta), kPa | | 1.00 | 1.406 |
|   Phase Angle, δ (*) | | | 89.5 |
| RTFO Test Aged Binder | | | |
| RTFO Test | T-240 | | |
|   Mass Loss, Maximum, % | | 1.00 | -0.214 |
| Dynamic Shear, | T-315 | | |
|   Test Temp. at 10 rad/s, C | | 64 | 64 |
|   Minimum G*/sin(delta), kPa | | 2.2 | 2.399 |
|   Phase Angle, δ (*) | | | 88.6 |
| Ductility at 25 C Minimum, cm | T-51 | 75 | 150 |
| PAV Aging, Temperature, C | R-28 | 100 | 100 |
| RTFO Test and PAV Aged Binder | | | |
| Dynamic Shear, | T-315 | | |
|   Test Temp. at 10 rad/s, C | | 31 | 31 |
|   Maximum, G*sin(delta), kPa | | 5000 | 3440 |
|   Phase Angle, δ (*) | | | 66.5 |
| Bending Beam, Creep Stiffness, | T-313 | | |
|   Test Temperature, C | | 0 | 0 |
|   Maximum S-value, Mpa | Max | 300 | 138 |
|   Minimum M-value | Min | 0.300 | 0.468 |

Tank No.: 20004    Carrier:    Quantity: (Gal) ____ (Tons) ____
Batch No: 170523 Truck No.: API Gravity @ 60F: 6.3 Specific Gravity @ 60 F: 1.0268
Buyer: ____ Loading Temp, F: ____ Shipment Date: ____
We hereby certify that the above determinations were performed in accordance with AASHTO, ASTM or other applicable test methods and that the product designated hereon conforms to the Caltrans specification for the product indicated: PG 64-10
    DATE: 5/23/2017      TESTER: Don Conner

FIG. 13

|  | AASHTO Test Method | SJR PG 64-10 Base | PTR PG 64-10 | | Specification |
|---|---|---|---|---|---|
| Specific Gravity, 60°F (15.6°C) | T228 | 1.026 | 1.022 | | Report |
| Rotational Viscosity, 135°C Pa*s | T316 | 0.244 | 0.378 | | 3.0 Max. |
| Flash, COC, °C | T48 | 294 | 290 | | 230 Min. |
| Solubility in Trichloroethylene, % | T44 | 99.9 | 99.2 | | 99.0 Min. |
| Dynamic Shear Rheometer, °C | T315 | 64 | 58 | 64 | |
| G*, kPa | | 1.38 | 1.44 | 0.75 | |
| Phase Angle, δ, ° | | 89.6 | 74.4 | 71.0 | |
| G*/Sin δ, kPa | | 1.38 | 1.50 | 0.79 | 1.00-2.00 |
| Pass/Fail Temperature, °C | | - | 61.8 | | |
| RTFO-Aged | T240 | | | | |
| Mass Loss, w% | T240 | 0.196 | 0.254 | | 1.0 Max. |
| Dynamic Shear Rheometer, °C | T315 | 64 | 58 | 64 | |
| G*, kPa | | 2.22 | 2.26 | 1.02 | |
| Phase Angle, δ, ° | | 89.0 | 79.3 | 79.8 | |
| G*/Sin δ, kPa | | 2.22 | 2.30 | 1.04 | 2.20 Min. |
| Pass/Fail Temperature, °C | | - | 58.5 | | |
| Ductility, 25°C, cm | T51 | 150+ | 150+ | | 75 Min. |
| Elastic Recovery, 25°C, % | T301 | - | 65.0 | | 75.0 Min. |
| PAV-Aged, °C | R28 | 100 | 100 | | |
| Dynamic Shear Rheometer, °C | T315 | 31 | 22 | 19 | |
| G*, kPa | | 4492 | 3974 | 6994 | |
| Phase Angle, δ, ° | | 65.9 | 62.8 | 58.7 | |
| G*Sin δ, kPa | | 4100 | 3535 | 5976 | 5000 Max. |
| Pass/Fail Temperature, °C | | - | 20.0 | | |
| Bending Beam Rheometer, °C | T313 | 0 | -12 | -18 | |
| Stiffness, MPa | | 151 | 233 | 505 | 300 Max. |
| Pass/Fail Temperature, °C | | - | -13.5 | | |
| m-value | | 0.474 | 0.383 | 0.271 | 0.300 Min. |
| Pass/Fail Temperature, °C | | - | -16.4 | | |
| | | | | | |
| PG Grade | | - | 58-22 | | |

FIG. 14A

|  | AASHTO Test Method | SJR PG 64-10 Base | PTR PG 64-10 | |
|---|---|---|---|---|
| Multiple Stress Creep Recovery, °C | T350 | 64 | 58 | 64 |
| Recovery @ 0.1 kPa, % |  | -0.068 | 84.59 | 91.29 |
| Recovery @ 3.2 kPa, % |  | -1.274 | 35.69 | 19.97 |
| Difference in Recovery, % |  | -1782.9 | 57.80 | 78.13 |
| Jnr @ 0.1 kPa, 1/kPa |  | 4.689 | 0.542 | 0.577 |
| Jnr @ 3.2 kPa, 1/kPa |  | 4.842 | 2.478 | 6.334 |
| Difference in Jnr, % |  | 3.256 | 357.5 | 997.9 |

FIG. 14B

|  | AASHTO Test Method | Prism PG 64-10 | |
|---|---|---|---|
|  |  | Top | Bottom |
| Dynamic Shear Rheometer, °C | T315 | 58 | 58 |
| G*, kPa |  | 1.50 | 1.87 |
| Phase Angle, δ, ° |  | 74.3 | 75.8 |
| G*/Sin δ, kPa |  | 1.56 | 1.93 |

Aromatic Process Oils Product Data Sheet

| Typical Properties | ASTM Method | RAFFEX® | | | |
|---|---|---|---|---|---|
| | | 90 | 100 | 120 | 200 |
| Viscosity, SUS @ 100F | D2161 | 385.2 | 6526 | 12400 | 69960 |
| Viscosity, SUS @ 210F | D2161 | 81.9 | 103 | 120 | 210 |
| Viscosity, cSt @ 40C | D445 | 662 | 1108 | 2036 | 10500 |
| Viscosity, cSt @ 100C | D445 | 15.34 | 20.15 | 23.77 | 42.00 |
| API Gravity | D287 | 10.9 | 10.4 | 9.5 | 6.1 |
| Specific Gravity @ 60F | D1250 | 0.9937 | 0.9972 | 1.0035 | 1.0283 |
| Density, lb/gal @ 60F | D1250 | 8.276 | 8.305 | 8.358 | 8.565 |
| Color | D1500 | D8.0 | D8.0 | D8.0 | D8.0 |
| Flash, COC, F | D92 | 410 | 415 | 420 | 450 |
| Pour Point, F | D97 | 45 | 49 | 60 | 85 |
| Aniline Point, F | D611 | 99 | 92 | 88 | 80 |
| Refractive Index @ 20C | D1218 | 1.5535 | 1.5624 | 1.5660 | 1.5883 |
| Neut. No., mg KOH/g | D974 | 5.5 | 5.3 | 7.0 | 7.0 |
| Sulfur, w% | D2622 | 1.11 | 1.11 | 1.12 | 1.30 |
| Clay-Gel Analysis, w% | D2007 | | | | |
|     Asphaltenes | | 0 | 0 | 0 | 0 |
|     Polar Compounds | | 17 | 23 | 21 | 28 |
|     Aromatics | | 65 | 55 | 65 | 62 |
|     Saturates | | 18 | 22 | 14 | 10 |
| Carbon-Type Analysis, % | D2140 | | | | |
|     Ca | | 41 | 37 | 42 | 47 |
|     Cn | | 38 | 32 | 36 | 22 |
|     Cp | | 21 | 31 | 22 | 31 |

FIG. 19

Naphthenic Lube/Process Oils Product Data Sheet

| Typical Properties | ASTM Method | RAFFEX® | | | |
|---|---|---|---|---|---|
| | | 200L | 750L | 1200L | 2000L |
| Viscosity, SUS @ 100F | D2161 | 199 | 876 | 1445 | 2034 |
| Viscosity, SUS @ 210F | D2161 | 43.1 | 63.4 | 75.3 | 83.8 |
| Viscosity, cSt @ 40C | D445 | 38.13 | 162.1 | 263.80 | 366.4 |
| Viscosity, cSt @ 100C | D445 | 5.18 | 10.81 | 13.84 | 15.99 |
| API Gravity | D287 | 23.9 | 21.2 | 21.0 | 18.9 |
| Specific Gravity @ 60F | D1250 | 0.9106 | 0.9267 | 0.9279 | 0.9408 |
| Density, lb/gal @ 60F | D1250 | 7.582 | 7.717 | 7.727 | 7.835 |
| Color | D1500 | 2.5 | 3.0 | 3.5 | L4.5 |
| Flash, COC, F | D92 | 355 | 390 | 415 | 420 |
| Pour Point, F | D97 | -20 | 5 | 15 | 30 |
| Aniline Point, F | D611 | 176 | 180 | 190 | 177 |
| Refractive Index @ 20C | D1218 | 1.4957 | 1.5050 | 1.5049 | 1.5113 |
| Neut. No., mg KOH/g | D974 | 0.13 | 0.19 | 0.43 | 0.56 |
| Sulfur, w% | D2622 | | 0.69 | 0.78 | 0.87 |
| Clay-Gel Analysis, w% | D2007 | | | | |
|     Asphaltenes | | 0 | 0 | 0 | 0 |
|     Polar Compounds | | 4 | 3 | 3 | 6 |
|     Aromatics | | 28 | 37 | 41 | 45 |
|     Saturates | | 68 | 60 | 56 | 49 |
| Carbon-Type Analysis, % | D2140 | | | | |
|     Ca | | 7 | 10 | 8 | 12 |
|     Cn | | 50 | 46 | 48 | 49 |
|     Cp | | 43 | 44 | 44 | 39 |

INTER-PENETRATING ELASTOMER NETWORK DERIVED FROM GROUND TIRE RUBBER PARTICLES

INCORPORATION BY REFERENCE TO RELATED APPLICATIONS

Any and all priority claims identified in the Application Data Sheet, or any correction thereto, are hereby incorporated by reference under 37 CFR 1.57. This application is a continuation of U.S. patent Ser. No. 17/002,659, filed Aug. 25, 2020, which is a divisional of U.S. application Ser. No. 16/168,518, filed Oct. 23, 2018, now U.S. Pat. No. 10,800, 906. U.S. application Ser. No. 16/168,518, filed Oct. 23, 2018, is a continuation-in-part of PCT Intl. Appl. No. PCT/US2018/045061, filed Aug. 2, 2018, and is a continuation-in-part of U.S. application Ser. No. 16/053,708, filed Aug. 2, 2018, now U.S. Pat. No. 10,626,275, and is a continuation-in-part of PCT Intl. Appl. No. PCT/US2018/028656, filed Apr. 20, 2018, and claims the benefit of U.S. Provisional Application No. 62/613,744, filed Jan. 4, 2018, U.S. Provisional Application No. 62/621,465, filed Jan. 24, 2018, and U.S. Provisional Application No. 62/703,366, filed Jul. 25, 2018. PCT Intl. Appl. No. PCT/US2018/028656 claims the benefit of U.S. Provisional Application No. 62/489,878, filed Apr. 25, 2017, U.S. Provisional Application No. 62/541,610, filed Aug. 4, 2017, U.S. Provisional Application No. 62/569,374, filed Oct. 6, 2017, U.S. Provisional Application No. 62/613,744, filed Jan. 4, 2018, and U.S. Provisional Application No. 62/621,465, filed Jan. 24, 2018. U.S. application Ser. No. 16/053,708, filed Aug. 2, 2018, now U.S. Pat. No. 10,626,275 is a continuation-in-part of PCT Intl. Appl. No. PCT/US2018/028656, filed Apr. 20, 2018, and claims the benefit of U.S. Provisional Application No. 62/541,610, filed Aug. 4, 2017, U.S. Provisional Application No. 62/569,374, filed Oct. 6, 2017, U.S. Provisional Application No. 62/613,744, filed Jan. 4, 2018, U.S. Provisional Application No. 62/621,465, filed Jan. 24, 2018, and U.S. Provisional Application No. 62/703,366, filed Jul. 25, 2018. PCT Intl. Appl. No. PCT/US2018/045061 is a continuation-in-part of PCT Intl. Appl. No. PCT/US2018/028656, filed Apr. 20, 2018 and claims the benefit of U.S. Provisional Application No. 62/703,366, filed Jul. 25, 2018. Each of the aforementioned applications is incorporated by reference herein in its entirety, and each is hereby expressly made a part of this specification.

FIELD OF THE INVENTION

Crumb rubber obtained from recycled tires is subjected to a process involving phase reticulation induced sulfidic metathesis. The process utilizes a reactive component that interferes with sulfur bonds. The resulting rubber, subjected to interlinked substitution, exhibits properties similar to those of the virgin composite rubber structure prior to being granulated, or other polymeric materials, and is suitable for use in fabricating new tires, engineered rubber articles, and asphalt rubber for use in waterproofing and paving applications.

BACKGROUND OF THE INVENTION

In 2015, end-use markets consumed 87.9% percent by weight of the scrap tires generated in the U.S. The total volume of scrap tires consumed in end use markets in the U.S. reached approximately 3551 thousand tons of tires. RMA estimates that about 4038 thousand tons of tires were generated in the U.S. in 2015. Of those tires, 25.8% were used to produce ground rubber, 48.6% for tire derived fuel, 11.4% were land disposed, 7.0% were used in civil engineering, and 7.1% went to miscellaneous uses (0.7% to electric arc furnace, 1.3% to reclamation projects, 2.6% were exported, and 2.6% went to other uses). In 1990, only eleven percent of tires were consumed on a per tire basis. Positive end-use market results in 2015 were primarily the result of high rates of TDF use and lower exports. In the long term, the need to expand all economically viable and environmentally sound markets for scrap tires is still an imperative. Scrap tires were consumed by a variety of scrap tire markets, including tire-derived fuel, civil engineering and ground rubber applications. Other smaller markets and legal landfilling consumed the remaining annually-generated tires.

Key scrap tire markets include tire derived fuel, ground rubber, civil engineering and other markets. In tire derived fuel applications, scrap tires are used as a cleaner and more economical alternative to coal as fuel in cement kilns, pulp and paper mills and industrial and utility boilers. Ground rubber applications utilize approximately 1020 thousand tons of scrap tires, or over 25 percent of the volume of scrap tires generated each year. Ground rubber is produced by grinding scrap tires into size defined pieces. Ground rubber applications include new rubber products, playground and other sports surfacing and rubber-modified asphalt. Ground rubber also includes larger pieces of rubber used as landscaping mulch, and loose fill playground material. The playground and mulch market was the most dynamic segment in the ground rubber market during this period. The asphalt market uses ground rubber to modify the asphalt binder used in road paving, resulting in quieter, more durable roads. The civil engineering market consumes approximately 274 thousand tons of tires per year, about 7.7 percent of the total tires to market, and consists of tire shreds used in road and landfill construction, septic tank leach fields, alternative daily cover and other construction applications. Additional smaller markets for scrap tires exist that consume approximately 7% of annually generated scrap tires. These markets include tires consumed in electric arc furnaces (steel manufacturing), professionally engineered tire bales and products punched, pressed or stamped from scrap tires. Total tire rubber consumed in ground rubber markets is about 1.36 billion pounds. The total scrap tires diverted to these ground rubber markets is about 1.02 million tons (62 million tires). The percent of total pounds of ground rubber consumed in the market in 2015 is as follows: sport surfaces 25%, playground mulch 22%, molded/extruded products 35%, asphalt 15%, automotive uses 2%, and export 1%.

Stockpiles of scrap tires historically began to be created around the 1960s and 1970s when tires were diverted from landfills, but recycling markets for them were not functional. Stockpiles proved to be prone to catastrophic fires which created air and water pollution.

Worldwide rubber tire production is responsible for generating approximately 99% of worldwide, end-of-life (EOL) tire scrap. About 1.1 billion scrap tires are generated annually, corresponding to roughly 12 million tons of scrap tire. Due to the punishing physical properties required of a new tire, tires embody a carefully engineered weaving together of steel and fiber cords with a mineral and carbon-filled rubber blend, all cross linked to a highly tenacious structure. The EOL tire is challenging to breakdown to its original essential elements. The potentially highest value component—the rubber—is particularly difficult to reclaim, due to the vulcanization process it is subjected to. As a result EOL tires that are no longer suitable for use on vehicles due to wear or irreparable damage are typically either subject to pyrolysis (e.g., to generate energy for use in cement manufacturing), or ground up to be used as filler (e.g., in asphalt pavement, new tires, construction or landscaping materials).

SUMMARY OF THE INVENTION

While extensive research efforts have been devoted to development of methods for devulcanizing vulcanized rubber, e.g., tire rubber, a method for recovery or transformation of tire rubber into a commercially viable product having properties similar to virgin composite rubber has heretofore not been developed.

An interlinked substitution method for extracting, utilizing, or transforming the natural or synthetic rubber in waste tires and other vulcanized rubber scrap offers potential as a low cost source for quality natural or synthetic rubber. Such reclaimed materials may exhibit properties similar to, or even superior to, those of the product from which they are derived. Rubber subjected to processes as described herein is variously referred to herein as "treated rubber", "activated rubber", "interlinked substituted rubber", "PTR rubber", "post reactor ground tire rubber", "EOL tire rubber crumb-derived rubber" or the like.

One of the objects of the methods described herein is to process vulcanized rubber products or other cross linked rubber containing products, e.g., as found in end-of-life (EOL) rubber tires, into a form suitable for use as a raw material in the fabrication of articles of manufacture that would conventionally be fabricated from virgin rubber subjected to vulcanization, e.g., new tires or other vulcanized rubber products. The vulcanized rubber subjected to the methods described herein is typically provided as a conventionally available, 30 mesh, end-of-life, ground tire rubber particle (GTRP). It is subjected to a method whereby it is transformed into a crosslink re-aligned, 5-10 micron moiety, wherein the micro-moiety may be re-fabricated into a monolithic, macro-structure characterized by an interpenetrating elastomer network exhibiting physical properties substantially analogous to the macro-structural properties of the original, EOL tire rubber prior to being size-reduced to the 30 mesh particle.

Two inter-dependent, parallel and nearly simultaneous, interacting, process systems are successfully executed to achieve one or more of the various objectives of the methods described herein. To ensure a desired end result, process management can optionally be data driven, in real time and/or by post-process analysis of the integration of the micron moiety into finished product, macro-structure(s).

In the first system, an aqueous, chemical solution is provided into which the particle is immersed. The aqueous, chemical solution acts to dissociate the transverse sulfuric bridge from a pendant elastomer bond in a manner that pre-nucleates the pendent site for a subsequent, re-alignment and crosslink. This dissociation substantially preserves the sulfidic bridge as an intact and bound 'tether' upon the companion, parallel non-pendant backbone to which it was originally fixed (e.g., vulcanized).

In the second system, an electromagnetic-mechanical system is employed which stress-distorts the particle to a sub-hysteresis, strain threshold. This maximizes the exposure of the elastomer crosslink sites to the aqueous, chemical solution such that the chemical of the aqueous, chemical solution can operate at pico-second speed to perform the dissociative substitution described in the first system.

The fully vulcanized GTRP exhibits substantial resilience to distortion along all three axes. This resilience is observed whether the external force is a compressive mechanical force, a tensile mechanical force, a torsional mechanical force, or a force that is electromagnetic in nature. This resilience is manifest in a rapid recovery to the dimensional and dielectric ground state(s) of the rubber. The resilience strain is the interactive product of the two, interdependent process systems described above being quicker than the distortion-relaxation cycle, inclusive of being properly coordinated.

The Joint Research Council (JRC) for the EC recently published a Critical Raw Material (CRM) study in December 2017 listing 27 materials subject to supply disruption; a disruption that would result in significant loss of economic sustainability. Natural rubber (NR) was listed as one of the 27 materials. The process disclosed herein can provide up to 70% of the natural rubber gap referred to in the CRM study.

In a first aspect, a method is provided for preparing a modified rubber, comprising: introducing an aqueous slurry comprising vulcanized rubber particles and an organometallic compound into an electromechanical reactor configured to generate a phase space environment with cavitation, so as to induce delamination of a rubber matrix within the vulcanized rubber particles as coordinated with disrupting sulfidic linkages.

In an embodiment of the first aspect, the method further comprises reestablishing sulfidic linkages to establish within the matrix sulfur bridge cross linked, re-aligned, laminates.

In an embodiment of the first aspect, delamination is associated with a portion of rigid sulfidic bridges of the vulcanized rubber particles becoming unbound at an original methyl carbocation while remaining tethered at an original allylic carbocation.

In an embodiment of the first aspect, the organometallic compound comprises a metal having octahedral molecular geometry.

In an embodiment of the first aspect, the organometallic compound comprises a metal ion selected from the group consisting of $Co^{2+}$, $Cu^{2+}$, $Ni^{2+}$, $Zn^{2+}$, and $Mn^{2+}$.

In an embodiment of the first aspect, the organometallic compound comprises an organic anion as a ligand to the metal ion.

In an embodiment of the first aspect, the organic anion comprises acetate ion.

In an embodiment of the first aspect, the organometallic compound is copper acetate.

In an embodiment of the first aspect, the organometallic compound is a metal salt that undergoes a phase change from solid to liquid or vapor in a range of 100-150° C.

In an embodiment of the first aspect, a temperature in the electromechanical reactor is maintained at ambient by use of a cooling jacket or cooling coils.

In an embodiment of the first aspect, the vulcanized rubber crumbs have a particle size greater than 200 mesh.

In a second aspect, an electromechanical reactor is provided comprising: a rotor having a plurality of slots; and a stator, wherein the electromechanical reactor is configured to create a phase space environment by generating a mixture of entrained air, an organometallic compound, and ground tire rubber particles in a liquid subject to cavitation.

In a third aspect, a rubber-based heterogeneous matrix is provided comprising an interpenetrating network of two or more elastomers, the network comprising sulfur bridge cross linked, re-aligned, intermingled laminates having an average spacing of from 10 nm to 5 microns, wherein each laminate comprises one of the two or more elastomers.

In an embodiment of the third aspect, carbon black particles are dispersed amongst the laminates.

In an embodiment of the third aspect, the two or more elastomers comprise virgin natural rubber and an elastomer derived from ground tire rubber.

In an embodiment of the third aspect, the two or more elastomers comprise virgin styrene butadiene/butadiene rubber and an elastomer derived from ground tire rubber.

In an embodiment of the third aspect, two of the two or more elastomers have different backbone chemistries.

In an embodiment of the third aspect, the two of the two or more elastomers having the different backbone chemistries are woven together and then cross linked separate from one another.

In a fourth aspect, a sheet of the rubber-based heterogeneous matrix of the third aspect or any of its embodiments is provided.

In an embodiment of the fourth aspect, the sheet exhibits an anisotropy in length tensile strength to width tensile strength, wherein the anisotropy in length tensile strength to width tensile strength is from 1.1:1 to 3:1.

In a fifth aspect, a laminate comprising a plurality of the sheets of the fourth embodiment is provided.

In an embodiment of the fifth aspect, each of the sheets has a thickness in a range of 10 to 70 microns.

In an embodiment of the fifth aspect, each of the sheets is vacuum-heat fused and cross linked to an adjacent sheet.

In an embodiment of the fifth aspect, each of the sheets is oriented 30 to 45 degrees to an anisotropic grain of an adjacent sheet.

In a sixth aspect, a ground tire rubber composite structure is provided having an unbound, reptated internal morphology, wherein a portion of the rigid sulfidic linkages therein are each tethered at an original allylic carbocation and unbound at an original methyl carbocation.

In a seventh aspect, a vulcanized rubber is provided, wherein a portion of the rigid sulfidic linkages therein are each tethered at an original allylic carbocation and unbound at an original methyl carbocation, and wherein a portion of polymer backbones within the vulcanized rubber are substituted by an acetate moiety.

In an eighth aspect, a rubber tire is provided, wherein from 3% by weight to 15% by weight of the rubber in the tire is prepared by a method substantially as described herein.

In a ninth aspect, a rubber tire is provided, wherein from 15% by weight to 100% by weight of the rubber in the tire is prepared by a method substantially as described herein.

In a tenth aspect, a tire tread is provided, comprising from 10% by weight to 50% by weight of an interlinked substituted rubber substantially as described herein.

In an eleventh aspect, a tire sidewall is provided, comprising from 10% by weight to 100% by weight of an interlinked substituted rubber substantially as described herein.

In a twelfth aspect, an asphalt-rubber binder is provided, comprising from 5% by weight to 95% by weight of an interlinked substituted rubber substantially as described herein.

In a thirteenth aspect, an asphalt emulsion is provided, comprising from 5% by weight to 95% by weight of an interlinked substituted rubber substantially as described herein.

In a fourteenth aspect, an asphalt roofing material is provided, comprising from 5% by weight to 95% by weight of an interlinked substituted rubber substantially as described herein.

In a fifteenth aspect, an interlinked substituted rubber substantially as described herein is provided.

In a sixteenth aspect, a tire tread, tire sidewall, roofing membrane, high dielectric electrical tape, tank lining, reservoir lining, trench lining, bridge underlayment, wire harness wrap, self-bonding wire harness wrap, shoe soles, rubber boots, electrical tape, foundation waterproofing, parking garage waterproofing, hose, belt, or molding comprising an interlinked substituted rubber product as described herein is provided.

Any of the features of an embodiment of the first through sixteenth aspects is applicable to all aspects and embodiments identified herein. Moreover, any of the features of an embodiment of the first through sixteenth aspects is independently combinable, partly or wholly with other embodiments described herein in any way, e.g., one, two, or three or more embodiments may be combinable in whole or in part. Further, any of the features of an embodiment of the first through sixteenth aspects may be made optional to other aspects or embodiments. Any aspect or embodiment of a method can be performed by a system or apparatus of another aspect or embodiment, and any aspect or embodiment of a system or apparatus can be configured to perform a method of another aspect or embodiment.

DESCRIPTION OF THE DRAWINGS

FIG. 3A depicts the process of the GTRP traversing a "phase space tunnel" wherein differential-cyclical, mechanical stress and steric field polarization are applied.

FIG. 3B illustrates the phase space tunnel 303 between the EMRE rotor 301 and the compression gate 302.

FIG. 3C illustrates the effect of rapid compression-stretching-decompression of the GTRP.

FIG. 4C provides a table listing GTRP slurry control variables.

FIG. 4D provides a table listing EMRE process control variables.

FIG. 10D provides an end view of the horizontal compression reactor of FIG. 10A.

FIG. 12A provides a view of the barrel, FIG. 11B provides a view of the end plate, and FIG. 12C provides a view of one of the rotating screws.

FIG. 13 provides specifications for Paving Asphalt PG 64-10 Product 2185.

FIG. 14A provides the results of Caltrans PG specification testing for an asphalt containing an interlinked substituted product.

FIG. 14B includes multiple stress creep recovery (MSCR) test data for an asphalt containing an interlinked substituted product.

FIG. 14C includes separation test data for an asphalt containing an interlinked substituted product.

FIG. 18 provides a table including an Aromatic Process Oils Product Data Sheet.

FIG. 19 provides a table including a Naphthenic Lube/Process Oils Product Data Sheet.

DETAILED DESCRIPTION OF THE EMBODIMENTS

Figure 1:
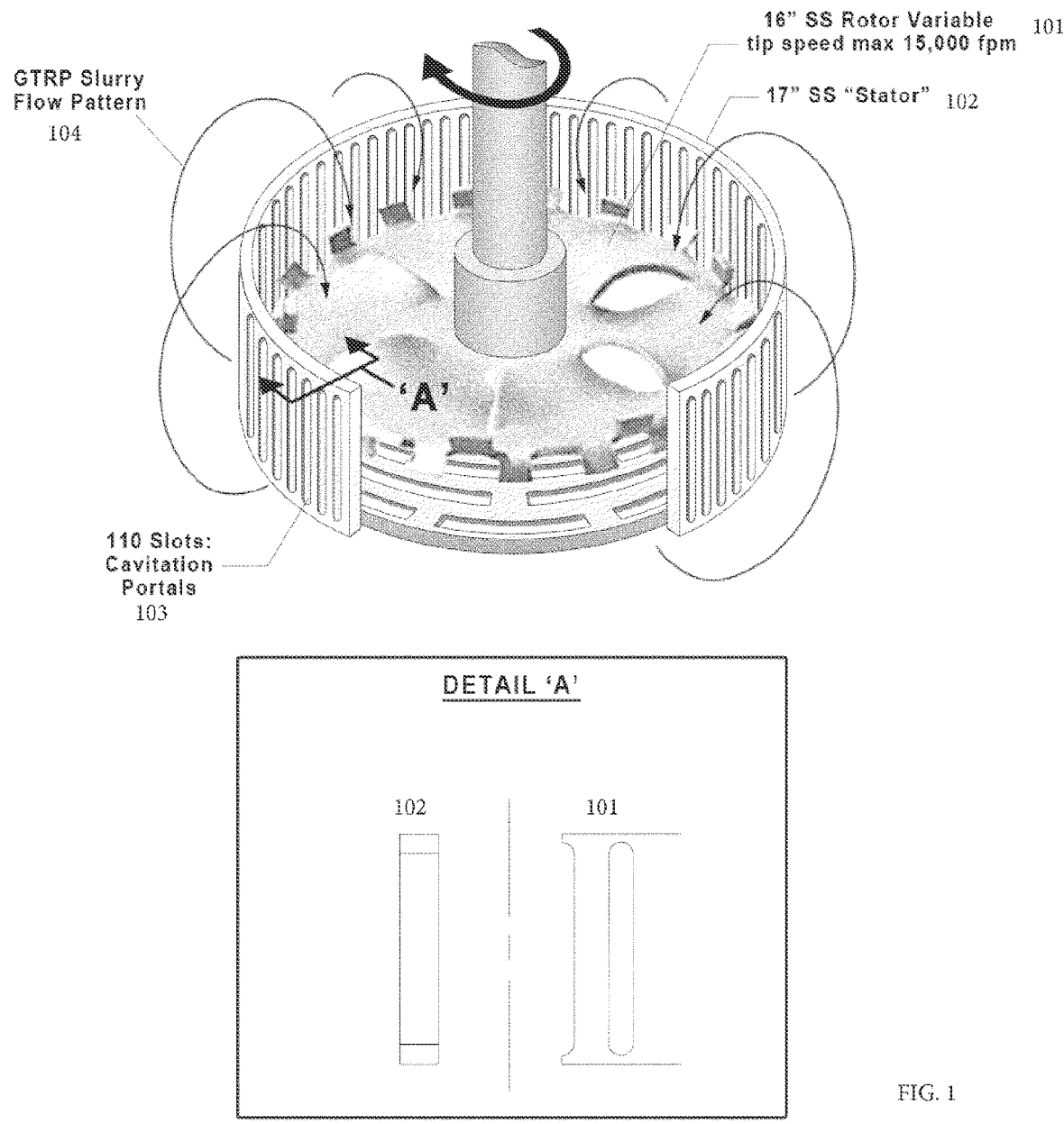
FIG. 1 depicts an electromechanical reactor environment (EMRE) including rotor 101, stator 102, and slots/cavitation portals 103 cooperating to generate a ground tire rubber particle (GTRP) slurry flow pattern 104.

The following description and examples illustrate an embodiment of the present invention in detail. Those of skill in the art will recognize that there are numerous variations and modifications of this invention that are encompassed by its scope. Accordingly, the description of an embodiment should not be deemed to limit the scope of the present invention.

Introduction

An ambient, end of life (EOL), ground tire rubber (GTR) particle in the size range of approx. 600 microns (30 mesh), has a cross section composed of either the old tire tread or the tire side wall or a combination of the two. It may be generally characterized as a heterogeneous matrix of an interpenetrating, cross linked, elastomer network filled with inorganic substances, primarily carbon. Depending upon whether it is primarily tire tread or sidewall in origin the primary entangled elastomers will be natural rubber (NR) or styrene butadiene/butadiene rubber (BR S-BR), with the BR and S-BR typically having the larger mass component in the tread for better wear and the sidewall having an NR bias for improved flexural qualities. The crosslink may generally be described as elemental sulfur and/or a complex compound incorporating sulfur as its principal element, e.g., a polysulfidic chemical.

During tire construction the interpenetrating elastomer networks are formed using a sequential crosslink of the predominant elastomer (NR or S-BR) followed by the crosslink of the secondary elastomer, such that the secondary elastomer is "bent" to conform to the already vulcanized, higher strength primary elastomer. This technique imparts mechanical characteristics that are retained in the individual GTR particle.

A single vehicle tire, after being stripped of steel and fiber reinforcement will yield approximately sixteen pounds (16 lbs) of reusable GTR, with truck tires yielding more. Over one billion EOL tires are generated worldwide annually. About 50% are consumed as low value fuel. Where possible, maximizing the reuse of this raw material for its proven mechanical properties represents a substantial challenge, but, to the extent achieved, a resource recovery value of as much as 200:1 is observed when comparing its possible re-use in new tire construction to being consumed in a furnace for its BTU content.

Notably, recent detailed studies of the environmental advantages such a reversal of EOL-GTR usage, maximized, predicts that atmospheric carbon contribution might be reduced by the equivalent of shutting down 14 coal fired power plants (300,000 rail cars of coal) or removing six million vehicles from the roads or planting an additional 62 million acres of forests (equivalent to an area the size of the state of Arizona) for carbon sequestration. Accordingly, one object of the methods and compositions discussed herein is to prepare the GTR particle so that it may be recombined with similar particles or materials into a monolithic unit which may be integrated into the full spectrum of industrial rubber goods manufactured worldwide.

A method is provided that allows one to achieve the objective of preparing, augmenting, and then recombining the GTR particle(s) in such a manner that the individual, complex, heterogeneous, cross linked moieties are built into a re-entangled, monolithic structure, substantially composed of the original GTR; with uniform mechanical properties which are at least equivalent to the whole tire properties of the rubber matrix prior to the granulation process. Achievement of this objective is demonstrated by the end product being competitively re-introduced as feedstock for new tire and industrial rubber production.

The macro-characteristics of a ground tire rubber particle may be viewed from the perspective that it is a bit like an egg that has been scrambled, and therefore it cannot ever be un-scrambled. Similarly, it can be viewed as like an old car that has been crushed at a recycling yard, such that it can never be un-bent to its original specification. To some degree both these metaphors have merit. However, upon a closer examination a list of unusual mechanical qualities and conditions becomes apparent, which, if exploited, provide an opportunity to recover this complex resource in a commercially and technically viable way; whereby complete resource recovery emerges.

In GTR, the qualities and conditions of opportunity include the following. A substantial inventory exists of un-bound, eight sided sulfur rings. Previous accelerator chemistry byproducts have been degraded such that they may be mitigated so as not to interfere with further cross-linking processes. Existing crosslink density and sulfur bond length can be accurately assessed by chemical probe. A substantial, recoverable, ineffective elasticity exists within the interpenetrating density due to loop crosslinks within a single molecular backbone. The original, new tire morphology has undergone rigorous physical challenges causing the remaining structure to be annealed. A very high particle surface shoreline is presented as a result of the ambient grinding process. Substantial un-used allylic hydrogen and carbon sites remain in the entangled polymer structure(s). Classic, transverse sulfur bridge formation is well verified, providing a focused mechanistic model to approach resource recovery.

The strategic effort, using these qualities and conditions, is to 1) gently unpack the dense GTR composite structure, 2) dislocate the least stable attachment point of the transverse crosslink without negatively altering the elastomer molecule or the sulfur bridge, 3) install a complimentary virgin polymer receptor upon a dislocation site, then 4) following subparticle mechanically induced leafing, re-crosslink the original hinged, sulfur bridge at susceptible, dislocation sites along the elastomer backbone.

Unassisted, elemental sulfur will slowly crosslink functional rubber polymers, but the process is too slow and has too many end property difficulties to be a commercially realistic alternative to a commercially successful vulcanization. Vulcanization as discussed herein regards an accelerated sulfur vulcanization process as is practiced in commercial vulcanization.

Sulfur vulcanization was discovered by Charles Goodyear in 1839. After 178 years of development, it is universally agreed that the processes are complex which result in the formation of the transverse sulfuric bridge between adjacent, interpenetrating rubber polymers. These bridges in turn yield mechanical properties in an elastomeric material which are critical to civilization. However, much progress has been made and many, definitive elements of the progression are well established.

While a free-radical mechanism had long been assumed to be the controlling phenomena, more recently, with the advent of more advanced methods of discreet process characterization, a convincing presence has not been detected of the primary, theoretical radicals necessary to validate that mechanism. In contrast, an ionic mechanism has been predicted and validated using similar advanced process characterization methods. Since the modern vulcanization process involves many chemical components being mixed together at the start of the process, each (combination) with its own chemical reaction pathway, it is likely that both radical and ionic mechanisms are active but analysis reveals that the ionic mechanism is predominant.

A typical example (by wt. %) of an NR-BR tire compound is: NR 80%, BR 20%, ZnO 5%, steric acid 2%, silica-talc 3%, carbon black 55%, aromatic oil 10%, elemental sulfur 1.7%, N-Cyclohexyl-2-benzothiazole sulfenamide (CBS—an accelerator) 1.2%, 2-(4-Morpholinothio)-benzothiazole (MBS—an accelerator) 1.1%, and N-tert-butyl-2-benzothiazole sulfenamide (TBBS—an accelerator) 1.1%.

The process begins in a heated mold, after the tire recipe components have been thoroughly distributed and dispersed. The vulcanization process may be seen in three sequential events: 1) formation of the accelerator complex chemistry, 2) formation of the crosslink precursor, and 3) completion of the crosslink.

Formation of the Accelerator

Using, by way of example, the popular 2-mercaptobenzothiazole (MBT) accelerator model, a consensus exists that a sulfonamide accelerator in the presence of sulfur decomposes under heating into MBT and a respective amine. Progressively the MBT then reacts with the remaining sulfenamide molecules to auto catalytically form 2,2'-dithiobenzothiazole (MBTS) thereby releasing the amine molecules. MBTS then reacts with elemental sulfur forming poly sulfide an active sulfurating agent (persulfonium ion source). A possible reaction mechanism for precursor formation follows.

Formation of the Crosslink Precursor

This second stage reaction, feeding off of the newly formed accelerator intermediate, which is bound to both ends of the forming sulfur chain, begins when the sulfurating agent reacts with a pendant structure attached to an isoprene or butadiene elastomeric molecule chain yielding the formation of a persulfonium ion (I). The resultant persulfonium ion then reacts with a second isoprene or butadiene molecule by allylic hydrogen scavenging to produce a polymeric methyl carbocation. The formed intermediate, also referred to as a polythio-mercapbenzothiazyl group introduces monomeric sulfur into a bonding position in the pendant group which is converted by a new carbocation into a double bond by anionic addition. This formation of the final double bond ultimately occurs with sulfenamide decomposition to uncharacterized isomers near the reaction site.

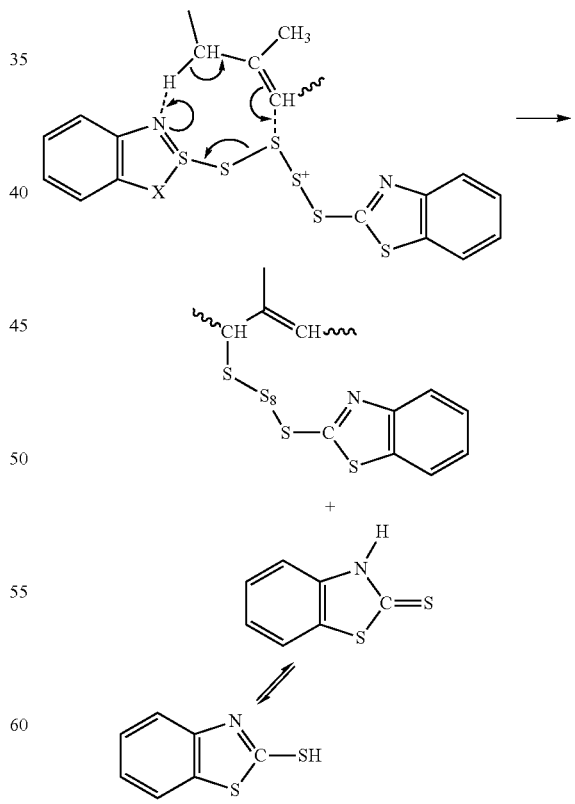

Formation of the Crosslink

In the final step the backbone of the adjacent rubber polymer chain is attacked at an allylic carbon position which is susceptible to carbocation by the polysulfide group bound onto the remaining 'end' of the elemental sulfur chain. The sulfur chain, in a final cross linked form, may be up to twenty (20) atoms in length but typically does not exceed (7) atoms. The sulfur bridge may contain individual atoms but usually contains one or several elemental, eight sided sulfur rings ($S_8$). Longer chains may shorten when the cure time and temperature are extended beyond the completion of the crosslink; or during the associated annealing process. It is important to note that no sulfidic chain can form until the otherwise dissociated, sulfur compound 'maw' becomes attached at the precursor site. Only the last step of the crosslink formation is detected in a moving die rheometry (MDR) curve.

Characterizing the Final Crosslink

Crosslink density and type are determined by chemical swelling method and chemical probes, respectively; or by spectroscopy.

Elastically effective network chain crosslink density may be calculated by the Flory-Rehner Equation once data is empirically ascertained. Subsequently, the same localized sample used to determine crosslink density is subjected to a piperidine-propane-2-thiol chemical probe (PPTCP) which will determine the sulfidic crosslink (S>3) proportion. Further treated the same PPTCP sample may reveal the di-sulfidic and mono-sulfidic proportions using a piperidine-hexane-1-thiol chemical probe. Thereupon by percentage of the original crosslink density the percentages of each may be computed and beneficially compared to the MDR curve.

C MAS NMR spectra is cross validated by chemical probe method(s) with polysulfide and mono sulfide resonance peaks at 57.5 and 50.4 ppm respectively (B2 type structures by way of example); and resonant peaks of 37.3, 44.7, 48.2, 49.6, 50.6, 52.5, 54.8 and 57.5 ppm using one-half the sum of these areas to yield cross link density.

Estimation of Looping Probabilities

When a crosslink occurs between neighboring polymer chains it provides elasticity and shear modulus to the rubber composite. However whenever the crosslink forms within the same polymer chain it forms a loop and it is elastically ineffective and may be characterized as a flaw or weak spot in the structure of the vulcanized rubber matrix. Detailed analysis of the looping probability reveals that the occurrence of this unwanted condition occurs within a range of 5-15% of the total number of crosslinks in a given commercially vulcanized rubber. Dependent upon the location of the unwanted crosslink the looped polymer molecular chain can relegate from 5% to 20% of the rubber polymer to an ineffective cyclic hydrocarbon. It is noted that the repeated elastomer morphology of a GTRP processed by the methods of the embodiments has reduced susceptibility to this phenomena.

Conventional Usage of Scrap Rubber in Tire

Excluding the rubber trimmings generated prior to the final heating and cross linking of new tires, it is estimated that less than 0.0004% by weight of all EOL tires are reincorporated into a new tire master batch. Such reincorporation has been successfully accomplished at master batch loadings of up to 3% by weight utilizing very fine, cryogenically processed ground rubber obtained from EOL tires. A loading of EOL tire-derived processed ground rubber greater than this has thus far not been feasible, in that the physical properties required of new tire applications are not met at higher loading levels. Tire production typically begins with a base formula of components, with the base formula developed by selection of raw material(s). This is then reduced to a master batch in high shear mixing equipment. Typically, the master batch is done in two phases: the master pass and the finish pass. The master pass combines various rubber species which are introduced as small bales or sheets and are blended with fine powders of carbon black and minerals, as well as a small quantity of process oil(s). This step is performed at the high temperature required to lower the viscosity of the rubber elements such that the flow-resistant powder elements can be uniformly distributed in sufficiently small clusters or packets. These clusters or packets can then be subsequently dispersed to a minimal particle size. The finish pass is done at a lower temperature and usually under process conditions that create more of a smearing action of the heterogeneous elements. In the finish pass, rubber polymers are not further degraded by high temperatures as in the master pass, and the uniformly distributed agglomerates of powder components are worked into such small physical size that they become dispersed within the free molecular space of the rubber elements. Once the finish pass is completed, the master batch bales are ejected from the mixer and rolled into thin sheets (referred to as milling). The milled sheets are used to lay up, on specialized forming equipment, the tire carcass prior to being placed in a compression molding press for final crosslinking by thermal and/or chemical means.

Crosslinking accelerants include mercapto group or sulfur-based (e.g., elemental sulfur and/or, accelerator derivatives of N-tert-butyl-2-benzothizolesulfenamide (TBBS)). The sulfur-based crosslinking agents which react with sites in the master batch at or above a prescribed temperature may be partially introduced at both the master pass and the finish pass phase. The crosslinking during the final heating of the tire carcass causes the reactive sites in the various rubber elements to build a sufficient crosslink density to achieve the final physical properties required to meet the sustained load and heat environment to which the tire will be subjected.

A method for targeting the crosslink precursor site has been developed which enables interlinked substitution of EOL tire, such that a functionally re-aligned, re-cross linkable, submicron particle rubber can be obtained. This rubber is suitable for reintroduction into new tire production at levels of up to 100% by weight of subsequent new tire master batch production. The new tires, utilizing such EOL tire-modified feedstock, exhibit performance qualities equivalent or similar to those achieved when all virgin materials are utilized.

Rubber from End-of-Life Tire Scrap

Rubber-containing crumb is manufactured from two primary feedstocks: tire buffings, a byproduct of tire retreading, whole tire, and scrap tire rubber. Scrap tire rubber comes from three types of tires: passenger car tires; truck tires; and off-the-road tires. End product yields for each of these tire types are affected by the tire's construction, strength and weight. On average, 10 to 16 pounds of end-of-life tire crumb can be derived from one passenger tire. Other sources of rubber-containing crumb includes products containing or made using recycled rubber-containing crumb, e.g., new rubber products, playground surfacing, rubber mulch, drainage aggregate, construction fill material, scraps from manufacturing, and the like.

Tires are composite structures containing a number of components. The tire carcass is composed of the tread, bead, sidewall, shoulder, and ply. Tires are formed from components such as natural and/or synthetic rubber, cords, and filler. The polymer most commonly employed for the tread and encasement of the cords is a blend of NR and S-BR copolymer. Cords form the ply and bead of the tire, and provide tensile strength necessary to contain the inflation pressure. Cords can comprise steel, natural fibers such as cotton or silk, and synthetic fibers such as nylon or Kevlar. Fillers can include silica and carbon black. A representative tire can comprise one or more of: synthetic rubber, natural rubber, sulfur and sulfur-containing compounds, silica, phenolic resin, oil (aromatic, naphthenic, and/or paraffinic), fabric (polyester, nylon, etc.), petroleum waxes, pigments (zinc oxide, titanium dioxide, etc.), carbon black, fatty acids, miscellaneous inert materials, and steel wire.

The typical passenger tire comprises 14% natural rubber, 27% synthetic rubber, 28% carbon black, 14-15% steel, and 16-17% fabric, fillers, accelerators, antiozonants, and other miscellaneous components. The average weight of a new passenger car tire is 25 lbs., and for a scrap passenger tire 22 lbs. Truck tires typically contain 27% natural rubber, 14% synthetic rubber, 28% carbon black, 14-15% steel, and 16-17% fabric, fillers, accelerators, antiozonants, and other miscellaneous components. The average weight of a new truck tire is 120 lbs., and for a scrap truck tire 110 lbs. Other types of tires can contain higher amounts of synthetic and/or natural rubber, e.g., 70% (by weight) rubber, 15% steel, 3% fiber, and 12% of other materials such as inert fillers. Rubber is found in tire components including tread, innerliner, beads, belts, and the like. The percent rubber by weight in a new passenger tire is typically as follows: 32.6% in tread; 1.7% in base, 21.9% in sidewall, 5.0% in bead apex, 1.2% in bead insulation, 11.8% in fabric insulation; 9.5% in insulation of steel cord, 12.4% in innerliner, and 3.9% in undercushion.

The rubber compounds employed in a typical tire, along with associated materials, are set forth in Table 1. The methods described herein are suitable for processing tire tread, base, sidewall, as well as innerliner, and are also suitable for processing other materials containing vulcanized (or otherwise cross linked) natural rubber, styrene-butadiene rubber, and isobutylene-isoprene rubber. As further described herein, the other components, e.g., carbon black, present in EOL tire or other vulcanized-rubber containing articles of manufacture may in some embodiments remain in the rubber subjected to the processes described herein, with no processing conducted to impact the properties or amounts of the other component(s). In other embodiments, the rubber may be subjected to further processes to enrich or minimize these additional components, or change their properties.

TABLE 1

|  | Tread (PHR) | Base (PHR) | Sidewall (PHR) | Innerliner (PHR) |
| --- | --- | --- | --- | --- |
| Natural Rubber | 50.0 | 100.0 | 75.0 |  |
| Styrene-Butadiene Rubber | 50.0 |  | 25.0 |  |
| Isobutylene-Isoprene Rubber |  |  |  | 100.0 |
| Carbon Black (Grade N110) | 50.0 | 15.0 | 20.0 |  |
| Carbon Black (Grade N330) |  | 25.0 | 35.0 |  |
| Carbon Black (Grade N765) |  |  |  | 50.0 |
| Processing Oil | 7.5 | 5.0 | 5.0 | 3.0 |
| Antioxidant | 1.0 | 0.75 | 1.0 | 1.0 |
| Antioxidant Wax |  |  | 2.0 |  |
| Stearic Acid | 2.0 | 4.0 | 3.0 | 1.5 |
| Zinc Oxidant | 5.0 | 5.0 | 5.0 | 5.0 |
| Accelerator (High) |  | 1.0 | 0.7 |  |
| Accelerator (Middle) | 1.25 |  |  | 0.4 |
| Accelerator (Low) |  |  |  | 0.4 |
| Sulfur | 2.5 | 3.0 | 2.8 | 2.0 |

*PHR = Per Hundred Rubber, parts on a weight basis
*Carbon grade = ASTM grading: Particle size and structure of carbon are different.

There are approximately 2.5 pounds of steel belts and bead wire in a passenger car tire. This material is made from high carbon steel with a nominal tensile strength of 2750 $MN/m^2$. The steel tire cord composition of a typical tire is set forth in Table 2.

TABLE 2

|  | Steel Belts | Bead Wire |
| --- | --- | --- |
| Carbon | 0.67-0.73% | 0.60% min. |
| Manganese | 0.40-0.70% | 0.40-0.70% |
| Silicon | 0.15-0.03% | 0.15-0.30% |
| Phosphorus | 0.03% max. | 0.04% max. |
| Sulfur | 0.03% max. | 0.04% max. |
| Copper | Trace | Trace |
| Chromium | Trace | Trace |
| Nickel | Trace | Trace |
| Coating | 66% Copper | 98% Brass |
|  | 34% Zinc | 2% Tin |

Whole tires can be ground to yield rubber particles mixed with other components of the tire. Methods for producing rubber containing particles from tires are known in the art. The used tires (or shreds or granules thereof) can be subjected to an optional cleaning step (e.g., a water wash). Tires can be recycled by subjecting them to an initial shredding step, then subjecting the shreds to a granulation process to yield an initial granulate having dimensions of 1-3 cm. Grinding can be conducted under ambient conditions (e.g., in a granulator or a cracker mill) or cryogenic conditions.

Ambient grinding is a multi-step processing technology that uses a series of machines (usually three) to separate the rubber, metal, and fabric components of the tire. Whether using granulation equipment or cracker mills, the first processing step typically reduces the original feedstock to small chips. The second machine in the series will grind the chips to separate the rubber from the metal and fabric. Then a finishing mill will grind the material to the required product specification. After each processing step, the material is classified by sifting screens that return oversize pieces to the granulator or mill for further processing. Magnets are used throughout the processing stages to remove wire and other metal contaminants.

In the final stage, fabric is removed by air separators. Rubber particles produced in the granulation process generally have a cut surface shape and rough texture, with similar dimensions on the cut edges.

Cracker mills use two large rotating rollers with serrations cut in one or both of them. The roll configurations are what make them different. These rollers operate face-to-face in close tolerance at different speeds. Product size is controlled by the clearance between the rollers. Cracker mills are low speed machines operating at about 30-50 RPM. The rubber usually passes through two to three mills to achieve various particle size reductions and further liberate the steel and fiber components. These mills do not have screens built into the mill and as such the mill itself does not control the final particle. A stand-alone screening system will separate "sized" particles from oversize granules following the mill and re-circulate the oversize products. The particles produced by the cracker mill are typically long and narrow in shape and have a high surface area.

Cryogenic processing uses liquid nitrogen or other materials/methods to freeze tire chips or rubber particles prior to size reduction. Most rubber becomes embrittled or "glass-like" at temperatures below −80° C. The use of cryogenic temperatures can be applied at any stage of size reduction of scrap tires. Typically, the size of the feed material is a nominal 2 inch chip or smaller. The material can be cooled in a tunnel style chamber, immersed in a "bath" of liquid nitrogen, or sprayed with liquid nitrogen to reduce the temperature of the rubber or tire chip. The cooled rubber is size-reduced in an impact type reduction unit, centrifuge, or hammer mill. This process reduces the rubber to particles ranging from ¼ inch minus to 30 mesh, with the majority of the particle distribution between ¼ inch minus and 20 mesh. A typical throughput is 4,000 to 6,000 pounds per hour. Cryogenic grinding avoids heat degradation of the rubber and produces a high yield of product that is free of almost all fiber or steel, which is liberated during the process.

Wet grinding, is a processing technology used to manufacture particles that are 40 mesh and finer. The wet grind process mixes partially refined crumb rubber particles with water creating a slurry. This slurry is then conveyed through size reduction and classification equipment. When the desired size is achieved, the slurry is conveyed to equipment for removing the majority of the water and then drying. Aside from the use of water, the same basic principles that are used in an ambient process are utilized in a wet grinding process. The major advantage for a wet grind process is the ability to create fine mesh crumb rubber. While products as coarse as 40 mesh are produced, the majority of the particles are 60 mesh and finer. A percentage of the overall throughput is finer than 200 mesh. Another advantage for a wet grind process is the cleanliness and consistency of the crumb rubber produced. The process washes the crumb rubber particles. The wet process removes the fine particles of fiber from the crumb rubber making a very clean product.

The initial granulate contains steel, rubber, and textile components. The steel is typically recovered using a multi-stage magnetic separation process to minimize the loss of rubber. This can entail a first step utilizing a high strength twin pole overband cross belt separator magnet to remove metal containing particles in a first step. The second step involves a magnetic drum separator or magnetic pulley utilizing high strength rare earth magnets. The axial magnetic field causes the metal containing particles to tumble and release entrapped rubber. For fine rubber material that is fed into a powder grinder, a plate magnet suspended close to the product over the conveyor can lift and remove fine wire fragments. Testing can be conducted to determine metal content, e.g., by using a magnetometer.

The fiber can be recovered using modified gin machinery as known in the textile industry. A two step process is typically employed, where clean fiber is removed from EOL tire crumb using a modified gin cylinder cleaner (used in the textile industry to remove foreign matter from seed cotton). Partially cleaned crumb is subjected to a second step to remove fiber, which can still contain some rubber particles. The resulting cleaned EOL tire crumb is then collected for packaging or other use. See, e.g., W. Stanley Anthony, Applied Engineering in Agriculture, Vol. 22(4): 563-570.

American Society for Testing and Materials (ASTM) has standards for specifying different size ranges of crumb rubber, such as 30 mesh or 80 mesh. The range of particle sizes can be determined by sieve analysis, consisting of shaking and tapping a measured quantity of a crumb rubber sample through a specified number of test sieves over a specified time. The amount of sample retained on each screen is weighed and results are given as the percentage of sample retained on each screen. The recommended procedure for sieve analysis using the Rotap method is provided in ASTM 5644. Typical crumb rubber sizes directed to certain products and uses include the following: molded and extruded products, 4-100 mesh; asphalt modification, 16-40 mesh; sport surfacing, ¼"-40 mesh; automotive products, 10-40 mesh; tires, 80-100 mesh; rubber and plastic blends, 10-40 mesh; and construction, 10-40 mesh.

There are no unified U.S. standards for processing EOL tire rubber crumb; however, a suitable EOL tire rubber crumb for use in interlinked substitution typically has a low fiber content (less than 0.02% of total weight), low metal content (less than 0.01% of total weight), high consistency, and the particles are preferably sized for 100% pass through 16 mesh. In some embodiments, it may be acceptable to have particles of larger size, e.g., 14, 12, or even 10 mesh. For example, 10-40 mesh crumb rubber (e.g., 30 mesh, or 25-35 mesh) yields satisfactory results when processed according to the methods described herein. Smaller particles, e.g., 41-200 mesh, can be employed and may enable more efficient interlinked substitution; however, a reduction in particle size will incur greater expense in manufacture of the crumb of the specified size. Larger particles, e.g., less than 10 mesh (4-9 mesh) can also be subjected to the methods, e.g., for particle size reduction purposes.

ASTM D5603 Standard Classification for Rubber Compounding Materials—Recycled Vulcanizate Particulate, classifies vulcanized particulate rubber according to maximum particle size, size distribution and parent materials including whole tires, tire peels, buffings generated from the tire tread and shoulder, buffings generated from tire tread, shoulder and sidewall and non-tire rubber.

End-of-Life Tire Crumb Characterization ELT crumb containing vulcanized rubber and having the desired particle sizes can be manufactured or obtained from any suitable commercial source.

The ELT crumb is typically of such a size that 100% can pass through a 16 mesh screen, and may have a narrow size distribution (e.g., no smaller than 20 mesh and no larger than 16 mesh) or may have a broader size distribution (e.g., significant contents of fines and various other particle sizes less than 16 mesh). The crumb rubber is typically cleaned of fiber and wire to a purity of 99.5 wt. % (i.e., 0.5 wt. % or less of fiber and wire).

If the sulfur content of the ELT crumb is unknown, representative samples of the ELT crumb can be tested to determine sulfur content (typically measured in parts per hundred weight), such that a controlled amount of reactant can be used in the extraction process, thereby avoiding overutilization or underutilization of reactant. A stoichiometric amount of reactant to sulfur is typically employed; however, larger or smaller amounts can also be advantageously employed. Any suitable method can be employed to determine the sulfur compound; however, a nitric compound extraction process can be advantageously employed. ASTM D4578 describes standard test methods to apply to rubber chemicals for determination of percent sulfur. These test methods cover the determination of solvent insoluble materials in a sulfur-containing sample. The two test methods are: (1) Test Method A, Extraction by Carbon Disulfide, and (2) Test Method B, Extraction by Toluene. If there are no other solvent insoluble materials present in the sulfur-containing sample, the test methods determine the insoluble sulfur content directly. If other materials are also present, additional testing is necessary to identify what portion of the insolubles (e.g., carbon black, silica, or other inert fillers) is insoluble sulfur.

Sulfur Crosslinking of Rubber

Elemental sulfur has cyclic eight atoms molecules at room temperature. In the presence of accelerators and activators, elemental sulfur generates sulfur fragments that react with reactive groups of rubbers in the process of interlinked substitution to create cross-links such as:

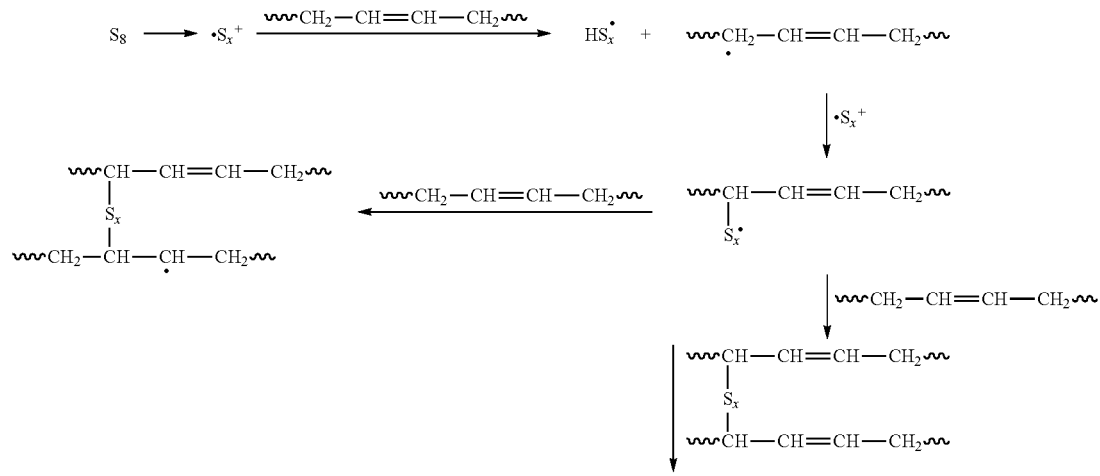

EOL tire rubber crumb is subjected to a chemical treatment with a reactant to induce interlinked substitution. The reactant comprises a metal salt having octahedral molecular geometry and a melting point in the range of 100-150° C. Examples of suitable reactants include cobalt acetate (CAS 6147-53-1; Co(OAc)$_2$,) and copper acetate (CAS 6046-93-1; Cu(OAc)$_2$,), although other reactants can be employed, as discussed elsewhere herein. The reactant is typically employed at from 0.1 to 5.0 parts reactant per hundred parts vulcanized rubber (by weight); however, higher or lower amounts may also be employed in certain embodiments. The amount of reactant employed can be increased or decreased depending upon the content of sulfur in the EOL tire rubber crumb to be treated, or the desired degree of interlinked substitution to be obtained. For example, a ratio of reactant molecules to sulfur bonds of 1:1, 4:6, 1:2, or any other suitable ratio can be employed to achieve a preselected degree of interlinked substitution.

Regenerating an Interpenetrating Elastomer Network from Ground Tire Rubber Particles In one embodiment, progressive elements are employed to regenerate a monolithic, macro-structural, interpenetrating elastomer network morphology from ground tire rubber particles. Element 1 involves providing an electro-mechanical reactor environment (EMRE) to support Boltzman "Phase Space" mediators which unpack the GTRP then realign sulfidic bridge chains for final compounding. Element 2 involves preparing a GTRP slurry for EMRE processing. Element 3 involves subjecting GTRP to differential-cyclical mechanical stress and steric electro-polarization. Element 4 involves subjecting the GTRP slurry to engineered, cavitation-induced thermal and acoustic shockwave excursion(s). Element 5 involves generating a chemotactic, sulfidic-bridge-tether-effect. Element 6 involves production of chemical reaction products and timeline. Element 7 involves compounding regenerated GTRP into a fully-integrated, monolithic, macro-structural elastomeric material.

In Element 1, an electromechanical reactor environment (EMRE) provides an effective "Phase Space" environment to 1) unpack the GTRP and reset the vulcanization precursor for 2) subsequent sulfidic bridge realignment, 3) with minimal alteration to the native, elastomer-filler matrix. FIG. 1 an EMRE head. The head comprises a 16 inch stainless steel rotor 101 with a variable tip speed and maximum 15,000 fpm. A 17 inch stainless steel stator 102 is also employed having a hundred and ten slots (cavitation portals) 103. The components generate a GTRP slurry flow pattern 104 as depicted in FIG. 1. In FIG. 1, detail of the cross-section along line 'A' is provided. While an EMRE as depicted in FIG. 1 can be advantageously employed, other mechanical platforms may be configured as reactors employed in the methods of the embodiments, e.g., progressive cavity pumps, screw pumps, extruders, or the like.

Figure 2:
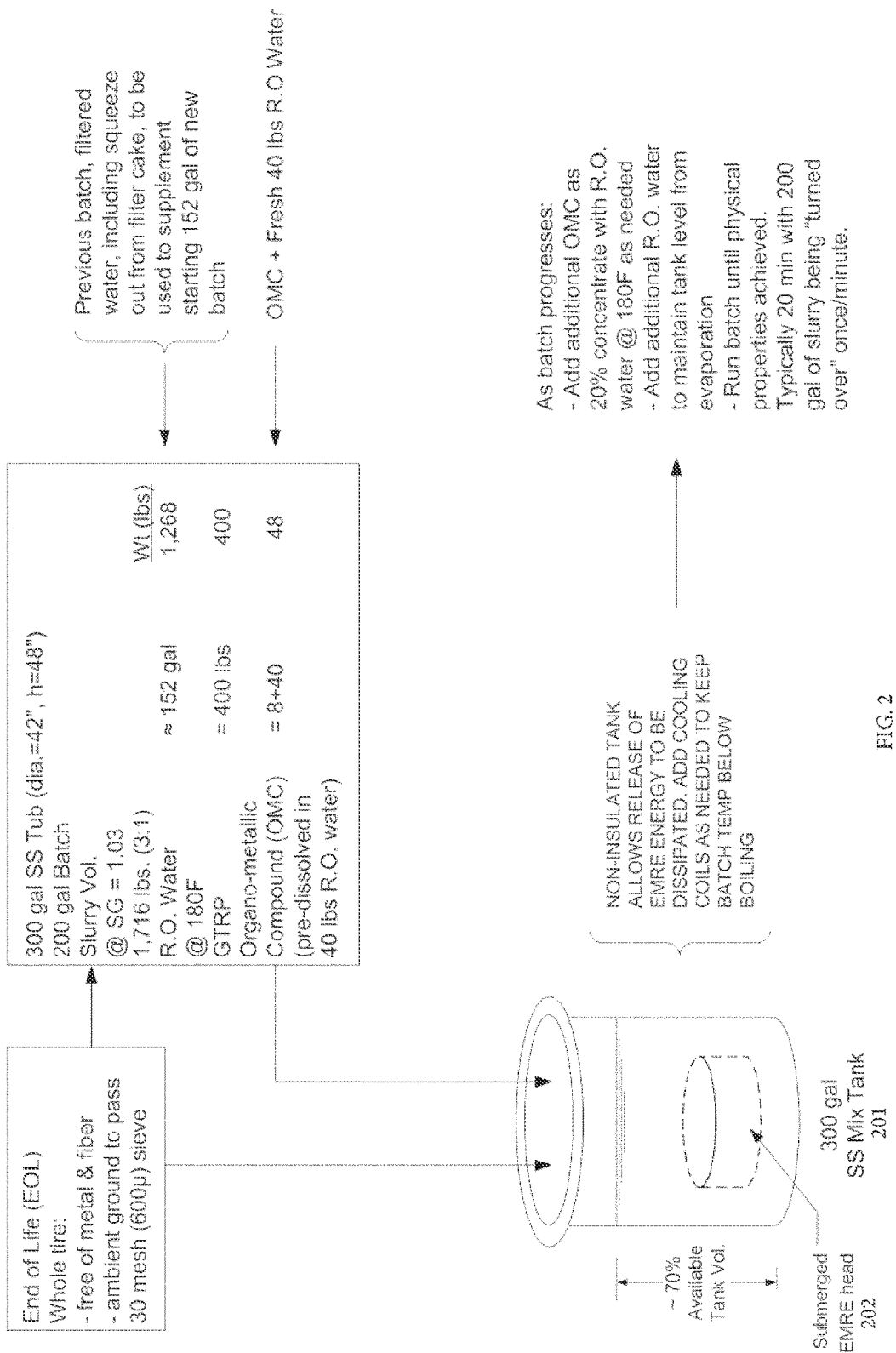
FIG. 2 depicts a process for preparing a GTRP slurry for the EMRE of FIG. 1, utilizing a submerged EMRE head 202 in a mix tank 201.

In Element 2, the GTRP slurry is prepared. FIG. 2 depicts a process schematic for this process involving a stainless steel mix tank 201 containing a submerged EMRE head 202. In operation, the tank is generally filled to about 70% of the available tank volume. The slurry is prepared from EOL whole tire that has been subjected to conventional processes to remove metal and fiber, and is ground to pass through a 30 mesh (600 micron) sieve. In the example process depicted in FIG. 2, a 300 gallon stainless steel mix tank is employed to produce a 200 gallon batch of EOL tire rubber slurry having a specific gravity of 1.03. The stainless steel tank can be non-insulated to allow dissipation of EMRE energy (thermal energy). In certain embodiments, cooling coils can be added to permit the batch temperature to be maintained below a boiling temperature or, alternatively, the process tank can be sealed to allow operation at higher temperature under pressurized conditions. The batch of EOL tire rubber slurry weighs 1716 lbs when a 3:1 ratio of water to GTRP. The components of the slurry in FIG. 2 include approx. 152 gallons of reverse osmosis (RO) water, approx. 400 lbs of GTRP, and approx. 8 lbs of copper acetate (referred to as organometallic compound or OMC) predissolved in approx. 40 lbs RO water. Filtered water recovered from a previous batch, including water squeezed out from a filter cake, can be used as a portion of the approx. 152 gallons of water used to prepare a batch. It is generally preferred to use fresh RO water for dissolving the OMC; however, in some embodiments recovered water can also be advantageously employed.

In Element 3, the GTRP of the slurry traverses a "Phase Space Tunnel" where differential-cyclical mechanical stress and steric field polarization are applied to the GTRP. The concept of "Phase Space" depicted herein (sometimes referred to as a Tunnel) was first put forth by Boltzman as a "box" in which molecular structures and velocity are quantified against a time interval when the "contents" of the box undergo outside influence(s). When the "box" environment is induced with entropy-enthalpy-entropy phase changes in short, time-oscillating-intervals, enormous energy forces (velocity) are unleashed within the "box". This process is schematically depicted in FIG. 3A, with linear distance, GTRP geometry, velocity, and acceleration profile depicted as a function of time over a timeline extending from 0.000 sec. to 0.0019 sec. Time 0.000 is when the particle impinges upon the EMRE rotor 301. The GTRP is then subjected to compression in the stator (compression gate 302), exits the stator, and enters into a recirculation pattern. As depicted in FIG. 3B, the space between the EMRE rotor 301 and the exit of the compression gate 302 is referred to as the Phase Space Tunnel 303. A modulated AC current can optionally be applied at the compression gate to facilitate the process. Electrodes 304 are provided that introduce a modulated AC current. From 0 (or no oscillation) to 100 Hz oscillation can be applied, or oscillation up to 1000 Hz or more can be applied by employing a frequency controller. Voltages up to 300 V or more can be applied to induce current flow across the slurry medium, which has the effect, through the rapid reversing of polarity, of depositing electrons upon the surface of the rubber particles in the phase space tunnel. The process of compression in the stator deforms the GTRP such that the ratio of width to length increases to 6:1. The "trampoline" effect of rapid compression-stretching-decompressing assisted by a modulated, AC current flow across the stator slot, enhances the steric effect of repulsion between overlapping electron clouds with subsequent accelerated delamination of the GTRP bound matrix, as depicted in FIG. 3C. For a 600 micron particle with approximately 1200 transverse sulfidic crosslinks, 60 dislocated and repotentiated vulcanized precursor sites are regenerated per pass through the stator. It is noted that the EMRE depicted in Element 1 is an embodiment of the Parallel Continuous Flow Micro-synthesis Reactor (PCMR) hardware described elsewhere herein, principally as it avoids the necessity of building and certifying a pressure vessel for conducting the process of the embodiments. However, the PCMR, operating at a fixed temperature along a water-to-steam curve is able to produce similar "Phase Space" particle-unpacking results with the GTRP as the Element 1 EMRE embodiment in the five quanta of "Timeline", "Linear Distance", "GTRP Geometry", "Velocity" and "Acceleration Profile" depicted in FIG. 3A by pushing the GTRP slurry through strategically positioned, mechanically larger diameter apertures (e.g., an adjustable iris valve) which allow the slurry volume to expand, whereupon it goes into a gas phase, then be immediately reduced back to the original, internal pipe diameter. With the slurry temperature versus pressure induced to oscillate in and out of a steam-liquid-steam cycle, GTRP unpacking efficiencies are equivalent. With each pass through the rotor, particle size is reduced. At a reduction to a size of 200 mesh (70 microns), approximately 65% of the crosslinking bonds are disrupted, and the particles may be mechanically leafed into thin, pancake-like structures (e.g., 'smeared out' into a 10 micron film). Further size reduction is typically not sought after. At a reduction to 5-60 microns, carbon black starts to come out of the particle matrix. At a reduction to a size of 5 microns, reduction of carbon begins to occur. A particle size of 200 mesh (70 microns) is generally useful for most applications, such as tire, roofing, and paving applications; however, in some embodiments sizes down to 10 micron can be desirable.

Figure 4A:
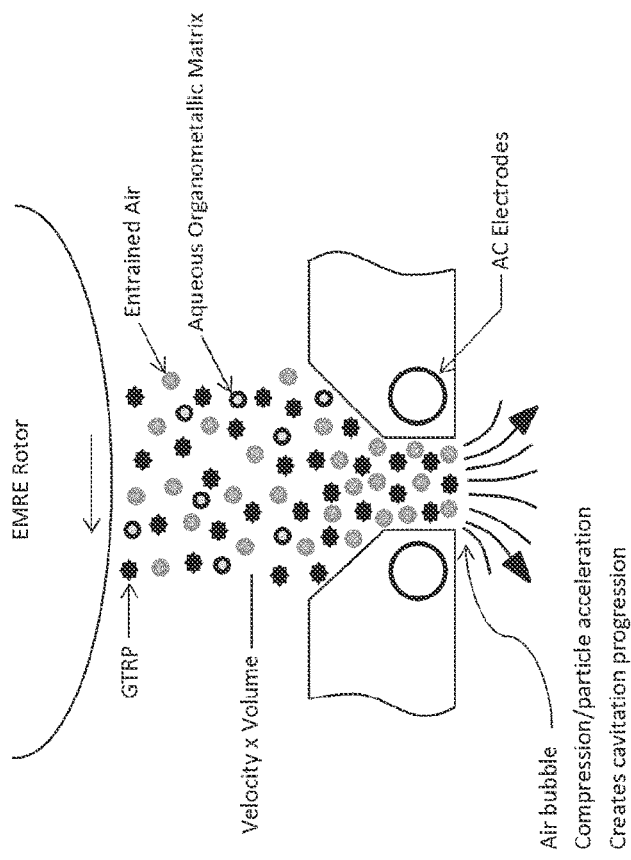
FIG. 4A depicts the process of cavitation as generated by the EMRE rotor 401 and the compression gate 203 as entrained air 406, GTRP 405, and aqueous organometallic matrix 407 pass through the compression gate.
Figure 4B:
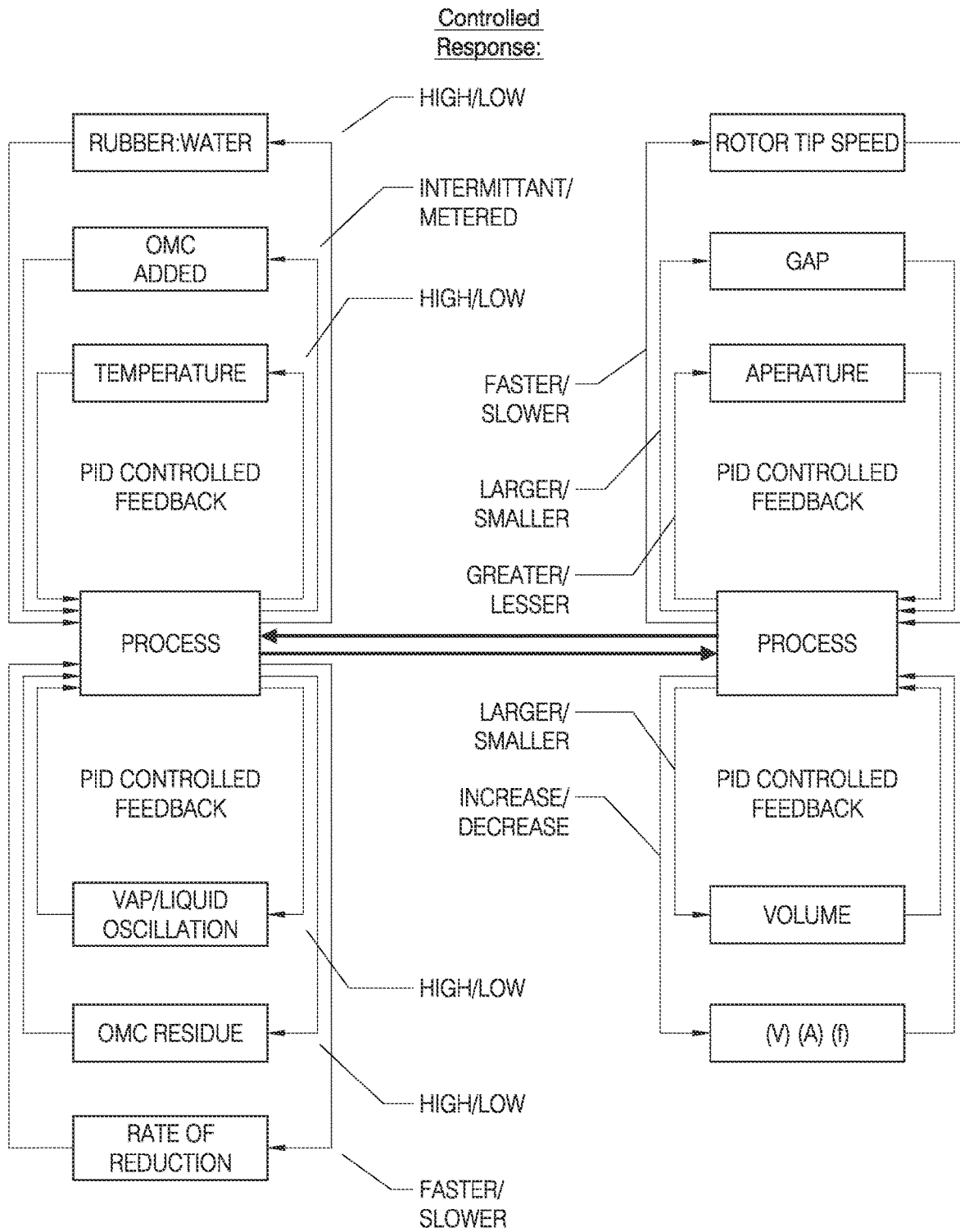
FIG. 4B includes process control variables for control of conditions in the phase space tunnel region.

In Element 4, an engineered, cavitation-induced, acoustic shockwave is applied to the GTRP. As shown in FIG. 4A, in the phase space tunnel between the EMRE rotor 401 and the compression gate 402, a mixture of GTRP 405, entrained air 406 and an aqueous organometallic compound matrix 407 is present at a velocity and volume. Upon exit through the compression gate 402, air bubble compression and particle acceleration creates a cavitation progression 408. As the slurry exits, lower pressure completes the cavitation cycle with an implosion of air cavities. It is generally preferred that no bulk-phase change occur within the continuous water phase of the slurry during cavitation. Therefore temperature and pressure differential excursions take place on an atomic scale. This process generates extreme temperature and pressure differential excursions within the nano-regions, cavitation cone in a range of $10^{2°}$ F.-$10^{15°}$ F. for temperature, 60 m/sec-180 m/sec for acoustic wave velocity, all occurring over a time interval of $10^3$ $sec^{-1}$-$10^8$ $sec^{-1}$. By changing the rotation speed of the EMRE rotor and/or slurry viscosity and/or stator gap, manipulation of energy "leverage" within the phase space tunnel can be accomplished. FIG. 4B depicts process control variables for the GTRP slurry and EMRE. A proportional-integral-derivative controller (PID controller or three term controller)—a control loop feedback mechanism widely used in industrial control systems and a variety of other applications requiring continuously modulated control—is employed to control temperature, aperture size, the volume of the slurry, and oscillation between vapor and liquid. Other factors that can be adjusted, e.g., by PID controller, related to the reactants include the ratio of rubber to water, the OMC added (amount, rate of metering, intermittent or continuous metering), the amount of OMC residue, the rate of reduction. Apparatus related factors that can be adjusted, e.g., by PID controller, include the rotor tip speed and the gap size between the EMRE and the compression gate. FIG. 4C provides a table including a list of selected GTRP slurry control variables and results of modifying them. FIG. 4D provides a table including a list of selected EMRE process control variables and results of modifying them.

Figure 5A:
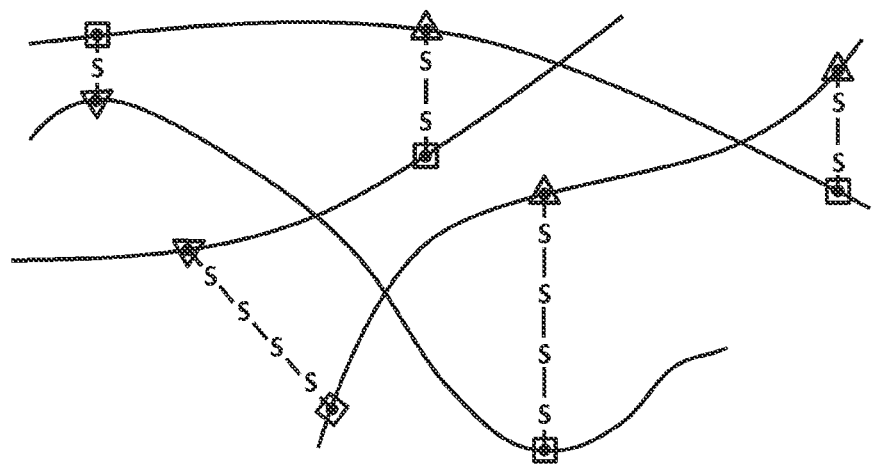
FIG. 5A schematically depicts the chemotactic sulfidic bridge tether effect.
Figure 5B:
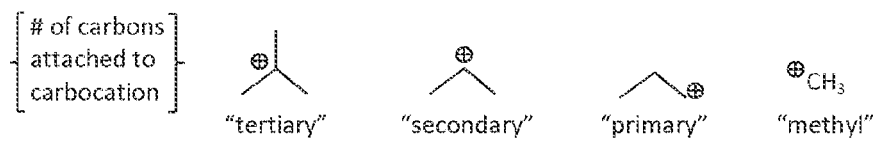
FIG. 5B provides an illustration of carbocation stability.

Element 5 illustrates a chemotactic sulfidic-bridge-tether-effect (SBTE) dynamic. FIG. 5A depicts the original sulfidic bridges schematically, including formation of pendant vulcanizate precursors that occurs predominantly at a methyl carbocation (originally forms at approx. 140° C.) and completed vulcanization that occurs primarily at an allylic carbocation (subsequently forms at approx. 160° C.). FIG. 5B depicts types of carbocations (with varying numbers of carbon atoms attached to the carbocation) in order of stability, with tertiary carbocations the most stable, secondary carbocations less stable, primary carbocations even less stable, and a methyl carbocation the least stable. Resonance adds stability to allylic carbocations as positive charge density is spread out, making it more stable than a secondary carbocation as depicted in FIG. 5B. The process of sulfidic bridge dislocation therefore preferentially occurs at a methyl carbocation rather than at an allylic carbocation. The result of the dislocation is that the rigid sulfidic bridge becomes a tether connected at the original allylic carbocation and becomes unbound at the methyl carbocation.

Figure 6A:
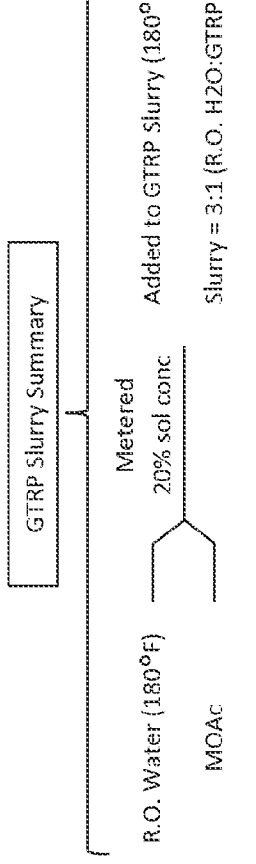
FIG. 6A depicts a summary of GTRP slurry formation.
Figure 6B:
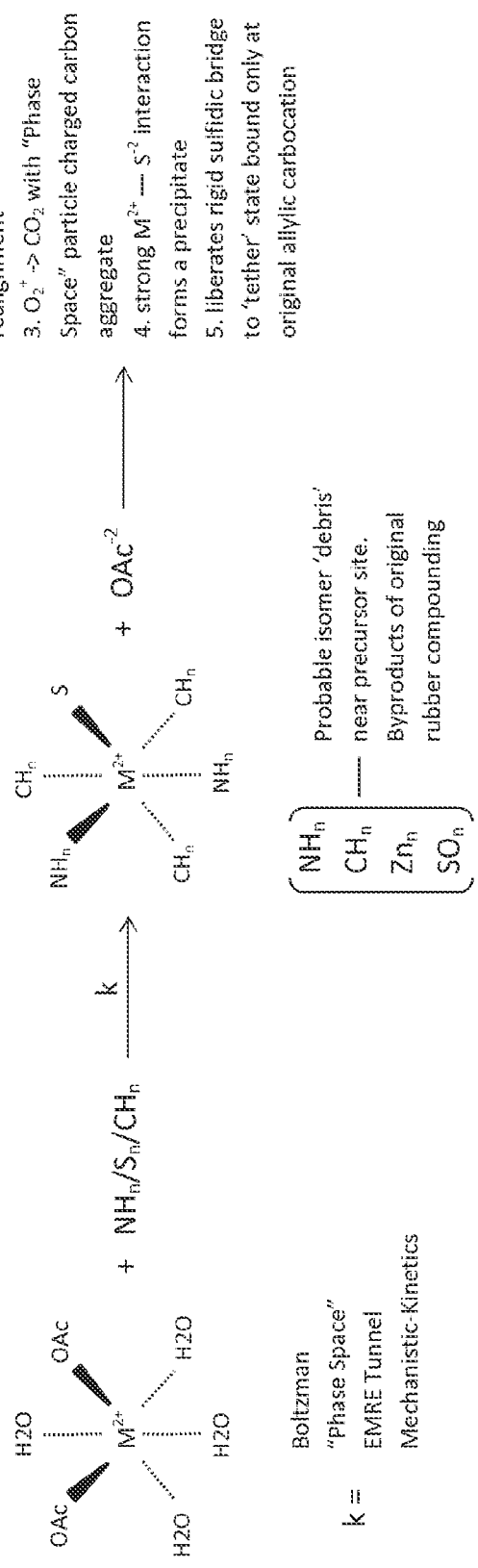
FIG. 6B depicts the process of an organometallic compound developing ligands in the process of an embodiment.

In Element 6, the chemical reaction occurs along a timeline. The RO water and OMC (in this case metal acetate or MOAc) in a 20% solution concentrate is mixed and metered into the GTRP slurry (180° F., 3:1 ratio by weight of RO water to GTRP), as depicted in FIG. 6A. The resulting chemical reaction is depicted in FIG. 6B. The organometallic compound dissolved in water associates with ligands, including transient aquo metal formations. In FIG. 6B, k refers to the Boltzman "phase space" EMRE tunnel mechanistic-kinetics, $M^{2+}$ refers to the metal ion; $NH_n$, $CH_n$, $Zn_n$ and $S_n$ refer to what are believed to be isomer 'debris' near the precursor site that are byproducts of the original rubber compounding process, and $OAC^{-2}$ refers to the acetate ion. The original tire vulcanization precursor, allylic hydrogen, scavenged by the MBTS amine group, previously described, forms reaction by-products. Nitrogen-sulfur compounds include ammonium disulfate $(NH_4)_2S_2O_8$ molecules (ADS), or radicals thereof, which reside and are compacted as debris isomers, proximate to the methyl carbocation. These nitrogen-sulfur isomers, which notably are not created during the final step of the original sulfidic-vulcanization at the primary carbocation of the sulfidic-crosslink upon the adjacent polymer chain, are highly soluble in water and become powerful oxidizers to drive the methyl carbocation substitution sulfidic-metathesis. The active OMC, a metal coordination complex, may either activate a hydration of the ADS molecule forming hydrogen peroxide $(H_2O_2)$ and/or become an accelerant to enhance that reaction in its targeted, metathesis action as an oxidizer in the methyl carbocation. The sulfidic-metathesis conversion rate at the methyl carbocation is assured without any peroxide and/or other oxidizer when the temperature threshold at the reaction site is greater than 240° F., above which the sulfur becomes labile in phase change. This may be induced by either a pressurized, phase change oscillation from water-to-vapor or a sudden, phase-space-cavitation implosion with bursts of hyper energy that result in a solid-to-liquid-to-solid phase change of both the sulfur and OMC compound at the methyl carbocation target site. To more fully appreciate the enormous energies released by the imploding cavitation cone, recent CERN studies on the subject have proposed that an electromagnetic plasma entanglement is formed during the pico-second deformation that is quite similar to the phenomena associated with the 300-times greater solar corona temperature as compared to the sun's surface. Following this analogy, for a 180° F. GTRP slurry, passing through the Phase Space Tunnel, the pinpoint, cavitation temperatures at the target methyl carbocation site would be expected to be, at a minimum, 54000° F. for a very brief moment.

While not wishing to be bound by any theory, it is believed that in the reaction, metal acetate ion dissociative substitution occurs at the methyl carbocation. This disrupts the vulcanization precursor, and the insertion forms a new functional site at the elastomer pendent structure for subsequent sulfidic bridge realignment. In the process, $O^{2-}$ is converted to $CO_2$ with a phase space particle charged carbon aggregate. Strong interactions between $M^{2+}$ and $S^{2-}$ form a precipitate, which liberates a rigid sulfidic bridge to a 'tether' state, bound only at the original allylic carbocation. Various metal ions are suitable for use, including but not limited to $Co^{2+}$ (ligand exchange rate for an $H_2O$ metal coordination matrix of $3\times10^6$), $Cu^{2+}$ (ligand exchange rate for an $H_2O$ metal coordination matrix of $5\times10^9$), $Ni^{2+}$ (ligand exchange rate for an $H_2O$ metal coordination matrix of $3\times10^4$), $Zn^{2+}$ (ligand exchange rate for an $H_2O$ metal coordination matrix of $2\times10^7$), and $Mn^{2+}$ (ligand exchange rate for an $H_2O$ metal coordination matrix of $2\times10^7$). Substantial data exists in literature that a copper based organometallic molecule can manifest up to a coordination number of ten (10) in a heated, water environment. This coordination capacity provides for the intermediate formation of a super-floppy matrix to assist the process by capturing a ligand from the inhibiting isomer 'debris' near the methyl carbocation reactive site. The ligand capture and release rates are many times faster than other metals as well. These impressive capabilities lead to the possibility that a variety of copper based, reaction isomers may be created from the heterogeneous maw of molecules present during the GTRP unpacking-metathesis sequence. By selecting an organometallic compound that exhibits a phase change at a temperature close to that of elemental sulfur, it may be possible to facilitate the metathesis reaction; however, organometallic compounds having different phase change temperatures can also be employed.

Figure 7A:
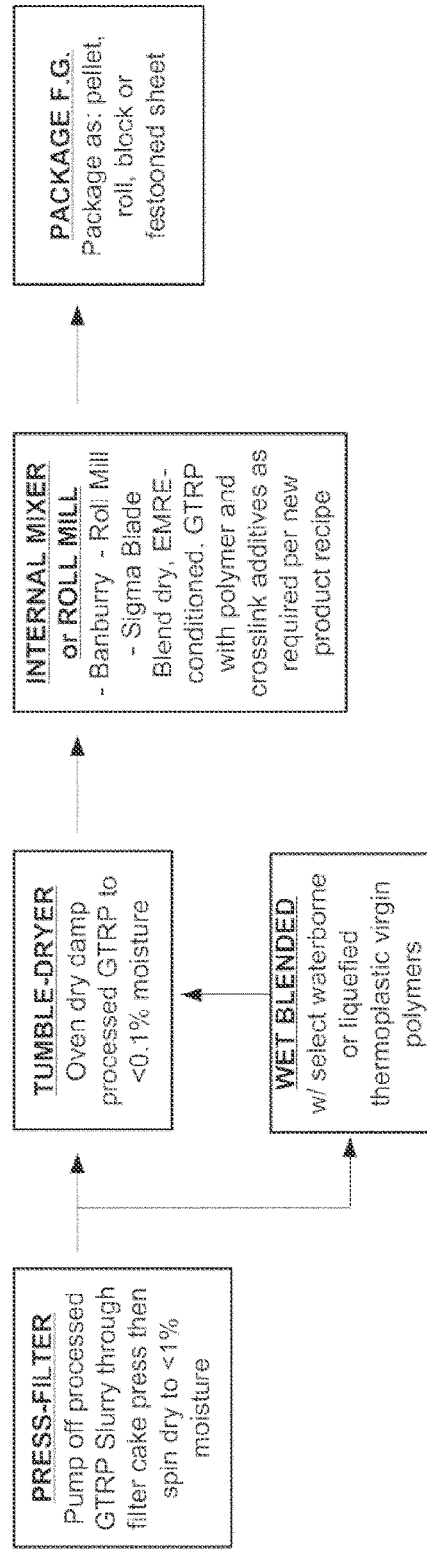
FIG. 7A depicts the morphology of ground state vulcanized GTRP, EMRE-conditioned GTRP, and a regenerated interpenetrating elastomer network of treated rubber.

In Element 7, fabrication of a monolithic, rubber macrostructure occurs. FIG. 7A depicts the macrostructure of ground state vulcanized GTRP (Stage 1), EMRE conditioned GTRP (Stage 2) including unbound, pre-reptated internal morphology, and regenerated interpenetrating elastomer network (Stage 3) which includes intermingled laminates spaced apart by 10 nm to 5 microns. One of the features of the process of the embodiments is that crosslinks are reestablished in the interpenetrating elastomer network by a gentle process that leaves carbon black undisturbed. This yields a slight reduction in tensile strength, but an improvement in rebound strength.

Figure 7B:
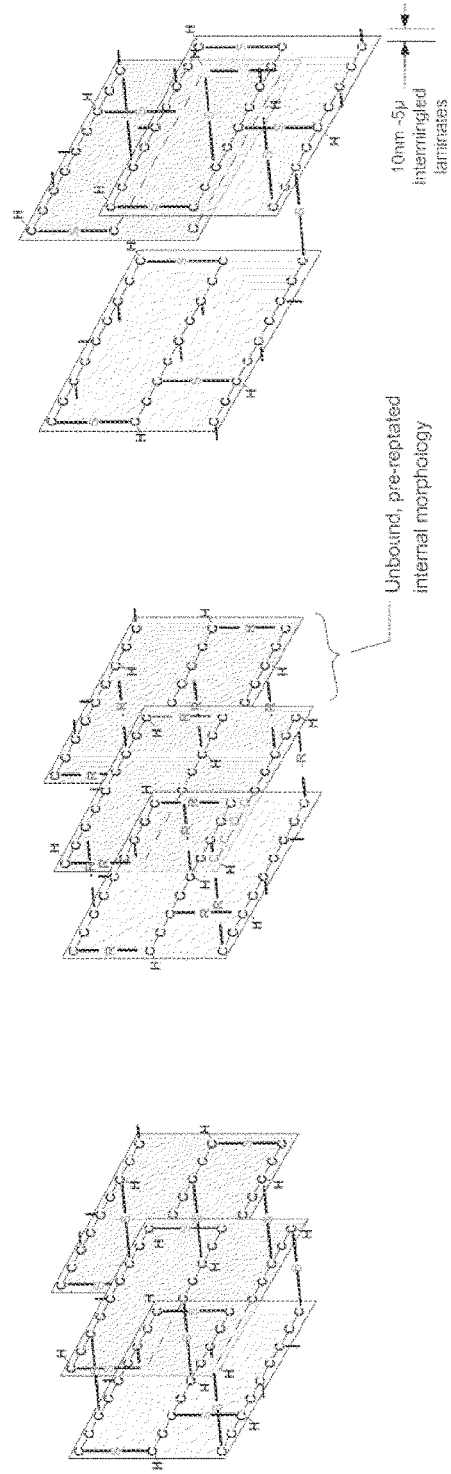
FIG. 7B provides a flowchart of fabricating a monolithic rubber macro structure including a regenerated interpenetrating elastomer network.

In the fabrication process, as depicted in FIG. 7B, the processed GTPR slurry is pumped off and through a filter cake press, the spin dried to a moisture content of less than 1% by weight. The resulting processed GTRP can be oven dried in a tumble dryer to a moisture content of less than 0.1% by weight to yield a dry, EMRE-conditioned GTRP. Between the press filter step and the tumble dryer step, select waterborne or liquefied thermoplastic virgin polymers can optionally be wet blended into the processed GTRP. The dried GTRP can be subjected to an internal mixer (e.g., a Banbury mixer, a sigma blade, or the like) and/or a roll mill for micro-laminate, where dry, EMRE-conditioned GTRP is blended with polymer and crosslink additives. The resulting product can then be packages as pellet, roll, block, festooned sheet, or the like. In certain embodiments, the processed GTPR slurry is a valuable product for use without any further processing steps. The GTRP can be mixed with asphalt to form rolls and sheeting, or melted to bind aggregate, or to form an emulsion. Similarly, product in any of the intermediate steps in Element 7, including press filtration, tumble drying, wet blending, internal mixing, and packaging can be a valuable product in its own right. Accordingly, any of the steps of Element 7 can be considered optional in various embodiments. It is noted that when a roll mill is employed, the resulting GTRP is 'leafed' into thin pancake-like structures that will form during subsequent vacuum forming, imparting anisotropic properties to the resulting GTRP sheet. When an internal mixer is employed, resultant sheets made therefrom are substantially isotropic.

A mixture of asphalt and GTRP can be prepared by various methods. As a first step, GTRP is run through a finishing roll mill until a 'leafed' or 'fully leafed-reptated' form is obtained (having, e.g., an approx. 10 µm or smaller particle thickness in the smallest dimension), and then roll-mill or internal mixer combined with asphalt. Typically, a cohesive GTRP sheet (indicative of a 'leafed' form) can be obtained after 10 passes through a finishing roll mill with cold rolls, or 2 passes through a finishing roll mill with hot rolls. Once a cohesive GTPR sheet is formed, it can be combined with asphalt. In one embodiment, asphalt is added to the cohesive GTRP sheet on the finishing roll mill, then mixed in by action of the finishing roll mill to yield a mixture of 92% by weight GTRP and 8% by weight asphalt in the form of a continuous GTRP/asphalt sheet. Type IV asphalt can advantageously be employed; however, an asphalt in a 5 pen to 200 pen range can also be employed. A crosslinking agent can optionally be added with the asphalt (e.g., 0.005 phr (parts per hundred) of the continuous GTRP/asphalt sheet). The sheet can advantageously be turned during the process to facilitate a uniform distribution. A cohesive GTRP sheet ('leafed') or continuous GTRP/asphalt sheet can be further combined as hot melt with asphalt in any form, e.g., particles, emulsion, or hot mix. Revulcanization can advantageously be accomplished after the GTRP/asphalt blend is in situ installed.

In paving applications, for example, a cohesive GTRP sheet or continuous GTRP/asphalt sheet can be melted into asphalt to yield a composition comprising from about 20-50% by weight GTRP, e.g., suitable for use as a binder for aggregate. In another example, the continuous GTRP/asphalt sheet can be applied in sheet form to a damaged pavement, then conventional hot mix, aggregate, or a mixture of aggregate and binder can be applied as a top layer on the continuous GTRP/asphalt sheet. Irradiation can advantageously be applied to induce crosslinking and binding of the GTRP. When employed in asphalt as a binder, or in an underlayment comprising a continuous GTRP/asphalt sheet, the GTRP can advantageously be cured in place on the road bed using an emitter system and associated apparatus and methodology as described in U.S. Pat. Nos. 8,992,118, 9,169,606, 9,074,328, 9,347,187, 9,481,967, 9,551,117, 9,551,114, 9,624,625, 9,637,870, 9,127,413, and 9,057,163, the contents of each of which are hereby incorporated by reference in their entireties. Such an emitter system for irradiating asphalt/concrete pavement typically includes a structural frame holding an emitter panel configured to emit a peak wavelength of radiation of from 1000 to 10000 nm to achieve flux of the asphalt in the asphalt/concrete pavement. The terms "flux" or "fluxing" as used herein are broad terms, and are to be given their ordinary and customary meaning to a person of ordinary skill in the art (and is not to be limited to a special or customized meaning), and refer without limitation to describe a fluid that is displaceable by application of minimal pressure against a body of the fluid. Temperatures in a range as high as 190° F. to 290° F. (88° C. to 143° C.), e.g., 250° F. to 290° F. (121° C. to 143° C.) can advantageously be employed to induce flux of asphalt. For irradiation of GTRP to induce crosslinking, radiation having a peak wavelength in a range of 350 nm to 700 nm peak can advantageously be employed, and can be used in addition to radiation having a peak wavelength of 1000 nm to 10000 nm (e.g., two peak wavelengths). Some degree of crosslinking will occur in the absence of the addition of crosslinking agents; however, additional crosslinking agents can boost the speed and efficiency of the process. It is noted that a temperature of 170° F. can induce crosslinking when DIBP is employed as a crosslinking agent, making it advantageous for use in GTRP/asphalt sheet where stability and controlled crosslinking is desired. When dicumyl peroxide is employed as a crosslinking agent, crosslinking will rapidly occur even the absence of applied heat. Dicumyl peroxide can be advantageously employed as a crosslinking agent when the GTRP/asphalt is in liquid form (e.g., emulsion). Paving material comprising GTRP exhibits superior properties in terms of longevity when compared to conventional paving materials including ground tire rubber that has not been subjected to any treatment.

The continuous GTRP/asphalt sheet can be used in the form of rolls and sheeting for weatherproofing or roofing applications. Alternatively, the cohesive GTRP sheet ('leafed') or continuous GTRP/asphalt sheet can be melted into asphalt or another solvent and the resulting mixture applied to a surface by spraying, yielding a sealed and waterproofed surface. The reactant in solid form can be preheated to a temperature of 250° F. (e.g., preferably above its melting point or ambient temperature ELT rubber crumb. For example, the reactant can be sprayed, misted, sprinkled, or poured into the ELT rubber crumb, optionally under agitation or mixing to achieve uniform coating and distribution of the reactant on the ELT rubber crumb, yielding an activated ELT rubber crumb. When added directly to the ELT rubber crumb, the reactant can advantageously be provided in the form of a finely ground powder. The combination of reactant and ELT rubber is then subjected to mixing, e.g., under pressure, so as to induce phase reticulation induced sulfidic metathesis. While crumb rubber and reactant can be combined as the sole ingredients of a combination to be subjected to mixing, other components can also be present, e.g., one or more of process oils, solvents, water, asphalts, fillers (titanium oxide particles, additional carbon black, graphene, pigments, or other dopants as disclosed elsewhere herein), or other components that are known in the art for incorporation into rubber goods or goods or materials containing rubber as a component. Roller mills, e.g., opposing pairs of cylindrical rollers, similar to those employed in conventional processing of rubber, can be employed as reactors for the phase reticulation induced sulfidic metathesis. The mixture is passed between rollers until a uniform product is obtained exhibiting resilience and/or elasticity. In certain of the embodiments as described herein, one of the signs of a successful reaction is a snapping or crackling sound as the mixture passes between the rollers. Typically, a successfully reacted product is obtained after passing the mixture between rollers (diameter of 1 cm or less to 100 cm or more and spacing of 1 mm or less to 10 mm or more) for from 10 revolutions or less to 100 revolutions or more of the roller, or for a period of time of from about 1 minut or less to 60 minutes or more.

In another embodiment, a solution or partial solution (suspension) of the reactant in water or another suitable solvent (e.g., an alcohol such as methanol or ethanol, or an ether or glycerol) or mixture of solvents is provided, which is then heated (e.g., to a temperature of 150° up to the boiling point of the solution or suspension) and added to the pre-heated ELT rubber crumb. The amount of water employed to prepare the solution can be selected to provide a particular ratio of solution to ELT rubber crumb. For the same amount of reactant, at a ratio of 2 parts by weight reactant solution to 1 part by weight ELT rubber crumb, an easily pumped slurry of activated ELT rubber crumb is obtained while at a ratio of 1 parts by weight reactant solution to 1 part by weight ELT rubber crumb a thicker slurry is obtained containing more concentrated reactant. By selecting an appropriate solution amount, equipment costs may be reduced, e.g., use of an agitator can be avoided, or throughput increased, e.g., continuous reactor configurations can be readily employed instead of batch reactor configurations. Water suitable for use can include typical municipal water, or distilled or deionized water; however, particulate levels at or below 100 ppm can be preferred in some embodiments. An advantage of employing the reactant in solution or suspension form includes efficiencies and greater ease of handling the resulting activated ELT crumb rubber, which can be in a flowable state or more processable state when worked in the reactor, which can reduce reactor time by up to 20% or more. While not wishing to be bound by any particular theory, it is believed that a solution of the reactant assists in wetting the shoreline of the ELT rubber crumb particles, thereby placing more reactant in contact with the surface of the ELT rubber crumb particles than is the case for dry reactant particles. Mechanical working by the reactor then acts to break up air pockets, further coating the ELT rubber crumb particles. At a reactor pressure of 80 to 100 psi, a steam phase is generated from the solution that gives a more uniform reaction than when dry reactant particles are employed. This enables reactor run times when a reactant solution is employed to be reduced by 50% or more compared to that for dry reactant particles, with the same degree of interlinked substitution achieved.

Figure 9:
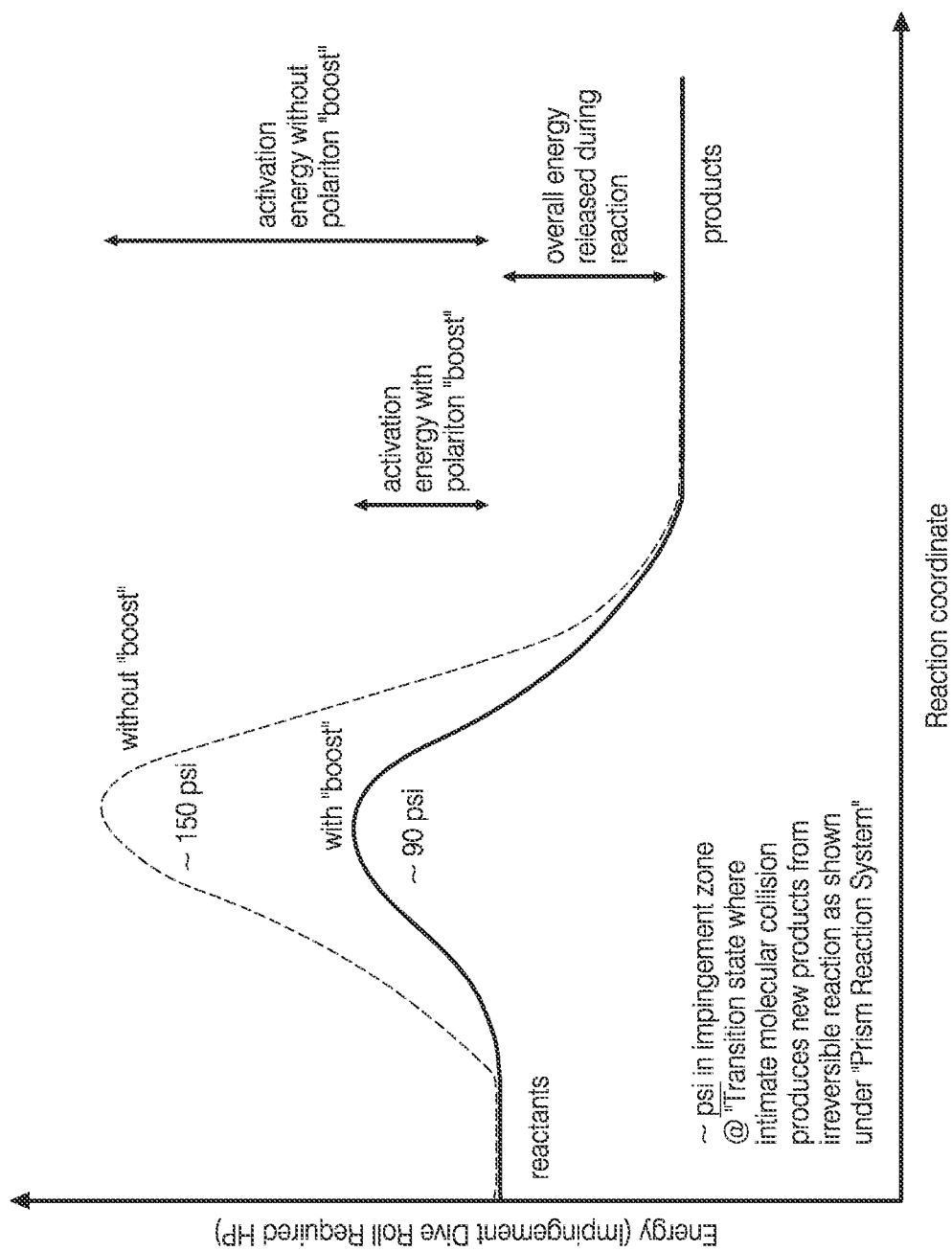
FIG. 9 provides graph of energy versus reaction coordinate for the interlinked substitution reaction both with and without impingement pressure applied.

The activated ELT rubber crumb (e.g., an admixture of crumb rubber, reactant, and optional additional components) in certain embodiments can be transferred to a reactor, e.g., a roller mill or a horizontal compression reactor. The reactor can be operated at ambient temperatures or temperatures up to 250° F. or higher, e.g., at a temperature of from 242° F. to 248° F. (or a higher or lower temperature, in certain embodiments, e.g., 225° F. to 265° F., or 235° F. to 255° F., or 240° F. to 250° F.), where it is kneaded or masticated to a gum-like state. Sampling of the kneaded product can optionally be conducted at intervals to determine particle size (e.g., effective particle size as represented by film thickness), wherein the particle size is believed to be indicative of the degree of sulfidic metathesis. Additional reactant can be titrated into the kneaded product until a desired particle size target is reached. FIG. 9 illustrates the effect of impingement of a horizontal compression reactor's drive roll on the activated ELT rubber crumb. As shown in the plot of energy versus reaction coordinate, the pressure applied in the impingement zone reduces the activation energy for interlinked substitution, such that the energy released during the reaction exceeds the activation energy required for interlinked substitution under impingement conditions.

A target particle size can be obtained by controlling the degree of sulfidic metathesis, e.g., by controlling the reactor processing time (shorter for larger particle sizes, and longer for smaller particle sizes), or by the amount of reactant added to the ELT rubber crumb. At 5% by weight reactant to 95% by weight ELT rubber crumb, an excess of reactant is present for the amount of sulfur bonds present in typical ELT rubber crumb. A stoichiometric amount of reactant can be employed when maximizing sulfidic metathesis. High degrees of interlinked substitution, e.g., >90% interlinked substitution, are typically observed when a mixture of 4 wt. % reactant to 96% ELT rubber crumb is employed. A mixture of 3 wt. % reactant to 97% ELT rubber crumb will leave a significant amount of sulfur bonds present. In certain embodiments it can be desired to maintain a certain degree of the original vulcanization (e.g., approximately half, or one quarter, of the sulfur bonds remain intact) so as to impart desirable properties to the resulting product (e.g., tenacity, elasticity, etc.) when employed in certain applications (e.g., black masterbatch for producing rubberized asphalt or specialty rubber products). In these applications, a mixture of 2 wt. % reactant to 98% ELT rubber crumb can employed. The resulting interlinked substituted rubber material exhibits good tenacity while having a particle size of <1 μm and can be blended homogeneously into a black masterbatch without impacting critical properties.

As a final step in the process when a reactant solution is employed, the product subject to sulfidic metathesis can optionally be subjected to a dehydration step by heating at or below 250° F. It is believed that the presence of micronized water in the activated ELT rubber crumb may inhibit metathesis of the sulfur bonds. Further heating at temperatures of 285° F. may remove this micronized water and achieve some further amount of sulfidic metathesis. Alternatively, a product containing some degree of water in it may be a desired end product, e.g., for processing at temperatures of 250° F. to 290° F.

Once the desired particle size target is reached, the kneaded or masticated product can optionally be treated with an agent that neutralizes any unreacted reactant. Any suitable neutralizing agent can be employed; however, it is typically preferred to employ a terminally hydroxylated polyethylene (e.g., polyethyleneglycol, CAS 25322-68-3) or a polyethylene copolymer with hydroxyallyl side chain functionality, or derivative thereof. The neutralizing agent is typically used at 0.05 to 0.1 parts neutralizing agent per hundred parts rubber (by weight); however, higher or lower amounts may also be employed in certain embodiments. Other post treatment processes can also be conducted, including any other processes that virgin rubber is subjected to, e.g., grafting to incorporate other polymeric chains to yield a thermoset, thermotrope or thermoplastic product.

The interlinked substitution process of the embodiments offers advantages for reclamation of rubber. For example, no outgassing or pH change is observed during the process or in the interlinked substituted product, which was in the form of sub-micron sized particles, indicating that a stable interlinked substituted product was obtained that is capable of vulcanization. The process offers advantages in that it does not utilize or generate any dangerous or hazardous chemicals, and in that no exogenous substances are generated that would significantly impact the usefulness of the resulting product in applications where virgin rubber is typically employed. Depending upon the application, a higher or lower degree of interlinked substitution may be desirable. For example, in uses such as outdoor carpet backing, roads and roofs, a lower degree of interlinked substitution (partial interlinked substitution) may yield an acceptable product, whereas for uses in high performance articles such as auto tires, a product having a higher degree of interlinked substitution may be desirable. The methods of the embodiments can be adapted to produce product that is partially interlinked substituted, up to highly interlinked substituted and similar in performance to virgin rubber.

Reactor Designs

Reactors as depicted in FIGS. 1, 8A-B, 10A-D, and 12A-C can advantageously be employed in certain embodiments.

Figure 10A:
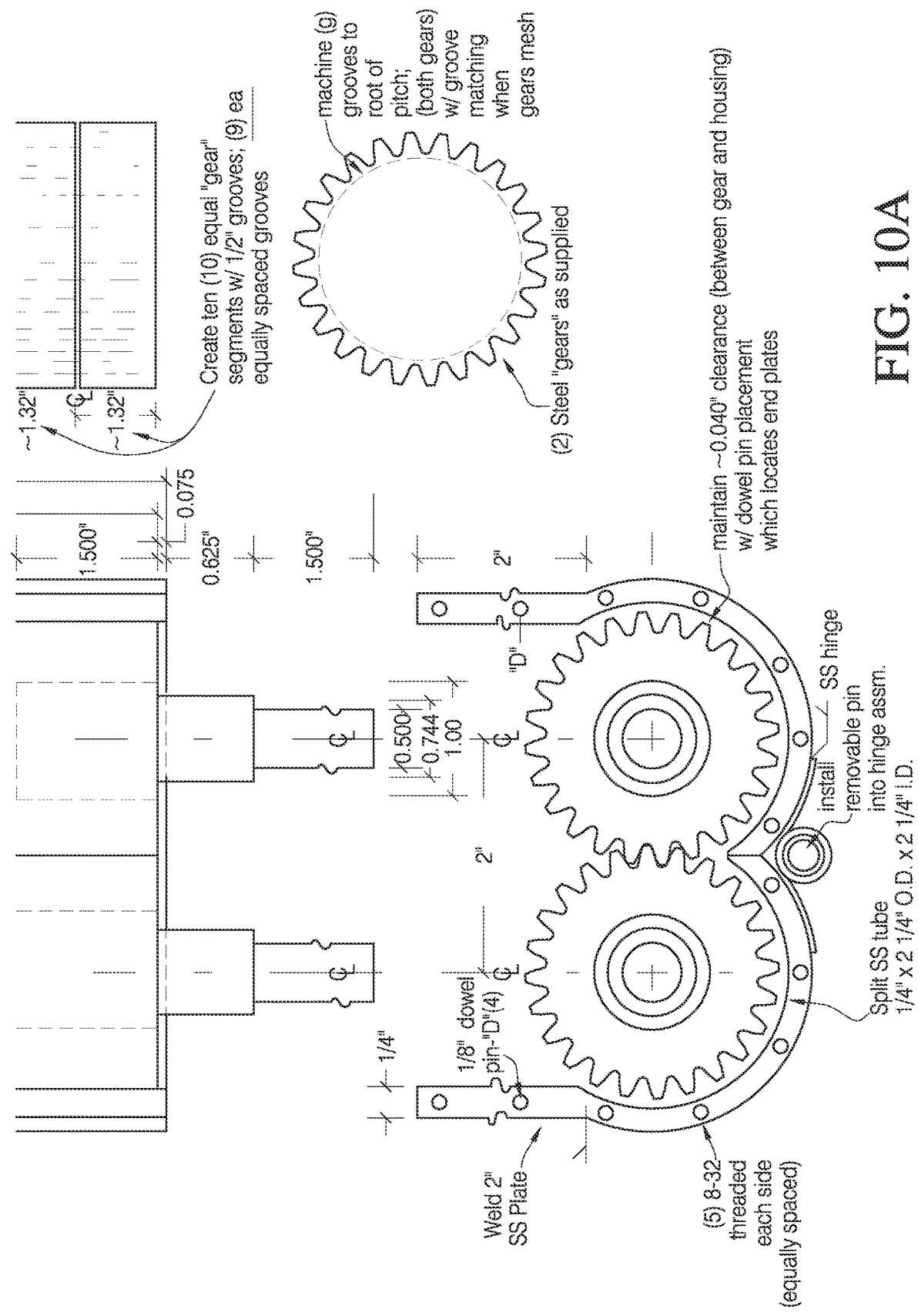
FIG. 10A provides a top view and end view of an embodiment of a horizontal compression reactor.
Figure 10B:
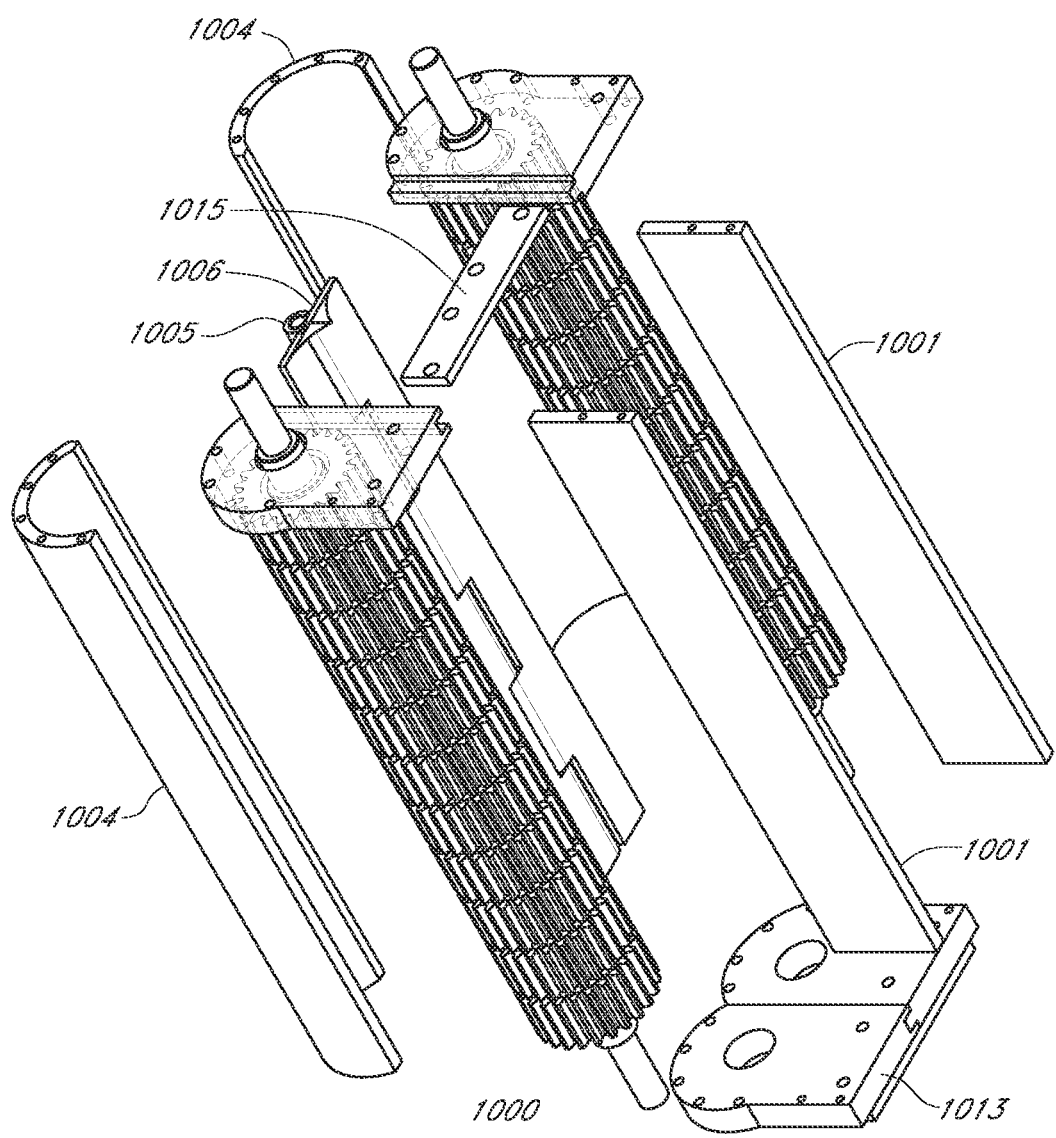
FIG. 10B provides an exploded view of the horizontal compression reactor of FIG. 10A.
Figure 10C:
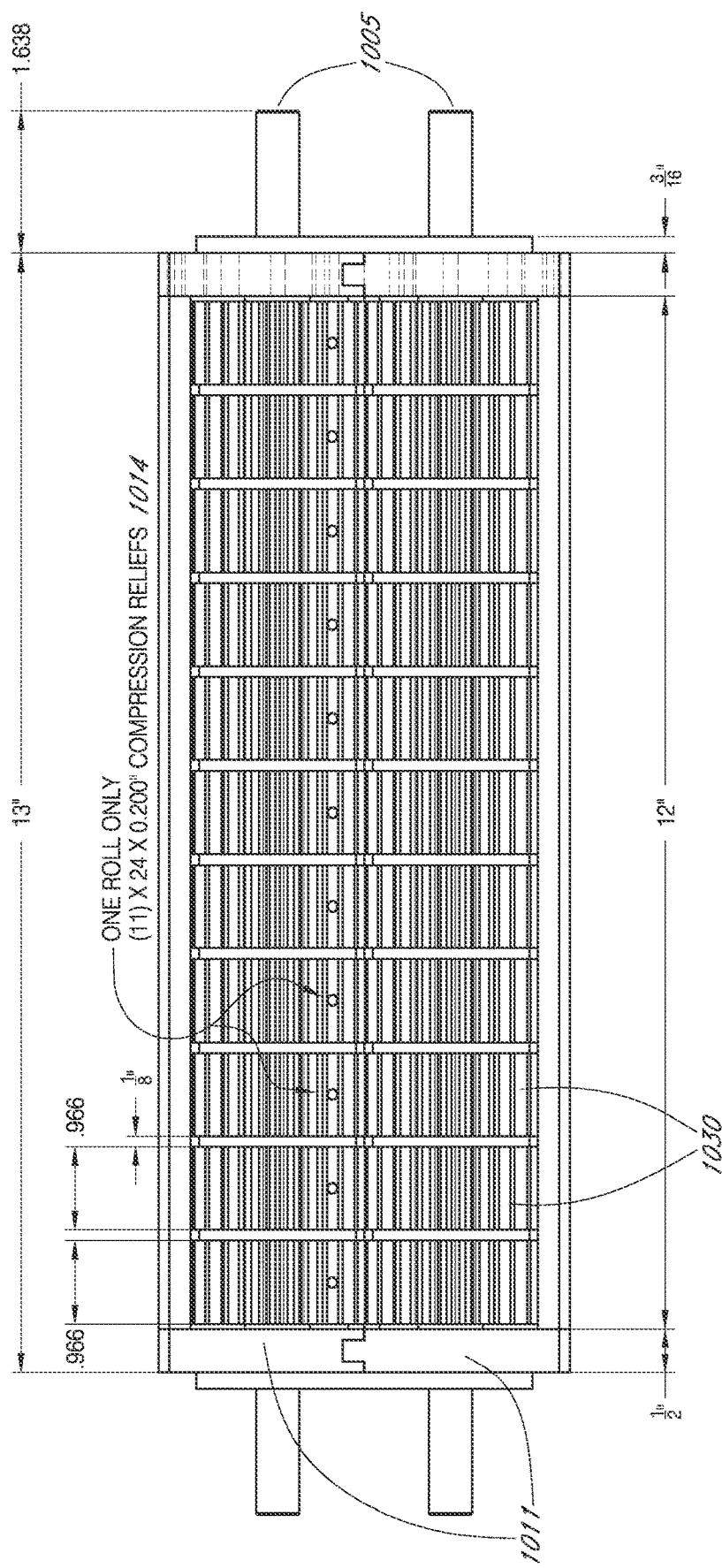
FIG. 10C provides a top view of the horizontal compression reactor of FIG. 10A.

For example, a horizontal compression reactor can be of the form depicted in FIG. 10A-D or 12A-C. FIG. 10A depicts a top view and a side view of a small scale reactor and its gears 1000. The gears as provided 1008 are steel and are machined to include machined grooves 1010 to the root of pitch. In operation, the grooves of both gears match when the gears mesh, and maintain ~0.040 inches of clearance 1007 (between the gear with dowel pin placement and the housing) which locates the end plates. Ten gear segments of equal length (e.g., one segment up to any desired plurality of segments, e.g., up to 10, 20, 30, 40, 50 or more) are employed with nine ⅛ inch grooves equally spaced. The number of grooves and the configuration or depth of the grooves can be adjusted depending upon processing conditions. The gears are placed in a split stainless steel tube 1004 having threaded holes 1003 and welded to stainless steel plates 1001 including dowel pins 1002. A removable pin 1005 fitted into a hinge assembly 1006 secures the apparatus for operation. FIG. 10B provides an exploded view of a horizontal compression reactor showing detail of the gears 1000 of FIG. 10A. The gears, as shown in top view in FIG. 10C include eleven sets of gear segments 1030 with twenty-four grooves 940 and a 0.200" compression relief 1014 for each gear segment. FIG. 10D shows a view of the end plates 1013 (and transparent view of endplates showing details of gear behind) including taps 1016 and plate 1015 including taps 1017. While the apparatus depicted in the figures can be employed to provide the pressure to the mixture of vulcanized rubber and copper acetate (or other reactant), other configurations are also envisioned, as will be appreciated by one of skill in the art, e.g., mortar and pestle, ribbon mixers, high shear dispersers, or the like. In one embodiment, instead of meshing gears, smooth rollers in opposing configuration can be employed. A reactor having a roller configuration is suitable for use in a "dry" process, e.g., a process not employing water or another carrier liquid. In contrast, FIG. 1 depicts a reactor suitable for use in a process employing water or another carrier liquid.

Figure 11:
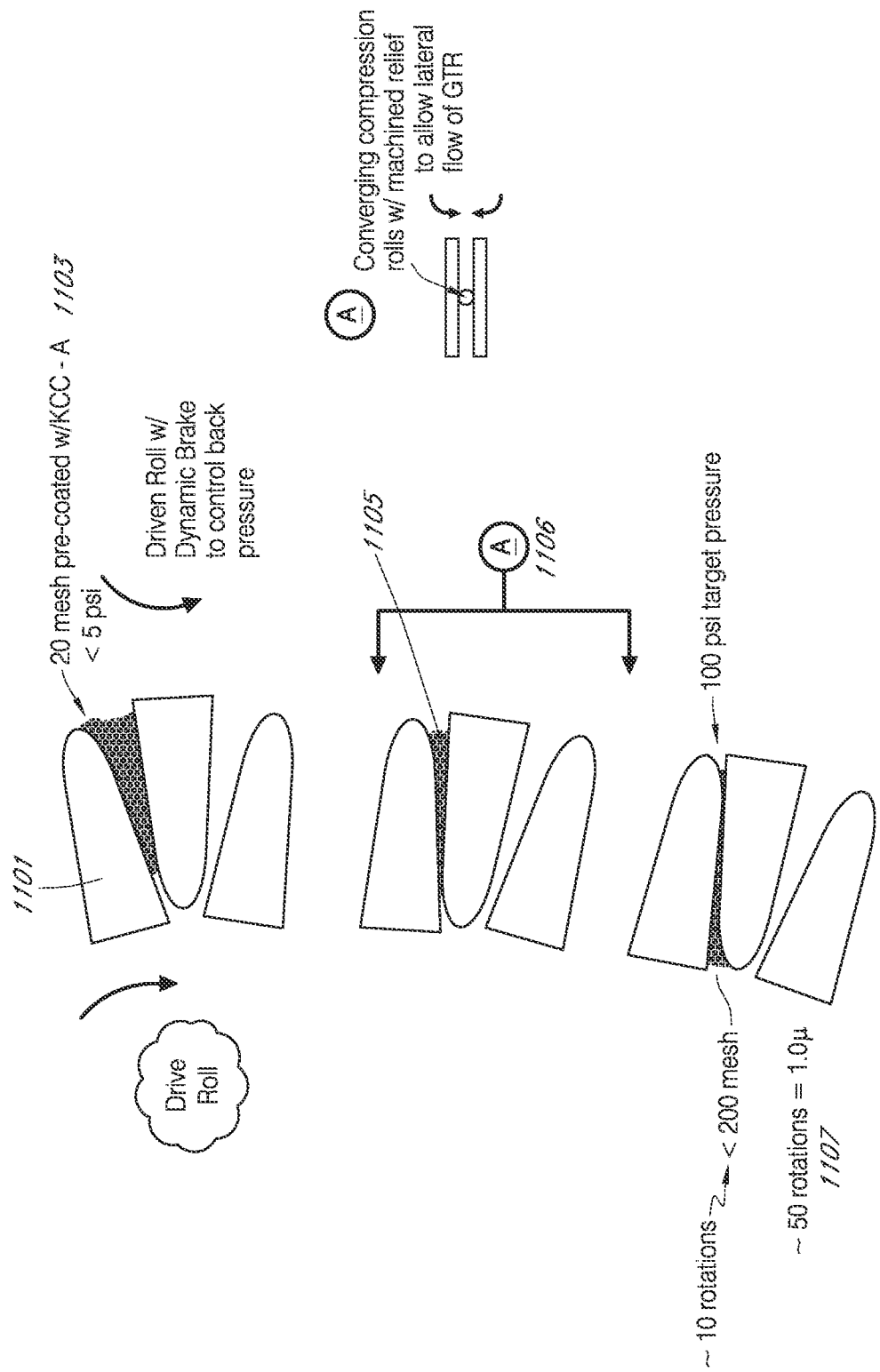
FIG. 11 provides schematics of the process of compressing pre-coated ELT rubber crumb in a horizontal compression reactor.

FIG. 11 depicts detail of the meshing gears of the drive roll in operation. The gears are converging compression rolls with machined relief to allow lateral flow 1106 of the ELT crumb rubber. A 20 mesh ELT crumb rubber pre-coated with reactant 1103 fills the space between the gears at a pressure of less than 5 psi. As the gears 1101 mesh, the pre-coated ELT crumb rubber 1105 is compressed to approximately 100 psi (e.g., 50 psi to 200 psi, or 75 psi to 150 psi, or 80 psi to 125 psi, or higher or lower, depending upon reaction conditions). Ten rotations of the gears (10 applications of compression) reduces the particle size (as determined by screening through a particular mesh size) from 20 mesh to less than 200 mesh 1107. Fifty rotations of the gears (50 applications of compression) reduces the particle size from 20 mesh to approximately 2 µm. The drive roll incorporates a dynamic brake to control back pressure. The resulting product can be processed until a desired particle size less than that of the starting ELT crumb rubber is obtained, e.g., 30 mesh, 40 mesh, 50 mesh, 100 mesh, 200 mesh, 10 µm, 5 µm, 2 µm, 1 µm, or less than 1 µm.

Figure 12A:
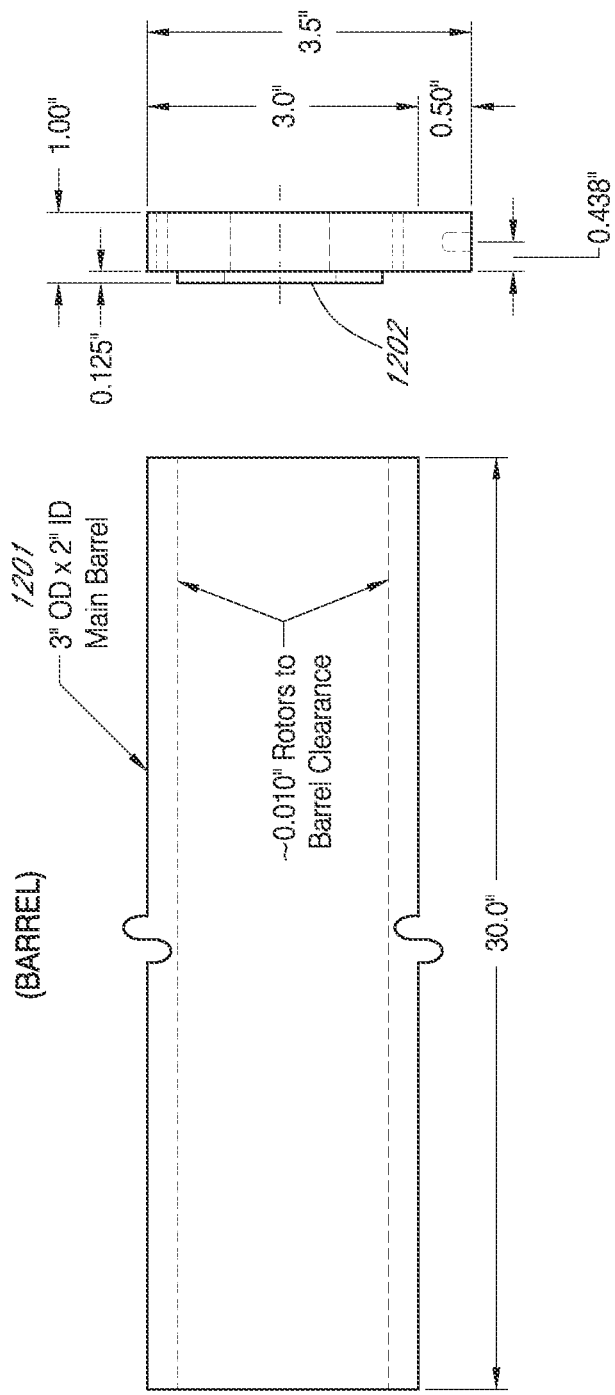
FIGS. 12A-C provide views of an embodiment of a micro-compounding reactor incorporating twin counter rotating screws.
Figure 12B:
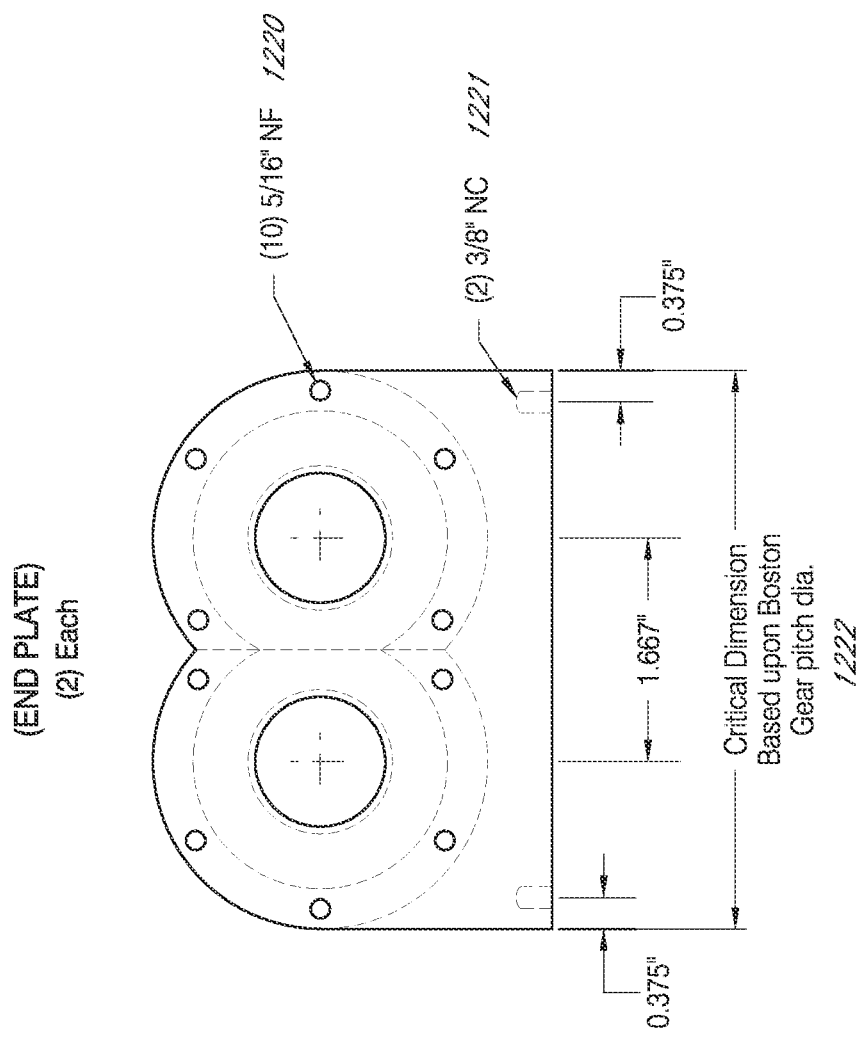
Figure 12C:
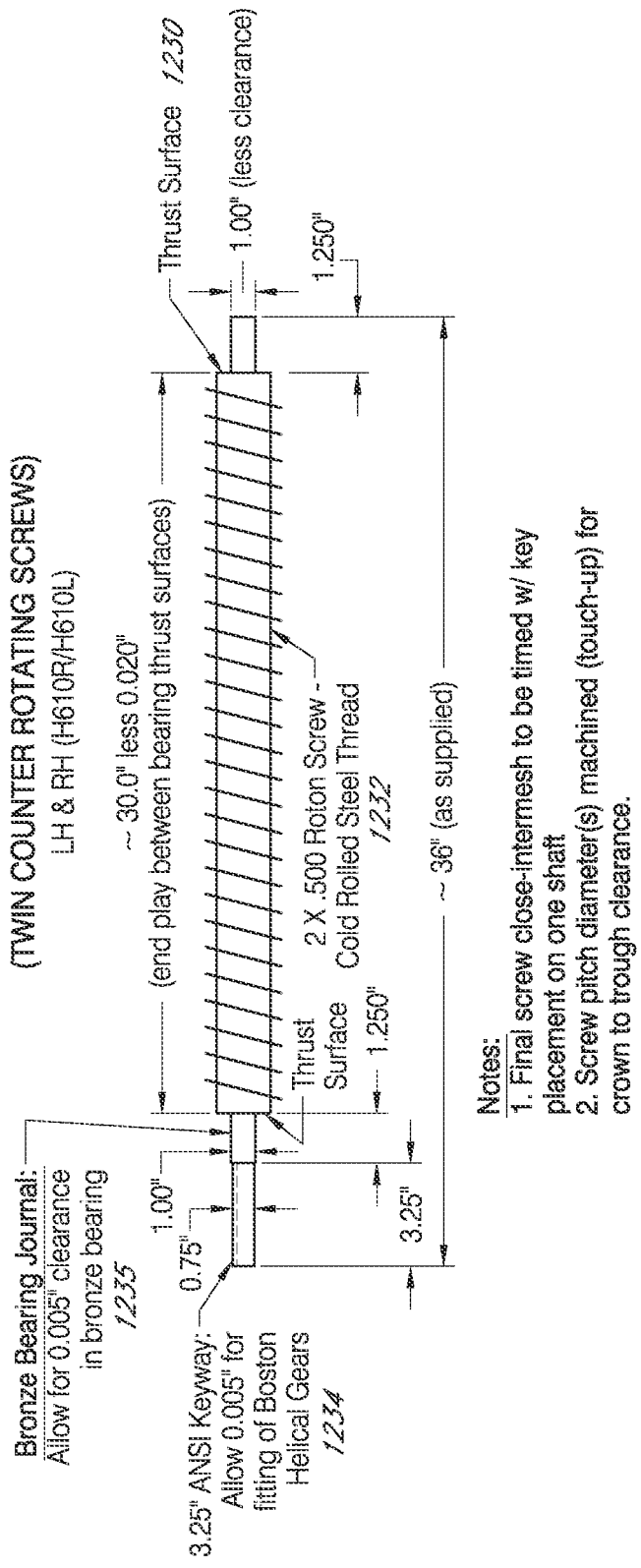

Another reactor design incorporates twin counter rotating screws. The twin screws are in a close intermesh configuration, and are situated in a pair of partial barrels joined together. FIG. 12A shows a side view of one of the barrels 1200. The barrel depicted has a 3 inch outer diameter and a 2 inch inner diameter, is 30 inches in length, and contains a rotor 1202. FIG. 12B shows one of the two end plates 1213 with hold holes 1220, 1221, illustrating the joined barrels configured to enclose the close-intermeshed twin counter rotating screws. The critical dimension 1222 is based upon the Boston Gear pitch diameter. A clearance of approximately 0.010 inches between the rotors of the screws and the barrel wall is provided. FIG. 12C depicts one of the screws, a 0.500 Roton Screw 1232 with cold rolled steel thread. FIG. 12C depicts thrust surface 1230, bronze bearing journal 1235, and ANSI keyway 1234. While the reactor depicted in FIGS. 12A-C includes specific dimensions or materials, the dimensions can be reduced or increased as needed to provide a larger or smaller reactor, and other suitable materials can be substituted.

Treated Rubber Product

The resulting rubber particulate can be used directly as a feedstock for a subsequent process (e.g., production of new tires or rubberized asphalt), stockpiled, or packaged for storage or shipment. The rubber particulate can be tested to determine its properties and suitability for various applications. Testing can include the following: standard test method for rubber property—vulcanization using rotorless cure meters—MDR 2000 rheometer per ASTM D5289 @ 160° C.; tension properties including tensile, elongation, and modulus per ASTM D412, unaged and oven aged; tear strength per ASTM D624 T, unaged and oven aged; durometer hardness tested with Rex digital durometer per ASTM D2240 Type A on rebound specimens; heat generation and flexing fatigue in compression of rubber—BF Goodrich flexometer per ASTM D623, Method A; resilience using Schob Type rebound pendulum—Zwick rebound per ASTM D7121; rubber abrasion resistance—Zwick rotary drum abrader per ASTM D5963, Method A; rubber deterioration-surface cracking and static outdoor exposure (20% strain) per ASTM D518, Method A or rubber deterioration-cracking in an ozone controlled environment per ASTM D1149.

The resulting rubber particulate is also of a quality suitable for use in house shingles and roll roofing, offering hail damage resistance, improved cold temperature flexibility (e.g., flexibility down to a temperature of at least −40° F.), and reduced softening, bleed out and staining in hot weather. The roll roofing containing rubber particulate can be placed dry and then subjected to irradiation, causing the sheet to melt, conform, crosslink, and adhere to an underlying substrate (e.g., insulation or old roofing). A liquid mixture containing GTRP can be subjected to irradiation to induce crosslinking. Irradiation can be applied using an emitter system similar to that described above for paving applications (e.g., U.S. Pat. Nos. 8,992,118, 9,169,606, 9,074,328, 9,347,187, 9,481,967, 9,551,117, 9,551,114, 9,624,625, 9,637,870, 9,127,413, and 9,057,163, the contents of each of which are hereby incorporated by reference in their entireties). Electromagnetic radiation of a preselected peak wavelength can be applied to the roofing or waterproofing sheet or spray in place. The heating radiation can be generated by modifying an emitter to emit a desired wavelength. The wavelength of the electromagnetic radiation used for heating is selected based upon the materials present in the roll roofing. Preferred peak wavelengths for targeting rubber in the roll roofing are in a range of 350 nm-700 nm peak wavelength at watt densities of, e.g., less than or equal to 10 watts/in$^2$. The radiated energy applied to the roll roofing heats the rubber in the roll roofing while minimizing heating of the substrate. The emitter device can be manufactured to minimize cost and are suitable for use in the field. Field use can be achieved by powering the device using a portable generator, e.g., a Tier 4 diesel engine, electrically connected to one or more emitter panels situated within a metal frame. The emitter can be insulated with, e.g., a high-density ceramic, and the panel(s) can be nested within the ceramic liner of a frame to point towards the plane of the roll roofing.

Drying of the post-reactor GTRP blend can be conducted to any desired degree. Moisture can be removed slowly or quickly. Gentle drying will have minimal impact on the structure of the elastomer network morphology. Drying with shear typically yields smaller particle size and quicker evaporation of moisture.

Curing of the post-reactor GTRP blend can be conducted slowly or quickly, by use of chemical curing agents, or by irradiation (e.g., by an emitter system as discussed elsewhere herein).

In some embodiments, it can be desirable to combine dried post-reactor GTRP with a solid polymer (e.g., virgin rubber) by dry blending, then subjecting to further processing to mix the components. Alternatively, a latex with a certified number of reactive sites can be combined with the post-reactor GTRP and subjected to further processing. Water can later be removed, e.g., by squeezing. Post-reactor GTRP can be modified for various uses, e.g., as a thermoplastic, thermotrope, or thermoset. The polymer backbones are predisposed for vulcanization. Because the post-reactor GTRP is hydrophobic, hydrophilicity is imparted to the material to permit it to be emulsified or formed into a colloidal suspension. Properties can be modified by adding a homopolymer to functionalize the backbones. To impart thermoset properties, the particles can be coated (e.g., with nonylphenol ethoxylate). To impart thermoplastic properties, hydrophilic sites can be inserted (e.g., with quaternary amine).

As discussed herein, subjecting GTRP to oscillation across the steam/water phase pumps liquid into the caverns of the particles. This can saturate the parties very quickly, e.g., less than one minute. During the reactor process, water can inundate the particle such that a large increase in free molecular space is observed, e.g., 500% or more, e.g., a five-fold increase. This results in a dried particle that can be described as "fluffy". Dried GTRP possess "caverns"— internal spaces (free molecular spaces) that can accommodate liquids. Application of shear forces to GTRP can collapse these caverns. When GTRP is provided as a colloidal suspension with a material to be mixed, the presence of caverns facilitates internalization of materials in a liquid in the caverns of the GTRP. Such materials can include waterborne polymers. This can result in superior polymer dispersion properties compared to conventional solid upon solid mixing as is the primary method of polymer blending in the tire industry, for the resulting particle, e.g., superior tensile strength, hysteresis, and shear. An improvement in physical strengths of 200-300%, or more, from what is observed in rubber typically utilized in the tire industry can be observed.

Based upon physical property analysis of samples composed of post-reactor GTRP blends with small quantities of virgin, styrene, 1,4-cis polybutadiene polymer, greater than approximately 80% crosslink density, as compared to a virgin, tire-grade, black master batch compound, can be regularly achieved using a dicumyl peroxide (DCP) catalyst cured for two hours at 240° F. DCP provides reactive cross linking below 240° F. but curing temperatures above that threshold liquefies the tethered sulfuric chain such that its labile state will more efficiently complete the re-alignment. Another effective accelerator is di(tert-butylperoxyisopropyl)benzene (CAS No. 25155-25-3, also referred to as DBPI).

Silicone rubber (SiR), grafted with a 1,2-high vinyl butadiene homopolymer functionality, may be cross linked with mercapto group catalyst. Such blends will result in high crosslink densities and uniform, elastomer, interpenetrating domains which exhibit superior, hybridized properties known to both rubber groups. An NR/SBR black master batch SiR hybrid, using a regenerated EOL particle is a new, cost effective innovation.

In another embodiment, GTRP particles are size reduced and crosslink realigned in an anhydrous environment. In one embodiment, the reactants are combined under ambient conditions or conditions of elevated temperature, e.g., approximately 250° F. (e.g., 230° F. to 270° F., or 240° F. to 260° F., or 245° F. to 255° F.) in a three shaft vertical mixer, a roller mill, an extruder, a Banbury mixer, or other suitable mixing apparatus. The reactant (e.g., copper acetate or other metal salt as described herein) in solid form is preheated to a temperature of 250° F. (e.g., preferably above the metal salt's melting point, e.g., up to 250° F. or more, e.g., 230° F. to 270° F., or 240° F. to 260° F., or 245° F. to 255° F.) in a separate vessel under inert atmosphere (e.g., nitrogen blanket) then added to the crumb rubber, or added directly to the crumb rubber under ambient conditions. In certain embodiments, the inert atmosphere can be optional. The heated reactant is combined with the pre-heated EOL tire rubber crumb. For example, the heated reactant can be sprayed, misted, or poured into the pre-heated EOL tire rubber crumb under agitation to achieve uniform coating and distribution of the reactant on the pre-heated EOL tire rubber crumb, yielding an activated EOL tire rubber crumb. When added directly to the pre-heated EOL tire rubber crumb, the reactant can advantageously be provided in the form of a finely ground powder.

In certain embodiments it can be advantageous to subject materials comprising the PTR material of the embodiments to irradiation using an emitter as described in U.S. Pat. Nos. 8,992,118, 9,169,606, 9,074,328, 9,347,187, 9,481,967, 9,551,117, 9,551,114, 9,624,625, 9,637,870, 9,127,413, and 9,057,163, the contents of each of which are hereby incorporated by reference in their entireties. While in certain embodiments an elongated (e.g., coiled, straight, tubular, or other structures in a waveguide pattern) semiconductor (e.g., silicon carbide, non-oriented carbon fiber, doped boron nitride) or resistance conductors (e.g., iron-nickel) can be employed in the emitter, in a particularly preferred embodiment the panels include a serpentine wire as an emitter. An advantage of the serpentine configuration is that it does not have the high resistance exhibited by spaced apart coils. Accordingly, more of the energy is emitted as radiation of the desired wavelength. The coils are spaced apart to minimize the resistance, and a radiant energy is emitted within a "sandwiched" space bounded on the upper side of by the high-density ceramic that has a very low permittivity and essentially redirects the reflected energy from the serpentine wire downward.

On the lower side of the wires, which can advantageously be embedded in a support or be self-supporting, is a thin micaceous panel. The mica group of sheet silicate (phyllosilicate) minerals includes several closely related materials having close to perfect basal cleavage. All are monoclinic, with a tendency towards pseudohexagonal crystals, and are similar in chemical composition. The nearly perfect cleavage, which is the most prominent characteristic of mica, is explained by the hexagonal sheet-like arrangement of its atoms. Mica or other materials exhibiting micaceous properties can include a large number of layers that create birefringence or trirefringence (biaxial birefringence). Birefringence is the optical property of a material having a refractive index that depends on the polarization and propagation direction of light. These optically anisotropic materials are said to be birefringent. The birefringence is often quantified by the maximum difference in refractive index within the material. Birefringence is also often used as a synonym for double refraction, the decomposition of a ray of light into two rays when it passes through a birefringent material. Crystals with anisotropic crystal structures are often birefringent, as well as plastics under mechanical stress. Biaxial birefringence describes an anisotropic material that has more than one axis of anisotropy. For such a material, the refractive index tensor n, will in general have three distinct eigenvalues that can be labeled $n_\alpha$, $n_\beta$ and $n_\gamma$. Both radiant and conductive energy from the serpentine wire is transmitted to the micaceous element. The birefringent characteristics of the micaceous material can be employed to transmit a subset of wavelengths generated by the serpentine wire while filtering out other wavelengths. The emitter of certain embodiment employs a sheath of stainless steel that protects the micaceous material from being damaged. This conductive sheath transfers energy with no significant wavelength translation. By employing this combination of components (e.g., serpentine wire, micaceous material, stainless steel sheath), energy generated by the serpentine wire with a peak wavelength of about 2 micrometers can have the peak wavelength be taken to about 20 micrometers. The thickness or other characteristics of the micaceous material can be adjusted to provide a targeted wavelength or range of wavelengths to the surface.

In one embodiment, the device has a 2-foot wide by 1-foot long intercavity dimension, configured similar to a hood, in which a ceramic insulation is mounted. The emitter elements are advantageously 1 foot by 1 foot, or otherwise sized for convenience (e.g., the width of the roll roofing, or a standard width used in building construction, e.g., 16 inches). Such elements can have a Watt density of up to 14 Watts per square inch, at full energy, capable of being powered by, e.g., a generator that can deliver 250 kW. In some embodiments, an emitter assembly may comprise a structural frame, a power source, a power interrupting mechanism, an electromagnetic radiation emitter, and a positioning system. The emitter assembly may be several feet wide, several feet long, and several feet high, or smaller so as to permit use by a single operator (e.g. a small emitter in a rolling frame that can be pushed by the operator, or installed at the end of a wand or arm). The emitter assembly may be other sizes as well. The frame may support one or more of the other components.

The frame may comprise structurally adequate members such as metal supports, beams, rails, or other such structures. The frame may be configured to prevent significant deformation when in use or in transport or use on a job site. The frame may be designed to support at least part of the weight of the various components. In some embodiments, the frame comprises one or more beams. The beams may comprise a metal, wood, or other material that can adequately support the weight of the components. The beams may comprise aluminum or steel, and in some embodiments it may be advantageous to use a material that is both lightweight and strong. One or more beams may be disposed on either side of the frame and on either end of the frame. The beams on the side may be connected vertically through brackets, plates, or other attachment mechanisms. The pieces may be welded together, or bolts may be utilized to connect the pieces. One or more beams may traverse the frame from one side to the other side, or from front to back, and may be configured to provide support or an attachment mechanism to other components. One or more beams that traverse the frame may be disposed near the bottom of the frame, such that one or more of the electromagnetic radiation emitters may be attachable to the beams. The frame may attach to one or more wheels, directly or indirectly, which may assist the frame in being transported or moved across the roll roofing to be heated.

In some embodiments the frame may be configured to prevent bending, sagging, or twisting even while traversing uneven terrain. The frame may provide a robust structure that supports one or more components of the assembly. Because the assembly may be used in a variety of environments, it may be advantageous for the frame and assembly to be resistant to deformation and deterioration when in transport and in use. For instance, the assembly may be used on roofs that are uneven. It may be advantageous for the frame to withstand transport over an uneven surface. As another example, the frame and assembly may be used in the outdoors in remote locations. It may be advantageous for the frame and assembly to not only be resistant to damage during the transport to the remote location, but also for the frame and assembly to be resistant to the effects of weather while at that location. Even during adverse conditions and extensive travel and transport, it may be advantageous for the bottom surface of the frame to remain a generally consistent distance from a roll roofing over which the assembly may be placed. Therefore, the frame may be sufficiently robust and resistant to deformation or damage in a variety of conditions.

Rubber, e.g., ground tire filler or the PTR material as described herein, is a high energy-absorbing material. If it absorbs too much energy too quickly, it will become a source of combustion and can damage the emitter unit or emit fumes into the atmosphere. Accordingly, in some embodiments it is desirable to include a feedback loop on the emitter panel so as to continuously monitor the power density at the emitter's particular setting and its effect on the roll roofing.

Exemplary Uses

The interlinked substituted rubbers produced according to the methods of the embodiments can be employed in applications that utilize virgin rubber, as well as applications that employ recycled rubber, e.g., crumb rubber, or would benefit from a partially vulcanized/partially interlinked substituted rubber product. By controlling the degree of interlinked substitution, a rubber product having a desired set of properties (e.g., hardness, spreadability, solubility, ability to be grafted, particle size, etc.) can be produced. For example, in certain embodiments it is desirable to reduce the particle size of crumb rubber, e.g., as obtained from end-of-life tires or other sources of vulcanized rubber. The methods of the embodiments provide an efficient and cost-effective way of reducing average particle size of the crumb rubber, e.g., compared to cryogenic methods, use of centrifuges, etc.—an advantage separate from any reactive or other properties imparted by chemical modification of the rubber polymer.

Rubberized Asphalt

One exemplary use of the rubber materials of the embodiments is as an additive or functionalizing agent for asphalt, e.g., as employed in paving, roofing, or coating.

Asphalt pavement suffers from oxidative hardening over time. This oxidative hardening causes cracking of the pavement, potholes, and loose gravel on the surface. The addition of rubber, such as crumb rubber from recycled automobile tires, to an asphalt binder, substantially reduces the rate of oxidative hardening of asphalt pavement and increases the useful life of a road. This asphalt-rubber mixture is typically referred to as asphalt-rubber binder (ARB).

ARB and aggregates are typically mixed together and spread onto road surfaces to form asphalt pavement. Because prior art ARB is highly temperature sensitive, it can be applied to roads only under certain surface temperature and weather conditions. This in turn limits road paving activities to only a few months of the year in most regions of the country. Additionally, special heating/blending equipment are often required at job sites to keep the mixture free flowing and homogeneous. In some cases, additives are added to asphalt-rubber hot mix material to reduce segregation, crusting, or lumping of the crumb rubber. These additives, however, could have detrimental effects on other properties of the mixture. Thus, there is a current need for an improved ARB system that is less sensitive to environmental conditions and can be easily applied to surfaces without requiring expensive or complex equipment or additives to keep the mixture free flowing and homogeneous. The methods and compositions of the embodiments provide an interlinked substituted rubber that is suited for use in high-performance ARB systems.

Emulsification of asphalt-rubber binder for pavement preservation systems has been considered by many as not achievable because of the difficulties in emulsifying a mixture containing crumb rubber and asphalt. For example, asphalt-rubber binder normally may not readily be emulsified because the rubber particles disrupt the laminar flow of the asphalt-rubber matrix during mixing in a colloidal mill. The present methods and interlinked substituted rubber of the embodiments overcome these difficulties by pre-compounding the interlinked substituted rubber in a manner so as to facilitate dispersion in the final emulsion. In some embodiments, the pre-compounding may eliminate disruption of the laminar flow which may occur when emulsifying a binder by means of a colloidal mill. While not limiting any embodiment by theory, it is believed that during mixing, the interlinked substituted crumb rubber is substantially homogenized into the asphalt droplets of the asphalt emulsion, thus forming a smooth and uniform emulsion of asphalt-rubber binder.

In some embodiments, finely ground tire rubber that has been subjected to the process of the embodiments is immersed in an asphalt to form a hot rubber adhesive. For example, some methods comprise immersing, under steady stirring, a finely ground tire rubber (crumb rubber) subjected to interlinked substitution and about 80-140 mesh in size, in a waterless, up to about 350° F. polymer modified asphalt, whereby the interlinked substituted ground tire rubber swells and reacts thereby "coating" the individual interlinked substituted crumb rubber moiety to form a hot rubber adhesive. The reacted hot rubber adhesive may then be compounded under high shear with an asphalt emulsion and can be formulated as a coating, sealing and/or adhesive. The resulting asphalt rubber emulsion will cure quickly to a non-tracking, water resistant asphalt rubber binder or surfacing element with superior resistance to oxidative hardening, weather or mechanical wear. It may also be formulated to cure at non-traditional winter temperatures down to 40° F. and at night time. The resulting asphalt-rubber binder emulsion has improved adhesion, cohesion, early green strength, and water resistance when employed in ambient cured, structural waterproofing and pavement preservation systems.

Some of these methods comprise treating the interlinked substituted crumb rubber with an asphalt composition to form an asphalt coated interlinked substituted crumb rubber composition, and then mixing the asphalt coated interlinked substituted crumb rubber composition with an asphalt emulsion to form an emulsified asphalt-rubber binder. A variety of asphalt emulsions may be used to provide emulsions of asphalt-rubber binder. For example, in some embodiments, an asphalt emulsion may be a product of mixing a first asphalt with water and a surfactant to form a first emulsion. With respect to the makeup of an asphalt emulsion, an asphalt emulsion may preferably comprise a first asphalt, a surfactant, and water.

A variety of asphalt-coated crumb rubber compositions may be used to provide emulsions of asphalt-rubber binder. For example, an asphalt-coated interlinked substituted crumb rubber composition may be a product of mixing a plurality of interlinked substituted crumb rubber particles with an effective amount of a second asphalt to coat the particles, wherein the second asphalt has caused the particles to swell. While the makeup of the asphalt-coated interlinked substituted crumb rubber composition varies, one example may include a plurality of interlinked substituted crumb rubber particles and a second asphalt, wherein the particles are substantially coated with the second asphalt, and the particles have swelled in the presence of the second asphalt.

Thus, one method for preparing an emulsion of an asphalt-rubber binder comprises: mixing a first asphalt emulsion with an asphalt-coated interlinked substituted crumb rubber composition to provide an emulsion of an asphalt-rubber binder; wherein the first asphalt emulsion is a product of mixing a first asphalt with water and a surfactant to form a first asphalt emulsion; and wherein the asphalt-coated interlinked substituted crumb rubber composition is a product of mixing a plurality of interlinked substituted crumb rubber particles with an effective amount of a second asphalt to coat the particles, and wherein the second asphalt has caused the particles to swell.

Another aspect relates to a method for preparing an emulsion of an asphalt-rubber binder comprising: mixing a first asphalt emulsion with an asphalt-coated interlinked substituted crumb rubber composition to provide an emulsion of an asphalt-rubber binder; wherein the first asphalt emulsion comprises a first asphalt, a surfactant, and water; and wherein the asphalt-coated interlinked substituted crumb rubber composition comprises a plurality of interlinked substituted crumb rubber particles and an effective amount of a second asphalt to coat the particles, the particles are substantially coated with the second asphalt, and the particles have swelled in the presence of the second asphalt.

Some methods for preparing an emulsion of an asphalt-rubber binder comprise: mixing a first asphalt with water and a first surfactant to form a first emulsion; mixing a plurality of interlinked substituted crumb rubber particles with an effective amount of a second asphalt to coat the particles to provide an asphalt-coated interlinked substituted crumb rubber composition, and allowing the particles to swell; and mixing the first asphalt emulsion with the asphalt-coated interlinked substituted crumb rubber composition to provide an emulsion of an asphalt-rubber binder.

Some embodiments provide an emulsion of an asphalt-rubber binder prepared by a process described herein. Another aspect relates to an emulsion of an asphalt-rubber binder comprising: an asphalt; interlinked substituted crumb rubber, representing about 30% to about 50% of the total weight of all non-volatile components of the emulsion, which has swollen in the presence of the asphalt; a cationic surfactant; and water; wherein the emulsion is stable at a pH below about 7.

Also provided is an asphalt emulsion comprising: an asphalt having a pen value of from about 0 dmm to about 30 dmm; an amido amine surfactant, an ammonium salt thereof, or a combination thereof; and water, representing about 30% to about 50% of the weight of the emulsion.

Some embodiments provide an asphalt-coated rubber composition comprising: an asphalt; interlinked substituted crumb rubber; and an amount of a cationic surfactant which is effective to increase the hydrophilicity of the composition as compared to a composition which is identical except that it has no added cationic surfactant.

In one embodiment, the invention provides a process for preparing an asphalt-rubber composition that meets the definition for asphalt rubber binder set forth in ASTM D8-02 or deviations thereof which may be established by the specifying agency from time to time. In a preferred embodiment, this process provides an asphalt-rubber binder as an emulsion. The process generally comprises obtaining asphalt of different penetration grades, combining the asphalt of each grade with preselected chemicals to form separate premixed components, blending the premixed components together under predetermined conditions to form, upon curing, an asphalt-rubber composition that meets certain physical requirements for asphalt-rubber binder, such as those set forth in ASTM D8-02. Advantageously, the resulting asphalt-rubber composition not only meets the physical requirements of ARB used in road paving but also has improved dispersion of the rubber, such as dispersion of the rubber in an oil-in-water emulsion of an asphalt.

These asphalt-rubber compositions may also be used as a binder, coating, sealant, adhesive, or a combination thereof, and may be adapted for road paving, roofing, and other related applications. For example, in certain embodiments, an asphalt-rubber binder composition or and asphalt-rubber binder emulsion may be used as a HMA primer, SAMI primer, SAMI (stress absorbing membrane interlayer) chip binder, rejuvenating sealer, fog seal, skid resistant traffic lane sealant-surface binder, seal coat binder, ISSA (International Slurry Surfacing Association) Type I, Type II, or Type III Micro slurry binder, or cold mix adhesive inclusive of RAP, D1227 Type III B roof membrane, submerged membrane liner, flashing cement, steel or concrete pipe coating, waterproofing mastic(s), and the like, or a combination thereof.

In a preferred implementation, asphalt of three different penetration grades are selected, which includes a hard asphalt, preferably having a pen value of between about 0 dmm and about 50 dmm, or between about 0 dmm and about 90 dmm; a medium asphalt, preferably having a pen value of between about 90 dmm and about 200 dmm or between about 150 dmm and about 200 dmm; and a soft asphalt, preferably having a pen value of between about 200 dmm and about 300 dmm. The hard asphalt is preferably mixed with certain surfactants and water to form a hard pen asphalt emulsion. The soft asphalt is preferably modified by a polymer and then mixed with certain surfactants and water to form a soft pen-polymer modified asphalt emulsion. The medium asphalt is preferably mixed and reacted with interlinked substituted crumb rubber at about 350° F. to form an asphalt-rubber blend and then combined with a certain surfactant and optionally water to form a mastic. The hard pen asphalt emulsion, soft pen-polymer modified asphalt emulsion, and mastic are then subsequently blended at different ratios to form a variety of waterborne asphalt-rubber composition(s). In one implementation, the hard pen asphalt emulsion and soft pen-polymer modified asphalt emulsion are first mixed together to form an emulsion pre-blend, which is subsequently blended with the mastic to provide a substantially homogeneous, free flowing waterborne asphalt-rubber emulsion blend that can be applied to road surfaces at various temperatures. The interlinked substituted crumb rubber mastic may be dissolved or dispersed in any phase of the waterborne composition. For example, the rubber mastic may be a separate solid phase dispersed in the one or more liquid phases of the emulsion, the rubber mastic may be a separate liquid phase dispersed in one or more of the liquid phases of the emulsion, or the rubber mastic may be dissolved into one or more of the liquid phases of the emulsion. In certain preferred embodiments, the cured final compound conforms to the rubber/asphalt ratios prescribed by ASTM D6114-97 to provide a suitable asphalt-rubber binder for asphalt pavement. In another embodiment, this asphalt-rubber emulsion blend is mixed with aggregate at about 32° F. to about 100° F. or about 130° F. to provide an asphalt pavement. Some asphalt-rubber binder emulsions may be capable of curing during the winter or at night. For example, some asphalt-rubber binder emulsions may fully cure at temperatures as low as about 40° F. to about 32° F.

In another embodiment, a waterborne asphalt-rubber binder composition is provided. This composition may be used as a binder, coating, sealant, adhesive, or a combination thereof, and may be adapted for road paving, roofing, and other related applications. For example, in certain embodiments, an asphalt-rubber binder composition or and asphalt-rubber binder emulsion may be used as a HMA primer, SAMI primer, SAMI (stress absorbing membrane interlayer) chip binder, rejuvenating sealer, fog seal, skid resistant traffic lane sealant-surface binder, seal coat binder, ISSA (International Slurry Surfacing Association) Type I, Type II, or Type III Micro slurry binder, or cold mix adhesive inclusive of RAP, D1227 Type III B roof membrane, submerged membrane liner, flashing cement, steel or concrete pipe coating, waterproofing mastic(s), and the like, or a combination thereof. In one implementation, the composition comprises asphalt; interlinked substituted crumb rubber; an epoxidized unsaturated triglyceride, a solvent dispersed wood rosin ester, a functional vegetable oil derivative, or a combination thereof; a surfactant, and optionally water. In another implementation, the composition consists essentially of: asphalt; interlinked substituted crumb rubber; an epoxidized unsaturated triglyceride, a solvent dispersed wood rosin ester, a functional vegetable oil derivative, or a combination thereof; an unsaturated fatty acid; one or more surfactants; an optionally substituted styrene butadiene styrene block copolymer; one or more cross linking agents; and optionally water. In another implementation, the composition consists essentially of: asphalt; interlinked substituted crumb rubber; an epoxidized unsaturated triglyceride, a solvent dispersed wood rosin ester, a functional vegetable oil derivative, or a combination thereof; an unsaturated fatty acid; one or more surfactants; an optionally substituted styrene butadiene styrene block copolymer; one or more cross linking agents; a glycol ether; and optionally water.

An emulsion of an asphalt material comprising an interlinked substituted rubber material of the embodiments can be prepared to provide, e.g., a hot mix asphalt mixture, a cold patch asphalt mixture, a seal coat (fog seal, chip seal, or slurry seal), or an adhesive tack coat between an existing base (e.g., soil, clay, sand, shell, cement, limestone, fly ash, asphaltic materials, recycled asphalt pavement, recycled concrete, aggregates, existing road surfaces (e.g., dirt, gravel, asphalt pavement, concrete) and mixtures thereof) and a new asphaltic paving layer.

A process for preparing an emulsion of asphalt-rubber binder can comprise selecting at least two different asphalts, or processing two separate quantities of the same asphalt or type of asphalt, emulsifying one asphalt and combining the other asphalt with interlinked substituted crumb rubber, then recombining the compositions to provide the emulsion of asphalt-rubber binder.

One of the asphalts can be generally referred to as the "first asphalt", and the other asphalt can generally be referred to as the "second asphalt", purely for convenience to avoid confusion when describing these processes. Other nomenclature may be employed either for convenience, or to provide a description related to a property of the asphalts.

In the process for preparing an emulsion of asphalt-rubber binder, a first asphalt is combined with water and a surfactant, such as a premixed combination of surfactant and water, and optional additives, to provide a first asphalt emulsion. Preferably, the first asphalt is about 50% (w/w) to about 70% (w/w), or about 60% (w/w) and the surfactant/water is about 30% (w/w) to about 50% (w/w), or about 40% (w/w) of the first asphalt emulsion. The surfactant/water is preferably separately prepared by blending water and the surfactant(s). In one implementation, the water is about 35% to about 40%, or about 37%, and the surfactant(s) are about 0.5% to about 4%, or about 2.2%, of the total weight of the first asphalt emulsion. In another implementation, the surfactant consists essentially of about 1.1% Prime Plex ER 582 surfactant and about 1.1% Indulin W-5 surfactant, based upon the weight of the emulsion.

The first asphalt is preferably at a temperature between about 300° F. to about 350° F. at the time it is premixed with the surfactant/water, and the surfactant/water is at a temperature between about 70° F. and about 90° F. In a preferred implementation, the mixing of the first asphalt and the surfactant/water is carried out at a rate such that the resulting emulsion is about 190° F. to about 210° F. after the mixing. In some embodiments, the asphalt and the surfactant/water may be mixed by co-milling through a colloid mill.

In a separate system or vessel, a second asphalt is combined with interlinked substituted crumb rubber, and optional components such as a surfactant and/or additives, to provide an asphalt-coated interlinked substituted crumb rubber composition. The asphalt-coated interlinked substituted crumb rubber composition comprises a plurality of interlinked substituted crumb rubber particles which are coated with the second asphalt. In some embodiments, an anhydrous surfactant is added prior to, during, or after mixing the second asphalt with the interlinked substituted crumb rubber without the addition of any water. However, the process may optionally be carried out without added water and without any added surfactant. Other additives which may be included either before, after, or during the mixing of the second asphalt and the interlinked substituted crumb rubber include fatty acids such as stearic acid, oleic acid, etc.; rosins such as wood rosin; high flash point organic solvents such as mineral spirits; additional surfactants, etc. In some embodiments, at least a portion of the mixing of the interlinked substituted crumb rubber particles and the second asphalt occurs in the presence of stearic acid or oleic acid, a fatty amine surfactant, an ammonium salt of an amine surfactant, or a combination thereof. For some exemplary methods, at least a portion of the mixing of the interlinked substituted crumb rubber particles and the second asphalt occurs in the presence of wood rosin, mineral spirits, a second surfactant, a third surfactant comprising an amine functional group, an ammonium salt, or a combination thereof.

The second asphalt may in some instances be above ambient temperature when mixed with the interlinked substituted crumb rubber. For example, the second asphalt may be heated to from about 325° F. to about 375° F., or about 350° F., and the interlinked substituted crumb rubber may be added to the second asphalt.

While there are a number of different types of asphalt-coated crumb rubber compositions, two types of an asphalt-coated crumb rubber compositions include a mastic and a hydrophilicized asphalt coated interlinked substituted crumb rubber.

For a hydrophilicized asphalt-coated interlinked substituted crumb rubber, the interlinked substituted crumb rubber particles may be about 60% to about 90% of the total weight of all non-volatile components of the composition. Preferably, the second asphalt is about 25% and the interlinked substituted crumb rubber is about 75% of the weight of the hydrophilicized asphalt-coated interlinked substituted crumb rubber. For example, a hydrophilicized asphalt-coated interlinked substituted crumb rubber can comprise from about 20-80 wt. %, or 25-75 wt. %, or 60-80 wt. % interlinked substituted crumb rubber, with the remainder asphalt and other components. Non-volatile components include those that do not significantly evaporate during the in-situ curing process of the final adhesive. In some embodiments, the hydrophilicized asphalt interlinked substituted coated crumb rubber may be prepared by spraying hot second asphalt onto the surface of interlinked substituted crumb rubber, then stirring the coated rubber within a heated blending vessel until sufficient swelling of the crumb rubber occurs. A surfactant or other additives may be added to second asphalt before it is sprayed onto the interlinked substituted crumb rubber, or they may be added after the asphalt is added.

For the mastic, the second asphalt may be about 60% to about 80%, and the interlinked substituted crumb rubber particles may be about 20% to about 40% of the total weight of all non-volatile components of the composition. Preferably, the second asphalt is about 60% and the interlinked substituted crumb rubber is about 30%, or the asphalt is about 75% and the crumb rubber is about 25%, of the weight of the mastic. For example, a mastic can comprise from about 20-80 wt. %, or 25-75 wt. %, or 60-80 wt. % interlinked substituted crumb rubber, with the remainder asphalt and other components. In another implementation, the interlinked substituted crumb rubber particles have a diameter from about 650 microns (μm) to about 75 μm, e.g., from 75 μm to 100 μm, 200 μm, 300 μm, 400 μm, 500 μm, or 600 μm. In some embodiments, larger or smaller particle diameters may be acceptable, e.g., 600 μm to 700 μm, 800 μm, 900 μm, or 1000 μm or more; or from 75 μm down to 60 μm, 50 μm, 40 μm, 30 μm, 20 μm, or 10 μm or less.

In some embodiments, the mastic comprises about 60.5% (w/w) second asphalt, about 30% (w/w) interlinked substituted crumb rubber, about 4% (w/w) epoxidized soy oil, about 4% (w/w) water, and about 1.5% surfactant. In other embodiments the mastic consists essentially of about 60.5% (w/w) second asphalt, about 30% (w/w) interlinked substituted crumb rubber, about 4% (w/w) epoxidized soy oil, about 4% (w/w) water, and about 1.5% surfactant. In another embodiment the mastic consists essentially of about 60.5% (w/w) second asphalt, about 30% (w/w) interlinked substituted crumb rubber, about 4% (w/w) epoxidized soy oil, about 4% (w/w) water and/or glycol ether, and about 1.5% surfactant. In still another embodiment, the mastic consists essentially of about 55% (w/w) medium asphalt, about 30% (w/w) interlinked substituted crumb rubber, about 11% (w/w) high flash point solvent dissolved wood rosin ester, about 2.5% (w/w) water, and about 1.5% (w/w) surfactant. In some embodiments, addition of volatile components to the mastic are sequential. For example, the initial asphalt crumb rubber reaction may occur at a high temperature (325-375° F.). After the high temperature reaction, the mixture may then be allowed to cool to below flash point of subsequent additives so that additives can be blended into the mixture.

The first asphalt emulsion may be combined with the asphalt-coated crumb rubber composition, such as a mastic or a hydrophilicized asphalt-coated interlinked substituted crumb rubber, to provide an emulsion of asphalt-rubber binder. In some embodiments, asphalt emulsion may be combined with the asphalt-coated crumb rubber composition under high speed shear until the mixture is fully homogeneous.

Some of these processes may further comprise mixing a third asphalt, with a polymer to provide a polymer modified asphalt; mixing the polymer modified asphalt with water and a fourth surfactant to provide a second asphalt emulsion; and mixing the second asphalt emulsion with at least one of the first asphalt emulsion, the asphalt-coated interlinked substituted crumb rubber composition, and the emulsion of the asphalt-rubber binder. In some embodiments, the third asphalt may be softer than the first asphalt.

A process for preparing an asphalt-rubber binder system which follows the basic process of the process outlined above can include additional steps. This process also utilizes a third asphalt which has a different hardness than the first asphalt and the second asphalt. For example, in these processes the first asphalt is referred to as "hard asphalt," the second asphalt is referred to as "medium asphalt," and a third asphalt is referred to as "soft asphalt." The process generally comprises selecting asphalt of different penetration grades, mixing each grade of asphalt separately with chemicals to form a plurality of premixed feedstock configured with different properties, and then combining the premixed feedstock to form an asphalt-rubber composition that upon curing, would exhibit physical properties equivalent to the asphalt-rubber binder(s) prepared pursuant to ASTM D6114-97 (2002) or deviations thereof which may be established by the specifying agency from time to time.

The process begins by providing a hard asphalt, preferably having a pen value of between about 0 dmm and about 50 dmm, or between about 0 dmm and about 90 dmm; a soft asphalt, preferably having a pen value of between about 90 dmm and about 300 dmm, or about 200 dmm and about 300 dmm; a medium asphalt, having a pen value of between about 150 dmm and about 200 dmm.

In one embodiment, the process comprises premixing the hard asphalt with a surfactant/water or a soap system, to form emulsion "H". Preferably, the hard asphalt is about 61% (w/w) and the surfactant/water is about 39% (w/w) of emulsion "H". The surfactant/water is preferably separately prepared by blending water and the surfactant(s). In one implementation, the water is about 37% and the surfactant(s) are about 2.2% of the total weight of emulsion "H". In another implementation, the surfactant consists essentially of about 1.1% Prime Plex ER 582 surfactant and about 1.1% Indulin W-5 surfactant.

The hard asphalt is preferably at a temperature between about 300° F. to about 350° F. at the time it is premixed with the surfactant/water, and the surfactant/water is at a temperature between about 70° F. and about 90° F. In a preferred implementation, the mixing of the hard asphalt and the surfactant/water is carried out at a rate such that the resulting emulsion is about 190° F. to about 210° F. after the mixing. The asphalt and the surfactant/water are mixed by co-milling through a colloid mill.

In one embodiment, the process further comprises premixing the soft asphalt with a surfactant/water or soap system, to form emulsion "H-1". Alternatively, in another embodiment, the soft asphalt is first blended, preferably at about 350° F., with an optionally substituted styrene butadiene styrene block copolymer (SBS) elastomer to form a polymer modified asphalt. This polymer modified asphalt is then blended with the surfactant/water through a colloid mill to form emulsion "S".

In one implementation, the soft asphalt or the polymer modified asphalt is about 61%, and the surfactant/water is about 39%, of the total weight of emulsion "S". The surfactant/water may comprise about 37% water and about 2% surfactant with respect to the total weight of emulsion "S". In one embodiment, the surfactant consists essentially of about 1.1% (w/w of emulsion "H") Prime Plex ER 582 surfactant and about 1.1% (w/w of emulsion "H") Indulin W-5 surfactant.

The soft asphalt or the polymer modified asphalt may comprise an amendment such as an unsaturated fatty acid, including an olefin from the stearol family. In one embodiment, the polymer modified asphalt consists essentially of 58% (w/w of emulsion "H") soft asphalt, 1.22% (w/w of emulsion "H") amendment, and 2% (w/w of emulsion "H") SBS elastomer. In another embodiment, the asphalt and the amendment are blended at 325° F., and the SBS is added and the mixture is run through high shear until the SBS is dissolved.

In one implementation, the soft asphalt or polymer modified asphalt is at a temperature between about 300° F. to about 350° F. at the time it is premixed with the surfactant/water, which is at a temperature between about 70° F. and about 90° F. In another implementation, the mixing of the soft asphalt and the surfactant/water is carried out at a rate such that the resulting emulsion is about 190° F. to about 210° F. after the mixing. In another implementation, after the initial combination of the soft asphalt and the surfactant/water are initially combined, additional mixing occurs over a period of from 1 hour to about 4 hours. In another implementation, the asphalt and the surfactant/water are co-milled through a colloid mill. After the soft asphalt emulsion is formed in the colloid mill, it may be stirred while it dissipates energy to a temperature of 175° F. or lower during storage.

In another embodiment, the process further comprises premixing the medium asphalt with the interlinked substituted crumb rubber to form an asphalt-rubber blend. In some embodiments, the asphalt-rubber blend is combined with surfactant/water, or a soap system, to provide a mastic. Alternatively, a surfactant is added prior to, during, or after the mixing the medium asphalt with the interlinked substituted crumb rubber without adding any water. However, in some embodiments, neither water nor surfactant is added. In one implementation, the medium asphalt is heated to from about 325° F. to about 375° F., and the interlinked substituted crumb rubber is added to the asphalt. In another implementation, the medium asphalt is heated to about 350° F. and the interlinked substituted crumb rubber is added to the asphalt. In another implementation, once the interlinked substituted crumb rubber is added, the medium asphalt and the interlinked substituted crumb rubber are mixed for about 15 minutes until the proper viscosity is achieved as required by D6114 Table 1 to provide the asphalt-rubber blend. Preferably, the viscosity is from about 900 to about 1500 cps. In one implementation, the asphalt is about 60% and the crumb rubber is about 30%, or the asphalt is about 75% and the crumb rubber is about 25%, of the weight of the mastic. In another implementation, the crumb rubber particles have a diameter from about 650 microns (μm) to about 75 μm.

In some embodiments, the surfactant/water, or soap system, is separately prepared by mixing the water and surfactant(s). In one embodiment, the water is about 4% and the surfactant(s) are about 1.5% of the weight of the mastic. In another embodiment, the asphalt-rubber blend is then cooled to a temperature of from about 180° F. to about 210° F., and the amendment and the surfactant/water are thoroughly blended in to provide a heavy mastic body consistency.

In some embodiments, the mastic comprises about 60.5% (w/w) medium asphalt, about 30% (w/w) interlinked substituted crumb rubber, about 4% (w/w) epoxidized soy oil, about 4% (w/w) water, and about 1.5% surfactant. In other embodiments the mastic consists essentially of about 60.5% (w/w) medium asphalt, about 30% (w/w) interlinked substituted crumb rubber, about 4% (w/w) epoxidized soy oil, about 4% (w/w) water, and about 1.5% surfactant. In another embodiment the mastic consists essentially of about 60.5% (w/w) medium asphalt, about 30% (w/w) interlinked substituted crumb rubber, about 4% (w/w) epoxidized soy oil, about 4% (w/w) water and/or glycol ether, and about 1.5% surfactant. In still another embodiment, the mastic consists essentially of about 55% (w/w) medium asphalt, about 30% (w/w) interlinked substituted crumb rubber, about 11% (w/w) high flash point solvent dissolved wood rosin ester, about 2.5% (w/w) water, and about 1.5% (w/w) surfactant.

In some embodiments, Emulsion "H" and Emulsion "S" are then blended to provide the Emulsion Pre-Blend. The mastic is then blended in under high speed shear until the mixture is fully homogeneous to provide the asphalt-rubber emulsion blend. In another embodiment, a crosslinker is added during the blending of Emulsion "H" and Emulsion "S" to provide an asphalt adhesive or pavement with a crosslinked asphalt-rubber binder. In another embodiment, a crosslinker is added during the blending of the Emulsion Pre-Blend and the mastic to provide an adhesive or asphalt pavement with a crosslinked asphalt-rubber binder.

In some embodiments the asphalt pavement prepared using the compositions and methods described herein comprises asphalt-rubber binder which upon curing, will be equivalent to the physical properties of asphalt-rubber binder prepared pursuant to ASTM D6114-97 specifications.

As used herein, the term "asphalt" is a broad term and shall have its ordinary meaning and shall include, but not be limited to, a dark brown to black cementitious material in which the predominating constituents are bitumens which occur in nature or are obtained in petroleum processing.

Bitumen is a class of black or dark-colored (solid, semi-solid, or viscous) cementitious substances, natural or manufactured, composed principally of high molecular weight hydrocarbons.

As used herein, the term "surfactant" is a broad term and shall have its ordinary meaning and shall include, but not be limited to, a compound or mixture of compounds having both one or more hydrophobic or lipophilic moieties and one or more hydrophilic moieties in a single molecule. A surfactant may be nonionic, anionic, cationic, or amphoteric. Depending on factors such as pH, a given surfactant may belong to more than one of these classes.

Nonionic surfactants have no formal charge on the molecules. Non-limiting examples of nonionic surfactants include: alkylphenol ethoxylates, such as nonylphenol ethoxylates or octylphenol ethoxylates, comprising 30 to 100 ethylene oxide units; $C_{8-18}$ ethoxylated alcohols, including ethoxylated linear or branched alcohols such as ethoxylated fatty alcohols, etc. comprising from 1 to about 10, to about 20, to about 30 or to about 50 ethylene oxide units; $C_{8-18}$ ethoxylated carboxylic acids, including ethoxylated linear or branched carboxylic acids such as ethoxylated fatty acids, comprising from 1 to about 10, to about 20, to about 30 or to about 50 ethylene oxide units; $C_{8-18}$ ethoxylated carboxylic acid alkyl esters, including ethoxylated linear or branched carboxylic acid alkyl esters, e.g. ethoxylated fatty acid alkyl esters such as ethoxylated fatty acid methyl esters, comprising from 1 to about 10, to about 20, to about 30 or to about 50 ethylene oxide units; ethylene oxide based copolymers and block copolymers such as ethylene oxide propylene oxide copolymers, ethylene oxide propylene oxide block copolymers, and the like, having an average molecular weight in the range of about 1,000 to about 10,000; ethoxylated amines, including ethoxylated fatty amines such as tallow amines, containing about 5 to about 10, to about 20, to about 30, or to about 50 ethylene oxide units; ethoxylated diamines, including ethoxylated fatty diamines such as tallow diamines, containing about 5 to about 10, to about 20, to about 30, or to about 50 ethylene oxide units; and combinations thereof.

An amine surfactant is any surfactant containing an amine moiety or functional group. An amine moiety has two forms or subsets. In the first subset, or the neutral form, a nitrogen atom is directly attached to 3 independent atoms selected from carbon and hydrogen. In the ammonium or ammonium salt form, or ammonium functional group, a nitrogen atom is directly attached to 4 independent atoms selected from carbon and hydrogen and carries a positive formal charge. If the ammonium includes nitrogen attached to a hydrogen, it is readily converted to the neutral form if the pH is sufficiently high.

Fatty amines are nonionic surfactants if the pH is sufficiently high (i.e. basic) to keep the nitrogen atoms deprotonated so that they are in the neutral form. A fatty amine is nitrogen attached to three moieties independently selected from: H or a hydrocarbon. In some embodiments, the nitrogen is attached to H or $C_{8-22}$ hydrocarbon that is either unsaturated (i.e. alkyl) or has 1, 2, 3, 4, 5, 6, 7, or 8 double bonds. Examples include, but are not limited to: tallow amine, tallow diamine, soy diamine, tall oil diamine, tallow triamine, tallow tetramine, oleyl diamine, coco diamine, linear $C_{8-18}$ petroleum-derived diamine, branched $C_{8-18}$ petroleum-derived diamine, linear $C_{12-18}$ alkylether diamine, branched $C_{12-18}$ alkylether diamine, combinations thereof, and the like.

Other nitrogen containing surfactants such as amidoamines, imidazolines, imidoamines, imines, amidoamines, amides, imadazoles, imidazolene, and the like, also have neutral and cationic forms analogous to amines. These nitrogen containing surfactants are nonionic surfactants provided that the pH is sufficiently high (i.e. basic).

Anionic surfactants have one or more negative formal charges on the molecules. Examples include: $C_{6-30}$ carboxylic acids, including but not limited to, linear and branched carboxylic acids, which include fatty acids such as arachidic acid, arachidonic acid, behenic acid, eicosapentaenoic acid, linoleic acid, α-linolenic acid, γ-linolenic acid, myristic acid, lauric acid, oleic acid, palmitic acid, palmitoleic acid, stearic acid, and the like; $C_{6-30}$ carboxylic acid sulfonates, including but not limited to, sulfonates of any of the carboxylic acids listed above; $C_{6-30}$ alkyl sulfates; $C_{6-30}$ alkylbenzene sulfonates; alkylphenol ethoxylate sulfonates; etc.

Cationic surfactants have one or more positive formal charges on the molecules. Fatty amines such as those described above are cationic if they are in the ammonium form due to sufficiently low pH (i.e. acidic conditions) or the fact that the nitrogen is attached to 4 carbon atoms. Nitrogen compounds such as amines or ammonium salts, amidoamines, imidazolines, imidoamines, imines, amidoamines, amides, imadazoles, imidazolene, and the like, are also cationic surfactants provided that the pH is sufficiently low, or the nitrogen is quaternary, meaning that it is attached to 4 non-hydrogen atoms.

Amphoteric surfactants have either a positive or a negative formal charge depending on the pH of the composition. Sulfobetaines are an example.

In other embodiments, the surfactant is combined with lignin. Lignin is a polymeric substance containing a hydroxy phenyl propane backbone. It is found in plant and vegetable tissue associated with cellulose or other plant constituents. In the pulp and paper industry, lignin-containing material such as wood, straw, corn stalks bagasse and other suitable plant tissue may be processed to recover the cellulose and pulp. The residual pulping liquors are the main sources of technical lignins. In some embodiments, useful examples of lignins include kraft soft wood lignin, kraft hardwood lignin, bagasse lignin, organosol lignin, desulfonated lignosulfonate, and combinations thereof. In some embodiments, the surfactant comprises a nitrogen containing surfactant or an amine and lignin.

As used herein, the term "amendment" is a broad term and shall have its ordinary meaning and shall include, plant derived resinous substances which beneficially augment the adhesive, cohesive, and solubility parameters of asphalt. Examples include functional vegetable oil derivatives and unsaturated carboxylic acids.

Mixing the first asphalt emulsion with the asphalt-coated interlinked substituted crumb rubber composition provides an emulsion of an asphalt rubber-binder. While these compositions may vary considerably, the emulsion of an asphalt-rubber binder may comprise an asphalt, interlinked substituted crumb rubber which has swollen in the presence of asphalt, a surfactant such as a cationic surfactant, and water. Preferably, the interlinked substituted crumb rubber is about 15% to about 45%, or about 30% to about 45% of the total weight of all non-volatile components of the emulsion, e.g., 10-80 wt. % of the composition comprises interlinked substituted crumb rubber with other components making up the remainder of the composition. In some embodiments, the pH should be below about 7, or about 2 to about 6.

One type of emulsion of asphalt-rubber binder is obtained from three separate asphalt compositions: an asphalt-rubber composition, a hard asphalt emulsion, and a soft asphalt emulsion, which may be combined into a single composition to provide an asphalt-rubber emulsion blend. While each of these separate asphalt compositions may vary considerably, the asphalt-coated interlinked substituted crumb rubber composition may comprise medium hardness asphalt, interlinked substituted crumb rubber, a surfactant, and water; the hard asphalt emulsion may comprise hard asphalt, a surfactant, and water; and the soft asphalt emulsion may comprise soft asphalt, a surfactant; and water.

The amounts of the different asphalt compositions in the emulsion blend may vary depending upon the circumstances. For example, while not intending to be limiting, the amount of the asphalt-rubber composition may be from about 25% (w/w) to about 50% (w/w) or preferably from about 30% (w/w) to about 40% (w/w); the amount of hard asphalt emulsion may be from about 30% (w/w) to about 60% (w/w) or preferably from about 40% (w/w) to about 50% (w/w); and the amount of soft asphalt emulsion may be from about to about 10% (w/w) to about 30% (w/w) or preferably from about 15% (w/w) to about 25% (w/w).

The manner of blending the three emulsions may vary. In one non-limiting example, the emulsion blend may be prepared by thoroughly blending a hard asphalt emulsion and a soft asphalt emulsion, followed by blending in an asphalt-coated crumb rubber composition. In some embodiments, the asphalt-coated crumb rubber composition is blended in under high shear until the mixture is fully homogeneous. Each of: the hard asphalt emulsion, the soft asphalt emulsion, and the asphalt-coated interlinked substituted crumb rubber composition used in the emulsion blend may be prepared by any of the methods described herein.

In a preferred embodiment, the emulsion of asphalt-rubber binder comprises: asphalt, interlinked substituted crumb rubber, an epoxidized unsaturated triglyceride, a surfactant, and water; wherein the composition conforms to ASTM International Standard Specification for Asphalt-Rubber binder.

A crosslinker may be present in an emulsion of asphalt rubber binder. The crosslinker may be present because it was part of an asphalt emulsion, an asphalt-coated interlinked substituted rubber composition, or another optional component incorporated into the final emulsion. For example, the crosslinker could be part of a soft asphalt emulsion as described herein (e.g., emulsion "S"), which is incorporated into the blend. Alternatively, the emulsion of asphalt-rubber binder may further comprise a crosslinker which is not present in any of the asphalt components combined to form the final emulsion. Or one of the asphalt components combined to prepare the emulsion, such as the soft asphalt emulsion, may contain a crosslinker, and an additional amount of a crosslinker may be added to the final emulsion. The crosslinker may be added at any point during the blending of the asphalt compositions; and it may be useful in providing an asphalt pavement with a crosslinked asphalt-rubber binder.

The crosslinker may be any of the many crosslinkers known in the art, including those that work by an anionic, cationic, or free radical mechanism. In some embodiments, the crosslinker is sulfur or a sulfur compound, such as a thiol, thioether, disulfide, or the like. Preferably, the crosslinker comprises from 0 to 1000 carbon atoms and from 1 to 1000 sulfur atoms. In one embodiment, the crosslinker is an anionic crosslinker. Some non-limiting examples of useful anionic crosslinkers in are those comprising one or more functional groups independently selected from $-CR_2-O-$, $-CR_2-S-$, $-CR_2-CR_2-$, and $-CR_2-NR-$, wherein each R is independently H, a hydrocarbon, or an additional bond which forms $=C$.

While not intending to be limiting, the emulsion of asphalt-rubber binder may be used to prepare an asphalt pavement at ambient temperatures by a process comprising mixing the emulsion blend with aggregate and allowing the mixture to dry. In one embodiment, the dry asphalt-rubber binder in the asphalt pavement comprises from about 15% (w/w) to about 50% (w/w), about 4% to about 12%, about 12% (w/w) to about 22% (w/w), or about 15% (w/w) to about 22% (w/w) of interlinked substituted crumb rubber.

In some embodiments, the emulsion blend may be cationic or anionic. For some cationic emulsions, the pH may be from about 2.5 to about 4.5. For some anionic emulsions, the pH may be from about 8 to about 10.

The compositions and methods described herein may provide improvement in a variety of asphalt emulsion characteristics compared to conventional compositions and methods utilizing untreated crumb rubber. For example, some compositions or methods may provide improved adhesion, cohesion, early green strength, and/or water resistance when employed in a variety of asphalt systems such as ambient cured, structural waterproofing and pavement preservation systems. These emulsions may also provide improved performance for asphalt pavement and other applications, such as resistance to oxidative hardening or oxidative embrittlement, resistance to weather or mechanical wear, improvement in pavement life, improved load distribution between aggregate and binder, improved skid resistance, and the like.

Another use of some of the emulsions described herein may be as a street or highway seal. For example, the seal may stabilize and/or repair raveling and micro-fissure(s), interrupt progressive oxidative embrittlement, reverse diminished surface friction, or reduce tire noise.

Some emulsions described herein may also be used as a parking lot seal, for the maintenance of pavement in parking areas and, with appropriate aggregate, low speed traffic surfaces. For example, the seal may restore pavement surface profile, interrupt progressive oxidative embrittlement, create a fuel resistant barrier, eliminate tracking, extend the repaving cycle, reduce tire noise, or re-establish diminished surface friction.

The asphalt-coated crumb rubber compositions may comprise a second asphalt, and crumb rubber, and optionally, a surfactant. For some asphalt-coated crumb rubber compositions, such as hydrophilicized asphalt-coated interlinked substituted crumb rubber, the interlinked substituted crumb rubber may about 60% to about 80% of the weight of all non-volatile components of the asphalt-coated rubber composition. For other asphalt-coated crumb rubber compositions, such as mastics, the interlinked substituted crumb rubber may be about 20% to about 40% of the weight of all non-volatile components of the asphalt-coated rubber composition. The asphalt-coated interlinked substituted crumb rubber compositions may comprise asphalt (such as medium hardness asphalt), interlinked substituted crumb rubber, a surfactant, and optionally water. In some embodiments, the asphalt-coated interlinked substituted crumb rubber compositions may comprise asphalt (such as medium hardness asphalt), interlinked substituted crumb rubber, a surfactant, and no added water, or alternatively, less than about 2% (w/w) water, about 1.5% (w/w) water, about 1% (w/w) water, about 0.5% (w/w) water, about 0.1% (w/w) water, or about 0.01% (w/w) water. While not intending to be limiting, the asphalt-coated interlinked substituted crumb rubber compositions may further comprise an amendment such as a functional vegetable oil derivative.

The amount of the second asphalt may vary depending upon the circumstances. In some embodiments, the medium hardness asphalt is from about 40% (w/w) to about 80% (w/w), from about 50% (w/w) to about 70% (w/w), or about 60% (w/w) of the asphalt-coated interlinked substituted crumb rubber composition.

In some embodiments, the second asphalt may be softer than the first asphalt. For example, the second asphalt may be a medium asphalt. Medium hardness asphalt refers to asphalt having a hardness which may be suitable for use on an asphalt pavement road. In a preferred embodiment, the medium hardness asphalt has a penetration value according to ASTM D5 of from about 50 dmm, about 100 dmm, or from about 150 dmm, to about 200 dmm. Alternatively, the medium hardness asphalt has a ring and ball softening point according to ASTM D36 of from about 85° F. to about 100° F. With regard to chemical composition, the medium hardness asphalt may comprise $C_{8-24}$ hydrocarbons. For example, while not intending to be limiting, the hydrocarbon portion of the medium hardness asphalt may consist essentially of $C_{8-24}$ hydrocarbons.

The crumb rubber may be ground recycled tire rubber which contains no visible nonferrous metal particles (e.g., no more than about 0.01% ferrous metal particles by weight) and which has been subjected to the interlinked substitution process described herein. The particles of the interlinked substituted crumb rubber may be any size suitable for dispersing in the asphalt-coated interlinked substituted crumb rubber composition. In some embodiments, the particles of interlinked substituted crumb rubber have a mean diameter from about 75 μm to about 650 μm. Alternatively, the interlinked substituted crumb rubber may be from about 80 mesh to about 600 mesh, from about 100 to about 600 mesh, from about 20 to about 200 mesh, about 140 mesh (e.g. about 75 μm to about 100 μm) or about 150 mesh. In one non-limiting example, the interlinked substituted crumb rubber is from about 100 mesh to about 600 mesh derived from MICRO-VULK GTR, available from PrimePlex, LLC, or other suppliers of tire-derived crumb rubber. The amount of the interlinked substituted crumb rubber may vary depending upon the circumstances. For example, the crumb rubber may be at least about 15% (w/w), such as from about 15% (w/w) to about 30% (w/w) from about 20% (w/w) to about 40% (w/w), or from about 25% (w/w) to about 35% (w/w) of all non-volatile components of the emulsion of an emulsion of an asphalt-rubber binder, e.g., the composition can comprise 10-90% interlinked substituted crumb rubber with the remainder comprising other components.

A functional vegetable oil derivative is a derivative of a vegetable oil or other fatty substance, or a substance having a similar composition regardless of the origin of the substance. In some embodiments, the functional vegetable oil derivative is epoxidized unsaturated triglyceride. Epoxidized unsaturated triglyceride is a tri-ester of glycerine. The glycerine bonds to three linear or branched carboxylic acids, wherein at least one of the carboxylic acids comprises an epoxide moiety. For example, the epoxidized unsaturated triglyceride may be a derivative of an unsaturated fatty acid triglyceride such as a vegetable or animal fat or oil, wherein at least one of the C=C moieties of the parent unsaturated fatty acid triglyceride is replaced with an epoxide moiety (i.e. a three-membered ring containing an oxygen). If the parent unsaturated fatty acid triglyceride has more than one C=C moiety, one, part, or all of the C=C moieties may be replaced by epoxide moieties. Examples of vegetable or animal fats or oils include coconut oil, corn oil, cottonseed oil, olive oil, palm oil, peanut oil, rapeseed oil, canola oil, safflower oil, sesame oil, soybean oil, sunflower oil, castor oil, tallow oil, and the like. In one embodiment, the vegetable oil is soybean oil.

A solvent dispersed wood rosin ester may be used in addition to, or as an alternative to the functional vegetable oil derivative or epoxidized unsaturated triglyceride. Common solvents for dispersing the wood rosin ester include organic solvents such as hydrocarbons, including mineral spirits, toluene, xylene, and naphtha solvent (e.g. VM&P).

The amount of the amendment, such as an epoxidized saturated triglyceride, may vary depending upon the circumstances. For example, an amendment, such as an epoxidized unsaturated triglyceride, may be from about 1% (w/w) to about 10% (w/w), from about 2% (w/w) to about 6% (w/w), or about 4% (w/w) of the asphalt-coated interlinked substituted crumb rubber composition.

The surfactant of the asphalt-coated interlinked substituted crumb rubber composition may be any surfactant, including any of the possibilities described above. In some embodiments, the surfactant comprises a cationic or a nonionic surfactant. In other embodiments, the surfactant comprises a nitrogen-containing surfactant such as a fatty amine or a nitrogen-containing cationic surfactant such as an amine surfactant in the ammonium salt form.

The amount of the surfactant may vary depending upon the circumstances. For example, the surfactant may be from about 0.1% (w/w) to about 10% (w/w), from about 1% (w/w), to about 4% (w/w), or from about 1.5% (w/w) to about 3% (w/w) of the asphalt-coated interlinked substituted crumb rubber composition.

The amount of water in the asphalt-coated interlinked substituted crumb rubber composition may vary depending upon the circumstances. For example, the water may be about from about 1% (w/w) to about 10% (w/w), from about 2% (w/w), to about 6% (w/w), or about 4% (w/w) of the asphalt-coated interlinked substituted crumb rubber composition. For some applications, such as those which involve the laying of asphalt pavement at ambient temperatures, a reduced amount of water may be desirable. For example, in some asphalt-coated interlinked substituted crumb rubber compositions, essentially no water is added, or alternatively, the water content of the composition is about 2% (w/w) or less, such as about 0.00001% (w/w) to about 2% (w/w), about 0.00001% (w/w) to about 1% (w/w), or about 0.00001% (w/w) to about 0.5% (w/w). Preferably, the asphalt-coated interlinked substituted crumb rubber composition is prepared by heating crumb rubber and asphalt together until the interlinked substituted crumb rubber swells or reacts. The temperature of the heating may be any convenient temperature, such as from about 250° F. to about 450° F., from about 300° F. to about 400° F., or about 350° F. The heating may occur for any amount of time depending upon the circumstances. In some embodiments, the heating is carried out from about 5 minutes to about 90 minutes, from about 10 minutes to about 60 minutes, or about 15 minutes. The heating may result in a range of viscosities for the asphalt-crumb rubber combination. Preferably, the viscosity is from about 500 cps to about 3000 cps; from about 700 cps to about 2000 cps; or from about 900 cps to about 1500 cps.

While not intending to be limiting, the epoxidized unsaturated triglyceride may be added and mixed into the asphalt-crumb rubber combination after the interlinked substituted crumb rubber swells. The mixing may occur at any temperature. For example, the mixture may be thoroughly blended at a temperature of: from about 100° F. to about 300° F., from about 150° F. to about 250° F., or about 200° F.

In some embodiments, the water and the surfactants are mixed separately from the asphalt-crumb rubber blend until the surfactant is dissolved. The surfactant solution is then mixed into the asphalt-crumb rubber blend prepared above. In some preferred embodiments, the surfactants are added directly to the asphalt-crumb rubber blend without being dissolved in water.

In some embodiments, a lower or no water content in the asphalt-coated crumb rubber composition may result in an asphalt pavement which may cure more rapidly. For example, a road made from the asphalt pavement may be opened to traffic sooner after the asphalt pavement is laid. It should be noted, however, that once the asphalt-coated crumb rubber composition is prepared, for example, after the interlinked substituted crumb rubber has swelled or reacted in the presence of the asphalt, the asphalt-coated crumb rubber composition may be mixed with waterborne compounds, such as water in any emulsion composition described herein, without substantially slowing the curing time as compared to that of the original emulsion.

The first asphalt compositions may comprise a first asphalt, a surfactant, and water. In some embodiments, the first asphalt may be harder than the second asphalt. For example, the first asphalt may have a pen value in the range of about 0 dmm to about 100 dmm. If a first asphalt composition is a hard asphalt emulsion, such as Emulsion "H", the asphalt may be a hard asphalt. Hard asphalt is asphalt which is substantially harder than that normally used in roads. For example, the hard asphalt may have a penetration value of from about 0 dmm to about 50 dmm, or alternatively, about 0 dmm to about 10 dmm. In other embodiments, the hard asphalt has a ring and ball softening point of from about 155° F. to about 165° F. In terms of chemical composition, the hard asphalt may comprise hydrocarbons having at least 24 carbon atoms. For example, the hydrocarbon portion of the hard asphalt may consist essentially of $C_{24-500}$ hydrocarbons.

The amount of the first asphalt may vary depending upon the circumstances. In some embodiments, the first asphalt is from about 40% (w/w) to about 80% (w/w); from about 50% (w/w) to about 70% (w/w); or about 60% (w/w); of first hard asphalt emulsion.

The first surfactant, or the surfactant of the first asphalt emulsion, may be any surfactant, including any of the possibilities described above. In some embodiments, the first surfactant comprises a cationic or a nonionic surfactant. For example, the surfactant may comprise one or more of: a nitrogen-containing surfactant such as a fatty amine; a nitrogen-containing cationic surfactant such as an amine surfactant in the ammonium salt form; an amido amine surfactant, an ammonium salt thereof, or a combination thereof; and a lignin amine surfactant, i.e. lignin combined with an amine. In some embodiments, the first surfactant comprises an amine or an ammonium functional group.

The amount of the surfactant may vary depending upon the circumstances. In some embodiments, the surfactant is from about 0.1% (w/w) to about 10% (w/w), from about 1% (w/w) to about 5% (w/w), or about 2% (w/w) of the first asphalt emulsion.

The amount of water in the first asphalt emulsion may vary depending upon the circumstances. For example, the water may be from about 25% (w/w) to about 80% (w/w), from about 30% (w/w) to about 50% (w/w), or from about 30% (w/w) to about 40% (w/w) of the first asphalt emulsion.

In some embodiments, the first asphalt emulsion is prepared by heating the hard asphalt in a separate vessel before mixing with the other components of the first asphalt emulsion. The heating may be at any temperature sufficient to soften the asphalt for mixing such as: from about 300° F. to about 400° F., or about 325° F.

The water and the surfactants may be mixed separately until the surfactant is dissolved to form a soap solution. The soap solution may then be combined with the heated first asphalt and run through a colloid mill. Examples of suitable high shear colloid mills include, but are not limited to, Dahlworth, Superton, or Charlotte high shear colloid mills.

The combination of the hot asphalt and cold soap may result in a mixing temperature below the boiling point of water, such as from about 180° F. to about 210° F., or from about 190° F. to about 200° F. Continued mixing in the high shear colloid mill may produce an emulsion in which the oil droplets are suspended in water If a method relates to a soft asphalt emulsion, e.g., emulsion "S", the soft asphalt emulsion may comprise soft asphalt, a surfactant; and water. In other embodiments, the soft asphalt emulsion further comprises an amendment such as an unsaturated carboxylic acid such as an olefin from the stearol family.

Soft asphalt is asphalt which substantially softer than that normally used in roads. For example, the soft asphalt may have a penetration value greater than about 200 dmm. The soft asphalt may also be characterized as having a ring and ball softening point of from about 60° F. to about 85° F. With regard to chemical composition, the soft asphalt may comprise $C_{2-8}$ hydrocarbons. For example, the hydrocarbon portion of the asphalt may consist essentially of $C_{2-8}$ hydrocarbons.

The amount of the soft asphalt may vary depending upon the circumstances. For example, the soft asphalt may be from about 40% (w/w) to about 80% (w/w), from about 50% (w/w) to about 70% (w/w), or about 60% (w/w) of the soft asphalt emulsion.

Any unsaturated carboxylic acid may be used in the soft asphalt emulsion. In some embodiments, the unsaturated carboxylic acid comprises a $C_{6-30}$ carboxylic acid, including but not limited to, linear and branched carboxylic acids, which include fatty acids or olefins from the stearol family such as arachidonic acid, eicosapentaenoic acid, linoleic acid, α-linolenic acid, γ-linolenic acid, oleic acid, palmitoleic acid, and combinations thereof.

The amount of the unsaturated carboxylic acid may vary depending upon the circumstances. For example, the unsaturated carboxylic acid may be from about 0.1% (w/w) to about 5% (w/w), from about 0.5% (w/w) to about 2% (w/w), or from about 1% (w/w) to about 1.5% (w/w) of the soft asphalt emulsion.

The surfactant of the soft asphalt emulsion may be any surfactant, including any of the possibilities described above. In some embodiments, the surfactant comprises a cationic or a nonionic surfactant. For example, the surfactant may comprise one or more of: a nitrogen-containing surfactant, such as a surfactant comprising an amine or an ammonium functional group, such as a fatty amine; a nitrogen-containing cationic surfactant such as an amine surfactant in the ammonium salt form; an amido amine surfactant; and a lignin amine surfactant, i.e. lignin combined with an amine.

The amount of the surfactant may vary depending upon the circumstances. In some embodiments, the surfactant is from about 0.1% (w/w) to about 10% (w/w); from about 1% (w/w) to about 5% (w/w); or about 2% (w/w) of the soft asphalt emulsion.

The amount of water in the soft asphalt emulsion may vary depending upon the circumstances. For example, the water may be from about 10% (w/w) to about 80% (w/w), from about 20% (w/w) to about 50% (w/w), or from about 30% (w/w) to about 40% (w/w) of the soft asphalt emulsion.

The soft asphalt emulsion may further comprise an optionally substituted styrene butadiene styrene block copolymer (SBS). SBS is a block copolymer comprising an optionally alkyl substituted polybutadiene chain which is attached to two distinct, independent optionally substituted polystyrene chains, one on each end of the polybutadiene. An optionally substituted polybutadiene chain is a polymeric chain formed from a butadiene which may be unsubstituted, or all or wherein part of the monomers used to form the chain comprise one or more $C_{1-5}$ alkyl groups corresponding to any position on the monomer. An optionally substituted polystyrene is a polymeric chain formed from a styrene which may be unsubstituted, or wherein all or part of the monomers used to form the chain comprise one or more $C_{1-5}$ alkyl groups corresponding to any position on the monomer.

In other embodiments, one or more of the polystyrene chains and the polybutadiene chain may have guest monomeric units up to about 5%, about 10%, or about 50% of the total monomeric content. A guest monomeric unit is a monomer that is not an optionally substituted styrene which is incorporated into one or both of the optionally substituted polystyrene chains, or a monomer that is not an optionally substituted butadiene which is incorporated into the polybutadiene chain or is incorporated into a branching or a radially branching group. Examples of guest monomers include optionally substituted ethylenes, optionally substituted acrylates, and the like. In some embodiments, the SBS may be branched. In other embodiments, the SBS may be radially branched.

The amount of SBS in the soft asphalt emulsion may vary depending upon the circumstances. In some embodiments, the SBS is from about 0.1% (w/w) to about 10% (w/w), from about 1% (w/w) to about 5% (w/w), or about 2% (w/w) of the soft asphalt emulsion.

In other embodiments, the SBS is crosslinked. Crosslinking may be carried out using any of the many crosslinkers known in the art, as described above. The amount of crosslinker in the soft asphalt emulsion may vary depending upon the circumstances. In some embodiments, the crosslinker is from about 0.0001% (w/w) to about 1% (w/w), from about 0.005% (w/w) to about 0.2% (w/w), or about 0.08% (w/w) of the soft asphalt emulsion.

The soft asphalt emulsion may be prepared by a number of different methods. For example, the soft asphalt may be mixed with the unsaturated fatty acid at an elevated temperature to form a soft asphalt-fatty acid composition. The mixing may occur at any elevated temperature useful to provide adequate mixing. In some embodiments, the mixing temperature is from about 200° F. to about 450° F., from about 300° F. to about 400° F., or about 325° F. In a preferred embodiment, a combination of water and one or more surfactants are thoroughly mixed, and this surfactant liquid is then combined with the soft asphalt-fatty acid combination to provide a soft asphalt emulsion.

The mixing of the water and surfactant may be done at any temperature that allows such mixing. In some embodiments, the mixing is done at from about 32° F. to about 150° F., about 70° F. to about 90° F., or about 80° F.

The mixing of the surfactant liquid with the soft asphalt-fatty acid combination may be done at any temperature that allows adequate mixing. In some embodiments, the mixing is done with the soft asphalt-fatty acid combination having a temperature of from about 200° F. to about 450° F., or from about 280° F. to about 350° F., preferably about 300° F., and the water/surfactant combination, or soap system, having a temperature of from about 32° F. to about 150° F., or about 70° F. to about 110° F., preferably about 80° F. Once the heat is transferred from the warmer materials to the cooler materials, the temperature may be about 180° F. to about 210° F. as mixing continues.

The optionally substituted SBS is preferably added to the asphalt or the asphalt-fatty acid composition and mixed until the SBS is dissolved to provide a polymer modified soft asphalt. The polymer modified soft asphalt may be combined with the surfactant liquid in the same manner as the asphalt-fatty acid composition to provide other embodiments of the soft asphalt emulsion.

In other embodiments, a crosslinker is added to the polymer modified soft asphalt emulsion and mixed to provide, upon condensation, a crosslinked polymer modified soft asphalt. The crosslinker may be mixed under suitable conditions which will allow the crosslinker to be properly dispersed.

Composition A-Interlinked Substituted Crumb Rubber Concentrate

| Interlinked Substituted Crumb Rubber Concentrate (Component #1) | | | |
|---|---|---|---|
| Element | Weight (lbs) | Solids | Comments |
| 1) Asphalt | 60.5 | 60.5 | Typically AC5 (90-200 pen; R&B = 85-100 F.) |
| Raise #1 to 350 F. then add #2 and mix for ~15 minutes | | | |
| 2) Crumb Rubber | 30.0 | 30.0 | Vulcanized ground scrap tire: 650-75 micron range: varies; subjected to interlinked substitution |
| Sub-total | 90.5 | 90.5 | |

-continued

Interlinked Substituted Crumb Rubber
Concentrate (Component #1)

| Element | Weight (lbs) | Solids | Comments |
|---|---|---|---|
| 3) Amendment | 4.0 | 4.0 | Epoxidized soy oil or other functional vegetable oil derive. |
| Cool blend of #1 + #2 + #3 to ~200 F., then thoroughly blend Separately pre-blend #4 and #%, then add blend of #1-3 to achieve heavy mastic body consistency | | | |
| 4) 4819 | 1.5 | 1.2 | |
| 5) H₂O/Solvent | | | May contain small quantity of glycol ether or other solvent |
| Total | 96 | 95.7 | |

Composition A summarizes one embodiment of the preparation of the interlinked substituted crumb rubber concentrate. Asphalt (about 60.5 lbs, about 90-200 pen, ring and ball (R&B) softening temperature=about 85-100° F.) is heated to about 350° F. Crumb rubber (about 30 lbs, vulcanized ground scrap tire, about 650-75 micron range) is then added and the combination is mixed for about 15 minutes whereupon the crumb rubber swells and reacts in the asphalt medium to a viscosity range of about 900-1500 cps. Epoxidized soy oil is then added as amendment (about 4 lbs), and the mixture is thoroughly blended at about 200° F.

Water (about 4 lbs) and a fatty amine surfactant (Azko Nobel Readicote 4819, about 1.5 lbs) are mixed separately until the surfactant is dissolved. This surfactant solution is then mixed into the asphalt-crumb rubber blend prepared above until a heavy mastic body consistency is achieved.

Composition B-Hard Pen Asphalt Emulsion

Hard Pen Asphalt Emulsion (Compouent #2)

| Element | Weight (lbs) | Solids | Comments |
|---|---|---|---|
| 1) H20 | 36.50 | -0- | Potable |
| 2) ER 582 | 1.10 | 0.85 | P2 (Prime Plex) Surfactant - other options commercially available |
| 3 W-5 | 1.10 | 0.44 | Surfactant - Lignin Amine Meade Wesvaco Chemical |
| Sub-Total | 38.7 | 1.29 | |
| Pre-heat asphalt to 325° F. then co-mill with pre-blended 'soap' system (#1 + #2 + #3 @ 80° F.) through colloid mill | | | |
| 4) Asphalt | 61.30 | 61.30 | PDA or VTB or 'blown' (zero 10 pen: R&B = 155-165° F.) |
| Sub-Total | 100.00 | 62.59 | |

Composition B summarizes one embodiment of the preparation of the hard pen asphalt emulsion. Asphalt (about 61.3 lb, about 0-10 pen, R&B=about 155-165° F.) is heated to about 325° F. in a separate vessel. The soap is separately prepared by dissolving or dispersing an amido amine surfactant (ER 582 surfactant, about 1.1 lbs, available from PrimePlex), and W-5 surfactant (about 1.1 lbs, lignin amine Meade Wesvaco Chemical) in water (about 36.5 lbs).

The asphalt and soap are pumped into a mixing chamber of a high shear colloid mill. The combination of the hot asphalt and cold soap results in a mixing temperature below 200° F. Continued mixing in the high shear colloid mill produces an emulsion in which the oil droplets are suspended in water Composition C-Polymer Modified Asphalt Emulsion
Soft Pen-Polymer Modified Asphalt Emulsion

| Element | Weight (lbs) | Solids (lbs) | Comments |
|---|---|---|---|
| 1) Asphalt | 58.00 | 58.00 | VTB-AC5 or blend (pen = 20+; R&B = 60-85° F.) |
| 2) Amendment | 1.22 | 1.22 | Olefin from stearol family, e.g. oleic acid, amount varies |
| Pre-blend #1 + #2 at 325° F, then add #3 and run through high shear until dissolved. | | | |
| 3) SBS Elastomer | 2.00 | 2.00 | Radially branched, with crosslink functionality by sulfur compound |
| SubTotal | 61.22 | 61.22 | |
| 4) H2O | 36.58 | 0 | Potable |
| 5) ER582 | 1.10 | 0.85 | #4-7 are pre-blended soap system |
| 6) W-5 | 1.10 | 0.44 | |
| Subtotal | 38.78 | 1.29 | |
| Total | 100.0 | 62.59 | |

Composition C summarizes one embodiment of the preparation of the polymer modified asphalt emulsion. Asphalt (about 58 lbs, about 200+ pen, R&B=about 60-85° F.) is combined with an unsaturated fatty acid amendment (about 1.2 lbs) at about 325° F. and mixed until the composition is uniform throughout. Radially branched styrene butadiene styrene block copolymer (Kraton 1118, about 2 lbs), is then added, and the mixture is run through a high shear mixer until the polymer is dissolved, and the composition is mixed for at least about 8 hours at about 300° F.

A combination of water (about 36.5 lb) ER 582 (about 1.1 lb) and W-5 (about 1.1 lb) are thoroughly mixed at about 80° F. This is then co-milled with the cross-linked polymer modified asphalt at about 300° F.

Composition D-Asphalt Emulsion

| Element | Weight (lbs) | Solids (lbs) | Comments |
|---|---|---|---|
| Composition B | 28.17 | 58.00 | Stir Composition B and Composition C, then add Mastic, Composition A, until fully homogeneous. |
| Composition C | 19.00 | 11.89 | |
| Composition A | 35.00 | 34.45 | |
| Crosslinker | 1.00 | 0.50 | SL4005 Resin from PrimePlex |
| Total | 100.00 | 75.01 | |

Composition D summarizes one embodiment of the preparation of an asphalt-rubber binder emulsion which provides a minimum of about 15% crumb rubber based upon the total 'neat' binder weight per ASTM Standard D8-02. Composition B (about 45 wt. %) and composition C (about 19 wt. %) are thoroughly blended, and composition A (about 35 wt. %) is added under high speed shear until the mixture is fully homogeneous.

The procedure of Compositions A-D is carried out except that the preparation of Composition A is modified as follows.

Composition A-1-Interlinked Substituted Crumb Rubber Concentrate

| Crumb Rubber Concentrate (Component #1) | | | |
|---|---|---|---|
| Element | Weight (lbs) | Solids | Comments |
| 1) Asphalt | 60.5 | 60.5 | Typically AC5 (90-200 pen; R&B = 85-100 F.) |
| Raise #1 to 350 F. then add #2 and mix for ~15 minutes | | | |
| 2) Crumb Rubber | 30.0 | 30.0 | Interlinked substituted |
| Sub-total | 90.5 | 90.5 | |
| 3) Amendment | 4.0 | 4.0 | Epoxidized soy oil or other functional vegetable oil derive. |
| Cool blend of #1 + #2 + #3 to ~200 F., then thoroughly blend #4 to achieve heavy mastic body consistency | | | |
| 4) 4819 | 1.5 | 1.2 | |
| Total | 96 | 95.7 | |

Composition A-1 summarizes one embodiment of the preparation of the crumb rubber concentrate. Asphalt (about 60.5 lbs, about 90-200 pen, ring and ball (R&B) softening temperature=about 85-100° F.) is heated to about 350° F. Interlinked substituted crumb rubber (about 30 lbs, vulcanized ground scrap tire, about 650-75 micron range) is then added and the combination is mixed for about 15 minutes whereupon the interlinked substituted crumb rubber swells and reacts in the asphalt medium to a viscosity range of about 900-1500 cps. Epoxidized soy oil is then added as amendment (about 4 lbs), and the mixture is thoroughly blended at about 200° F. A fatty amine surfactant (Azko Nobel Readicote 4819, about 1.5 lbs) is then mixed into the asphalt-crumb rubber blend until a heavy mastic body consistency is achieved.

In another variation, Composition B (about 45 wt. %) and composition C (about 20 wt. %) are thoroughly blended, composition A (about 35 wt. %) is then added under high speed shear until the mixture is fully homogeneous. Finally, a crosslinker is added (1.0% Polycup® 4500 polymeric resin, as described in the product data sheet, available from PrimePlex, LLC).

A crumb rubber concentrate can be prepared as described above in Composition A and A1. The interlinked substituted crumb rubber employed is a finely ground tire (80-140 mesh). A cationic emulsion is then prepared having a pH of about 2.5 to about 4.5 using the crumb rubber concentrate as described in Composition A and A1. The emulsion is formulated to have about 50% to about 55% solids by distillation, about 15% to about 22% ground tire rubber, and have a viscosity of less than about 100 Saybolt universal seconds. The units of second in the context of viscosity is understood by those of skill in the art to refer to the Saybolt universal second, a measure of kinematic viscosity defined as the time that 60 cm³ of oil takes to flow through a calibrated tube at a controlled temperature, 38° C.

The emulsion thus prepared is diluted by about 50% and sprayed on street or highway asphalt pavement at spread rates of about 0.10 gal/sq. yd.

The skid coefficient (per ASTM E274-06) and the wet surface locked wheel stopping distance of a treated road is compared to the skid coefficient of an untreated road for smooth round stone aged pavement, angular aged pavement, and new pavement. In every case, the skid coefficient and the stopping distance was significantly better for the treated pavement.

A range of crushed aggregates can be added to the emulsions as prepared above. Up to 5 lbs/gal (of concentrated binder) are used. This will further improve skid coefficient, stopping distance, and other indicators of road performance.

A crumb rubber concentrate is prepared as described in Composition A or A1. The interlinked substituted crumb rubber employed is a finely ground tire (80-140 mesh). A cationic emulsion is then prepared having a pH of about 2.5 to about 4.5 using the crumb rubber concentrate as described in Composition A or A1. The emulsion is formulated to have about 50% to about 65% solids by distillation, about 4% to about 12% ground tire rubber, and have a viscosity of less than about 100 Saybolt universal seconds.

The emulsion thus prepared is diluted by about 25% to about 40% and sprayed or spread on parking lot asphalt pavement at spread rates of about 0.15 gal/yd² to about 0.30 gal/yd².

Asphalt (about 118 lb, about 0-10 pen, R&B=about 155-165° F.) is heated to about 325° F. in a separate vessel. A soap is separately prepared by dissolving or dispersing an amido amine surfactant (ER 582 surfactant, about 2 lbs, available from PrimePlex) in water (about 80 lbs). The asphalt and soap are pumped into a mixing chamber of a high shear colloid mill. The combination of the hot asphalt and cold soap results in a mixing temperature below 200° F. Continued mixing in the high shear colloid mill produces an emulsion in which the oil droplets are suspended in water. Hydrochloric acid (about 0.6 lbs) is then mixed into the composition to bring the pH to about 2.

Asphalt (about 30 lbs, about 90-200 pen, ring and ball (R&B) softening temperature=about 85-100° F.) is heated to about 350° F. and mixed with a carboxyfunctional blend of stearic acid, oleic acid, and palmitic acid (10/60/30 w/w/w; about 20 lbs), and a fatty amine surfactant (about 0.6 lbs RediCoat 4819, from Akzo Chemical). Part of this mixture (about 25 lbs) is then sprayed onto the surface of the interlinked substituted crumb rubber (about 75 lbs) by means of a Thermal Turbo Integrator, as supplied by PrimePlex, LLC.

The base asphalt emulsion formula (about 4 parts by weight) is then blended with the hydrophilicized asphalt-coated rubber (about 1 part by weight) to provide an emulsion of asphalt rubber binder wherein the crumb rubber is about 22 percent of the weight of the non-volatile components of the emulsion.

A mixture of wood rosin (3.5 lbs), mineral spirits (3.5 lbs), and a surfactant (1.4 lbs RediCoat E-7000 available from Akzo Chemical) are mixed with asphalt (about 60.9 lbs, about 150-200 pen, ring and ball (R&B) softening temperature=about 85-100° F.) at about 350° F. A fatty amine surfactant (about 0.7 lbs RediCoat 4819, from Akzo Chemical) and ground tire rubber (about 30 lbs, 80 mesh) are blended into the mixture under high shear to provide a mastic having 87% non-volatile components and about 30% ground tire rubber by weight.

The mastic (25 lbs) is combined with the base asphalt emulsion formula (15 lbs) and water (2.5 lbs) under high shear to provide an emulsion of asphalt rubber binder having about 16% ground tire rubber based upon the weight of the non-volatile components of the emulsion.

Rubberized asphalt conventionally comprises a regular asphalt mixed with crumb rubber made from recycled tires. Rubberized asphalt concrete (RAC) is a road paving material made by blending ground-up recycled tires with asphalt to produce a binder which is then mixed with conventional aggregate materials. This mix is then placed and compacted into a road surface. There are two primary types of binders for RAC, asphalt-rubber and terminal blend. Asphalt-rubber is defined by American Society for Testing and Materials (ASTM) Standard D6114 as "a blend of paving grade asphalt cement, ground recycled tire (that is, vulcanized) rubber and other additives, as needed, for use as binder in pavement construction. The rubber shall be blended and interacted in the hot asphalt cement sufficiently to cause swelling of the rubber particles prior to use." The asphalt-rubber binder is field blended (at the hot mix plant) and requires specialized mobile mixing equipment to produce. Typical crumb rubber modifier (CRM) content for asphalt-rubber ranges from 18-22 percent. The crumb rubber modifier used in asphalt-rubber is in the 10-16 mesh range. Asphalt-rubber been used in California for over 30 years. Terminal blends are binder materials that use finely ground (less than 30 mesh) crumb rubber modifier and are typically blended at the asphalt refinery. Terminal blend binders can contain 10 percent or less crumb rubber modifier, or as much as 15-20 percent in some uses. Terminal blend has 20 years of use in California. Conventional RAC has been promoted as a cost effective and environmentally friendly alternative to traditional road paving materials. However, conventional RAC suffers from certain disadvantages when compared to traditional road paving materials made using virgin rubber, including inferior durability and inferior maintenance of performance properties over the long term.

As discussed herein, by adjusting the amount of reactant, the degree of interlinked substitution of the crumb rubber can be adjusted from minimal interlinked substitution (e.g., a reduction of 10% or less of sulfur bonds over that of the crumb rubber feed) or maximum interlinked substitution (e.g., a reduction of 90% or more of sulfur bonds over that of the crumb rubber feed). Alternatively, by adjusting the amount of reactant or reaction conditions, the degree of particle size reduction can be adjusted, e.g., particle diameter reduced by 10% or more, e.g., 20%, 30%, 40%, 50%, 60%, 70%, 80%, or 90% or more, e.g., a smooth, homogeneous substance with no discernable particulate characteristic. Accordingly, an interlinked substituted rubber product having a preselected degree of interlinked substitution and/or preselected particle size can be prepared that is tailored for a particular application, e.g., a hot mix asphalt mixture, a cold patch asphalt mixture, a seal coat (fog seal, chip seal, tack seal, or slurry seal).

Any suitable process for preparing a rubberized asphalt emulsion can be employed. Typically, the rubberized product is provided in solution form (e.g., a partial solution with some suspended solids) and is combined with an emulsion of an asphalt in water to provide the emulsion of asphalt-rubber binder. Suitable solvents can include asphalt itself, or other hydrocarbon solvents as are known in the art.

Another use of some of the emulsions described herein may be as a street or highway seal. For example, the seal may stabilize and/or repair raveling and micro-fissure(s), interrupt progressive oxidative embrittlement, reverse diminished surface friction, or reduce tire noise.

Some emulsions described herein may also be used as a parking lot seal, for the maintenance of pavement in parking areas and, with appropriate aggregate, low speed traffic surfaces. For example, the seal may restore pavement surface profile, interrupt progressive oxidative embrittlement, create a fuel resistant barrier, eliminate tracking, extend the repaving cycle, reduce tire noise, or re-establish diminished surface friction. A cutter stock can be employed to control the PG grade in the final blend when the interlinked substituted rubber material is employed in paving asphalt applications. Raffex 200 yields a solubility of >99 wt. % at approximately 7.5 wt. % rubber. A heavy distillate, which is lower in viscosity, can be used for a cutter stock. A 40-50 wt. % stock solution of interlinked substituted rubber material in a cutter stock is suitable for use as an asphalt modifier for many paving applications.

Exemplary process oils include Raffex 120 and Raffene 750. Raffex 120 manufactured by San Joaquin Refining Co., Inc. of Bakersfield, CA, is an aromatic oil. Raffene 750L, also manufactured by San Joaquin Refining Co., Inc. of Bakersfield, CA, is a naphthenic oil. The properties of Raffex 120 and Raffene 750L, and related aromatic and naphthenic process oils are provided in the tables of FIG. 18 and FIG. 19.

Applications for Interlinked Substituted Rubber Material

As discussed herein, the interlinked substituted rubber material of the embodiments is suitable for use in a wide variety of applications, including the tire and paving applications discussed above, or any other applications wherein virgin rubber would be employed. By using various, reactive adhesive matrices, e.g., hot melts (e.g., asphalt, SBR, polyisobutylene (PIB), and polyethylene (PE)) and multicomponent reactives (e.g., fatty acid based polyols), artifacts have been made and the properties have been evaluated. These properties suggest that the compounded interlinked substituted rubber material can effectively compete with much more expensive silicone, urethane, epoxy, and ethylene-propylene-diene terpolymer (EPDM) based materials at a fraction of the cost. The compounded interlinked substituted rubber material is waterproof, exhibits lightweight structural properties, is abrasion resistance, resists exposure to salt, common chemicals, and hydrocarbon based fuels, and exhibits superior thermal and UV resistance. An interlinked substituted rubber material having properties tailored for a particular application can be obtained by adjusting the process dynamics associated with the entangled polymer-nanoparticle composite that is the interlinked substituted rubber material. For example, in some instances smaller particle size is not necessarily desirable, and there are certain morphological features as described herein that can provide superior performance to virgin rubber. The nano-particles have a profound effect on the mechanical properties of the polymer; therefore, controlling the in-service, entropic-enthalpic interaction of the host polymer chain motion (constraint and relaxation), in all time-scales, can provide many benefits.

It is observed that interlinked substituted rubber material performance attributes can precipitously drop with a particle size reduction below a dimension which is less than about 5-10 times the random coil radius of the host polymer. This is based upon a model where the original compound from the ground tire generally has a nano-particle cluster:polymer, random coil ratio bias (in favor of the polymer) of greater than 1.0:1.0.

The over two hundred elements that go into making a tire may be manifest at greater than 90% (as element count) of the mass of individual GTR particles, suggesting that characterizing uniformity of the interlinked substituted rubber material may not be possible, but this is not so. The dependable method for abrogating sulfidic influence as in the methods of the embodiments is deliberately 'gentle' upon disrupting the chemical and intermechanical properties of the composite and a system for classifying uniformity is in development. The composite, viscosity observational puzzle(s) which contradict the Einstein-Batchelor viscosity law will have a partial resolution once the sulfidic component has become non-influential. As a simple method of characterizing the resultant process yield by correlating optimal, process intensity and articulation emerges, it is expected that the interlinked substituted rubber material can be employed in a variety of products, including high performance applications. Examples for high performance applications include in-situ, monolithic, structural, self-insulating, foamed panels. Dried and ground, indigenous carbonaceous, cellulose rich vegetation may be chopper-gun formed with the regenerated GTR as a principal binder (at high loadings) into small, permanent, earthquake proof habitats. Secondary containment spray applied membranes may be installed in tanks and ships. Robot-sprayed, plural component, chemically resistant and pressure stable linings may be installed in aging sewer and water pipes without excavation. UBC compliant, monolithic roofing membranes may be factory manufactured membranes or sprayed in-place. New civil infrastructure underground piping may be protected with more durable coatings derived from interlinked substituted rubber material. Marine structures of all types may be corrosion protected with anti-fouling, PTR-based, composite coatings. Almost any article being currently produced which must be insect and vermin-proof, fuel-proof, mold and bacteria-proof, sun and salt-proof can be manufactured for superior performance with an interlinked substituted rubber material-based shell.

Re-Engineered Elastomeric Polymer Synthesis

A re-engineered, elastomeric polymer (REEP) which has been previously cross linked with sulfur compounds requires a disruption of the sulfur link and an insertion of alternative chemistry if it is to enhance the final properties of the composition into which the REEP is targeted as an essential element. Such polymers can include, e.g., ground tire rubber, rubber of another source, other elastomers such as cis-1,4-polyisoprene, trans-1,4-polyisoprene, natural polyisoprene, synthetic polyisoprene, polybutadiene, chloroprene rubber, halogenated butyl rubber, nonhalogenated butyl rubber, styrene-butadiene rubber, hydrogenated nitrile rubber, nonhydrogenated nitrile rubber, or other unsaturated rubbers capable of being cured by sulfur vulcanization or having carbon-sulfur bonds in the polymer's backbone, e.g., —C—$S_n$—C, where n is an integer of two or more. Re-crosslinking enhances oxidation resistance and mechanical properties, thereby improving the stress-relaxation and/or performance spectrum. The final, re-cross linked properties of the REEP may advantageously impart a thermosetting (rigid) or thermotropic (elastic) character to the completed composition. Beneficial reptation (elastomeric polymer relaxation) during the processing of a REEP is more readily accomplished during the intra-cross link manipulation stage as well (e.g., in conjunction with interlinked substitution as described herein).

Sulfur vulcanized REEPs predominantly consist of polysulfidic bridges with bond energies of approximately 150 kJ/mol. Reducing these bridges to a mono- or di-sulfidic state substantially improves the oxidation resistance of the host elastomer, as the bond energies of mono- or di-sulfidic bridges are approximately 270 kJ/Mol. Employing a one-step, 'click' metathesis wherein the sulfur bond is hybridized is a desirable step in preparing the REEP for final compounding into an elastomer-containing product.

Utilizing a Parallel, Continuous-flow, Micro-synthesis Reactor (PCMR) to conduct a single-pass, molecular re-assembly of a REEP can be based on a real time insight into the effectiveness of the reduction-substitution effort within the developing polymer morphology if it is to yield desired, post-reactor, dynamic mechanical analytics. Interacting polymer dipole moment within thin, "on-the-fly", loop delayed, cross sections of the reactor flow to an external, modulated electrical field, while capturing both permittivity and the field, curl gradient deviations, provides pinpoint differential data as to the changes taking place as a result of up-stream dosing stations. It also provides essential, intervention directives as to what additional electro-chemical 'input menu' might be required to achieve desired, final properties as the polymer completes the PCMR progression. Similar advantages can be ascertained within a PCMR environment by the utilization of curl gradience amplification (CGA) technology.

Figure 8A:
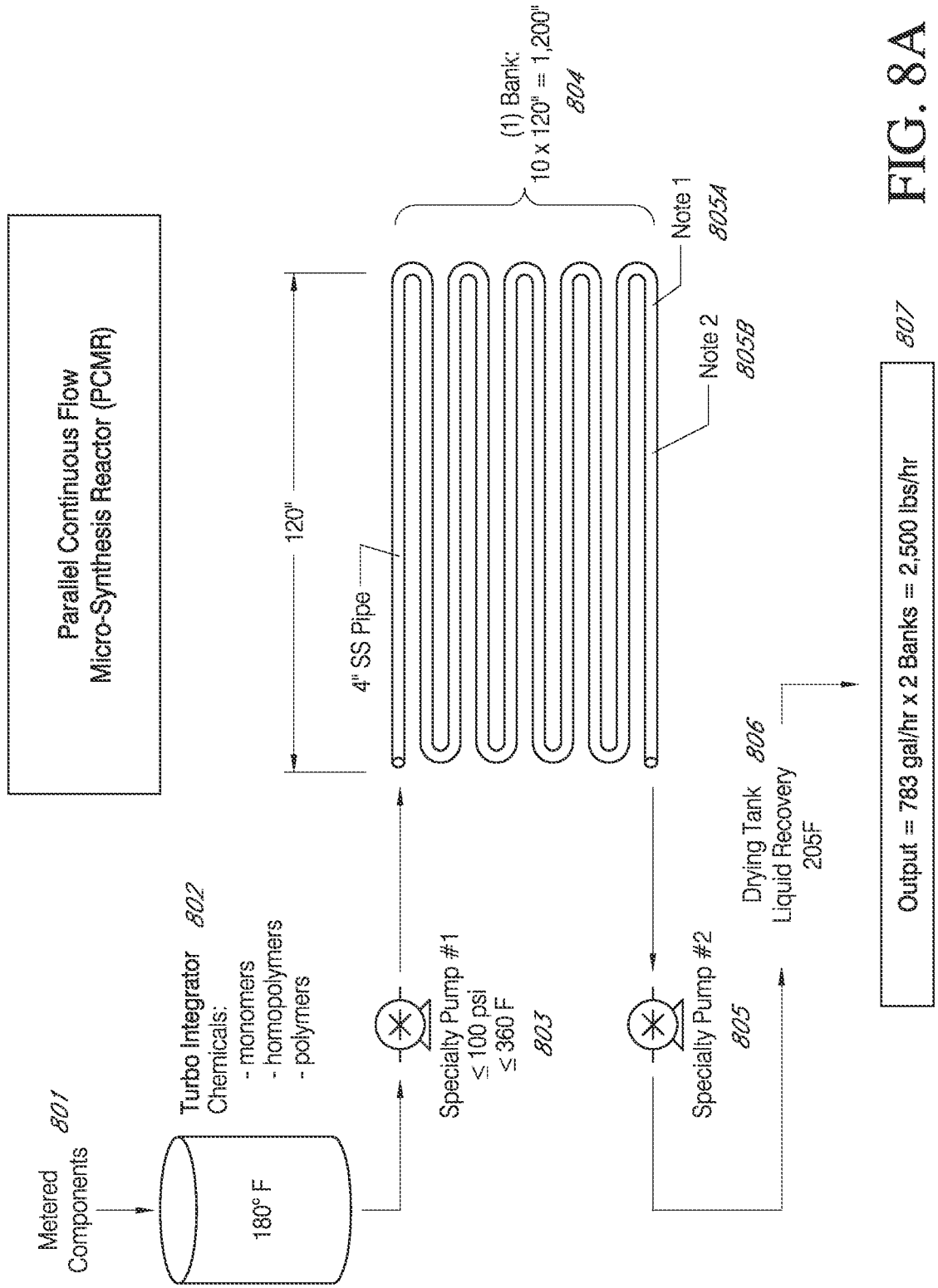
FIG. 8A depicts a Parallel, Continuous-flow, Micro-synthesis Reactor (PCMR).

FIG. 8A depicts a PCMR of one of the embodiments that utilizes a loop-molecular assembly propagation (L-MAP) process by curl gradience amplification. The L-Map Process as described herein integrates CGA technology into an advanced, modular, PCMR platform that possesses unequalled capabilities to create novel as well as re-engineered polymers. The reactor includes a turbo integrator 802 into which metered components 801 are added. These components can include monomers, homopolymers, polymers, and/or other components. In the embodiment depicted, an interlinked substituted rubber can be added to the turbo integrator along with other components for modification of the interlinked substituted rubber, e.g., one or more monomers, oligomers, or polymers to be grafted onto the interlink substituted rubber, or one or more reactants to functionalize the interlinked substituted rubber (e.g., end capping of a polymer chain, ionic substitution, etc.). In the embodiment depicted, the mixture of components is heated to 180° F. and fed into a specialty pump 803 (Specialty Pump #1). The pump depicted is configured to operate at pressures less than or equal to 100 psi, and at temperatures less than or equal to 360° F.; however, if higher pressures and/or temperatures are desirable for the particular mix of components being processed, then a different pump meeting the required pressure and temperature specifications can be substituted. The mixture is then fed by the pump into a bank of pipe 804. To minimize the footprint of the bank, the pipe is shaped in a serpentine configuration, and has a total length of 800 inches. The embodiment depicted includes stainless steel pipe 4 inches in diameter, which is configured into a bank of ten looped pipe segments, the bank having a length of 120 inches. As the mixture passes through the pipe, the components of the mixture react, yielding a re-engineered, elastomeric polymer having a preselected composition and properties. The output of the pipe is directed to a second pump 805 (Specialty Pump #2), which pumps the reacted mixture to a drying tank 806 for liquid recovery (e.g., at 205° F.). The configuration depicted in the embodiment is capable of outputting 783 gal/hr of slurry 807 when a set of two banks are employed. The reactor can be scaled to any suitable configuration. For example, one or more turbo integrators or other mixing devices as are known in the art can be employed, optionally with heating or cooling capability, pressurization, or maintenance of an inert atmosphere. A single turbo integrator can supply one or more banks, or multiple turbo integrators can supply a single bank. One or more pumps can be employed, either in serial to a single bank, in parallel to a single bank, or a single pump can provide multiple banks with appropriate piping or valves. As discussed above, the pumps can be selected based on the desired properties of the mixture to be pumped (temperature, pressure, etc.). In certain embodiments, the mixture from the bank may be employed directly in subsequent processes (e.g., omission of Specialty Pump #2 and/or drying tank from the reactor). While 4 inch stainless steel pipe is employed in a bank, other diameters can advantageously be employed, e.g., 0.25 inches or less to 6 inches or more in diameter, and any suitable pipe length can be employed that allows the components of the mixture sufficient residence time to react to produce a preselected product, e.g., 50 inches or less to 2500 inches or more. In some embodiments it may be desirable to operate multiple banks in a serial configuration, optionally with a pump situated between the banks, e.g., so as to permit longer residence time or use of pumps capable of operating on a reduced pressure. The pipe(s) can be fitted with strategic static mix and chemical injection points to facilitate reaction 804A (FIG. 8A, Note 1) and integrated curl gradience amplification (CGA) ports 804B (FIG. 8A, Note 2). The pipe(s) can also be, partially or entirely, in a controlled thermal space, e.g., a heating or cooling jacket or temperature controlled immersion bath can be employed. Alternatively, the pipe(s) can be exposed to ambient conditions.

Figure 8B:
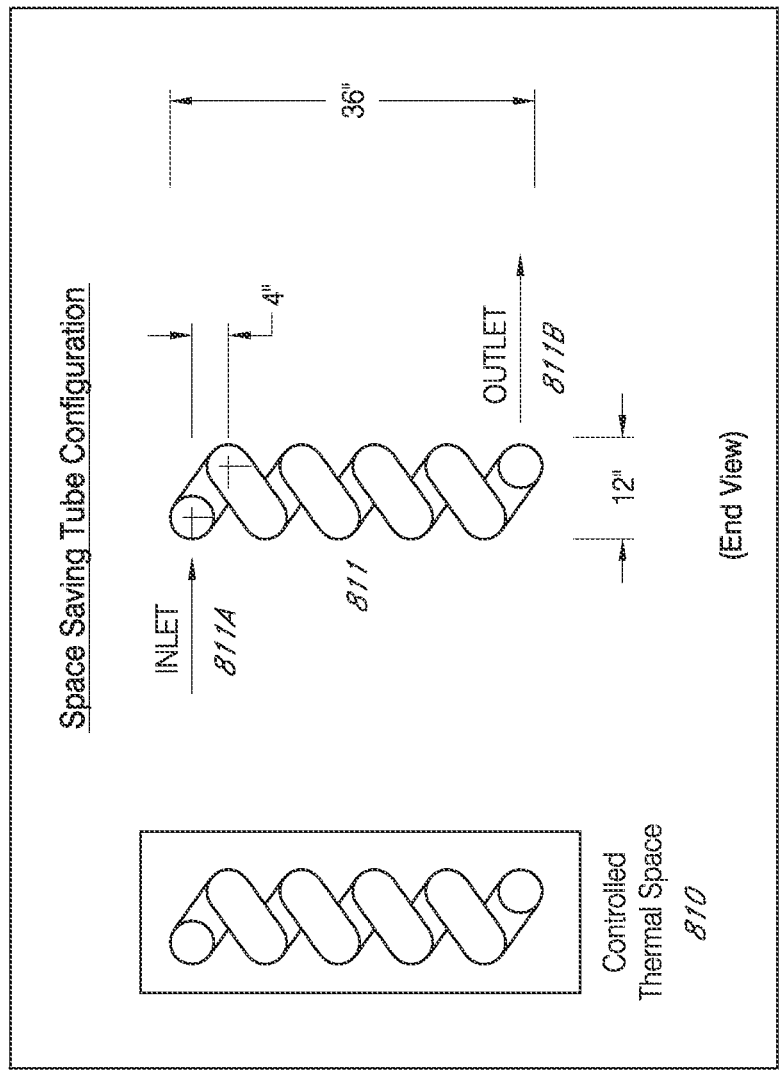
FIG. 8B depicts a space saving tube configuration for use, e.g., in a PCMR.

FIG. 8B depicts a space saving tube configuration. In this configuration, the tube 811 is spiraled, and can be in a controlled thermal space 810. This spiral tube configuration can be extend along an axis from the inlet end 811A to the outlet end 811B, or can be further configured into a serpentine configuration of spiraled tube to reduce the footprint of the bank even further.

The PCMR of the embodiments can advantageously be employed to functionalize or react interlinked substituted product as described herein in a manner similar to how virgin rubber is reacted or functionalized. Graft polymerization, chain end functionalization, and the like can be conducted. The resulting products can be made suitable for use in asphalt binder, tire rubber, specialty rubber products, and the like.

Example 1—Bench Scale Testing

The starting material was 100 g of 30 mesh whole tire cold ground tire rubber (GTR). By calculation based on typical tire composition, the starting material was estimated to comprise approximately 40% by weight rubber by weight and approximately 2.5% by weight of rubber mass of elemental sulfur (approximately 2.5 grams of sulfur; molecular weight 32.065 g/mol). Assuming that the sulfur chains between polyisoprene strands in the vulcanized rubber average 8 atoms in length, then 25% of the sulfur (0.625 g; 0.0195 mol) is assumed to be bonded directly to a polyisoprene chain, and for each of these bonded sulfur atoms, one acetate moiety (OAc) is required to replace the bonded sulfur atom. 5.0 grams of copper (II) acetate (molecular weight 181.63 g/mol) was provided for interlinked substitution (0.0275 mol of $Cu(OAc)_2$ corresponding to 0.0550 mol of acetate ion), which was an excess of acetate to sulfur bonded directly to a polyisoprene chain (as opposed to sulfur bound to two other sulfur atoms in a crosslinking sulfur chain). Reaction time to a "gum state" was approximately 20 seconds. Heat and pressure were generated using a heated mortar-pestle apparatus mounted to a hot plate and pressure calibrated with a 150 RPM drill press assembly.

After 50 cycles at 275° F. and approximately 100 psi, the particle size was reduced to a 90% pass through a 1.0 µm, as measured according to ASTM D 2042. The resulting particles were observed to adhere to other particles, forming a film, indicative of restored side chain functionality (interlinked substitution) resulting from the sulfidic scavenging process. The resulting film was <1.0 µm thick, as measured using a film thickness gauge 0-0.001 mm Yasuda Model 128 or equivalent. A 10% by weight solution in distilled water of the whole tire cold ground tire rubber was prepared as was a 10% by weight solution in distilled water of the interlinked substituted product. No comparative change in pH was observed.

Initial tests were performed per SHRP/AASHTO protocols and showed that substantial flexibility was imparted to a PG 67-10 asphalt binder base when the interlinked substituted product was added. 10% of the interlinked substituted product (<1.0 µm) when added to a PG 67-10 asphalt binder base and blended under a high shear Silverson Mixer raised the dynamic shear (as measured by a dynamic shear rheometer) to that characteristic of a PG 82-22 asphalt binder base.

Example 2—Horizontal Compression Reactor

The starting material was 30 mesh whole tire cold ground tire rubber. The starting material was estimated to comprise approximately 40% by weight rubber by weight and approximately 2.5% by weight of rubber mass of elemental sulfur. Copper (II) acetate in powder form was provided for interlinked substitution. The ground tire rubber and copper acetate were mixed together (4% by weight copper (II) acetate to 96% whole tire cold ground tire rubber) and then fed into a horizontal compression reactor as in FIGS. 11A-C.

After a total of 10 cycles through the reactor at 275° F. and approximately 100 psi, the particle size was reduced to <200 mesh, and after a total of 50 cycles through the reactor at 275° F. and approximately 100 psi, the particle size was reduced to approximately 1.0 µm. The resulting particles were observed to adhere to other particles, forming a film, indicative of restored side chain functionality resulting from the sulfidic scavenging process.

Initial tests were performed per SHRP/AASHTO protocols and showed that substantial flexibility was imparted to a PG 67-10 asphalt binder base when the interlinked substituted product was added. 10% of the interlinked substituted product (<1.0 µm) when added to a PG 67-10 asphalt binder base and blended under a high shear Silverson Mixer raised the dynamic shear (as measured by a dynamic shear rheometer) to that characteristic of a PG 82-22 asphalt binder base.

Example 3—Micro-Compounder—Dry Reactant

The starting material was 30 mesh whole tire cold ground tire rubber. The starting material was estimated to comprise approximately 40% by weight rubber by weight and approximately 2.5% by weight of rubber mass of elemental sulfur. Copper (II) acetate in dry powder form was provided for interlinked substitution. The ground tire rubber and copper acetate were mixed together (4% by weight copper (II) acetate to 96% whole tire cold ground tire rubber) and then fed into a micro-compounder as depicted in FIGS. 12A-C, yielding a mixture of 4% by weight copper (II) acetate to 96% whole tire cold ground tire rubber.

The mixture was processed in the micro-compounder at 250° F. and approximately 80-100 psi, for a duration of approximately 1 hour, and approximately 750 g of product, comprised of rubbery particles was obtained. The elasticity of one of the particle masses was demonstrated by the mass being stretched.

Example 4—Micro-Compounder—Aqueous Solution of Reactant

The starting material was 30 mesh whole tire cold ground tire rubber. The starting material was estimated to comprise approximately 40% by weight rubber by weight and approximately 2.5% by weight of rubber mass of elemental sulfur. A sufficient amount of water to dissolve the copper (II) acetate was mixed with the copper (II) acetate. The most effective distribution of the copper (II) acetate is achieved by pre-dissolving in warm distilled water ($H_2O$) at 150° F., at a 5% solution. This is then blended into the dry, ground tire rubber such that the blend becomes a pourable or pumpable slurry. 4 parts by weight copper (II) acetate was provided for 96 parts by weight whole tire cold ground tire rubber. The ground tire rubber and solution of copper acetate were mixed together and then fed into a micro-compounder as depicted in FIGS. 12A-C.

The slurry was processed in the micro-compounder at 250° F. and approximately 80-100 psi, for a duration of approximately half an hour, and approximately 750 g of product, comprised of rubbery particles, was obtained. The resulting product was similar to that obtained from a dry mixture of copper (II) acetate and whole tire cold ground tire rubber in terms of resulting particle size and interlinked substitution, while requiring less reactor time to completion.

During the processing of the GTR/copper (II) acetate slurry, the reactor vessel head space, temperature and pressure are held at a point such that the liquid phase of the water porpoises along a vapor phase-liquid curve. This point has been determined to be between 70-100 psi within a temperature range of 265° F.-305° F. This process technique substantially improves the permeation of the copper acetate chemistry into the inner reaches of the ground tire rubber fragment.

Example 5—Asphalt Modifier

The product of Example 3 ("test PTR") was tested for use as an asphalt modifier, e.g., for use as a binder in hot mix and as an emulsion base for paving applications. A sample of paving asphalt was obtained from San Joaquin Refining Co., Inc. of Bakersfield, Calif. The specifications of the Paving Asphalt PG 64-10, Product 2185 ("test asphalt") are provided in FIG. 13.

Initial solubility and separation testing was conducted by dispersing the test PTR in Raffex 200 process oil ("test process oil") to yield a 50% by weight mixture. The blend was easily flowable at room temperature through the micro-compounder. The resulting mixture of test PTR and test asphalt exhibited a solubility >99% and a separation remaining at or above minimums for the PG 64-10 standard were achieved.

The test process oil had an ambient viscosity similar to that of 40 weight motor oil, such that a mixture of test PTR and test asphalt would be expected to significantly dilute the asphalt, impacting high temperature performance. A mixture of 40 parts by weight test PTR 40 to 10 parts by weight Raffen 200 to 50 parts by weight test asphalt would be expected to improve the high temperature performance to, e.g., PG76, but may require adjustments to the polymer to maintain acceptable cold temperature properties.

Example 6—Asphalt Modifier

A sample of the test asphalt was warmed at a temperature at or below 275° F. for less than one hour (referred to as "test base" or "SJR PG 64-10 Base"), then blended with the test PTR at a weight ratio of 15 parts test PTR and 85 parts test asphalt to yield a mixture (referred to as "test mixture", "PTR PG 64-10", or "Prism PG 64-10"). The test base and the test mixture were subjected to testing to determine compliance to the Caltrans specification for PG 64-10 asphalts including specific gravity and multiple stress creep recovery (MSCR). The test mixture was also subjected to separation testing. The base sample was tested to determine specification compliance as prescribed by AASHTO M320. Additional tests required by the Caltrans PG specification were also performed. The test mixture was stirred for 10 minutes at 300° F. using a Silverson Mixer to ensure homogeneity. The test mixture was then tested for grade determination as per AASHTO R29. Additional tests required by Caltrans PG specification were also performed, as shown in the data of FIG. 14A. The MSCR testing was performed as per AASHTO T350, as shown in the data of FIG. 14B. The separation test was performed by pouring the sample into a cigar tube and storing the sample at 325° F. (163° C.) for 48 hours. The top and bottom third of the tube were then tested for Dynamic Shear Rheology (SDR), as shown in the data in FIG. 14C. The test mixture was determined to be suitable for use as an asphalt modifier, and exhibited compliance with the Caltrans PG specification.

Example 7—Morphology of PTR

The product streams generated by a method conducted in an alternate batch mode process utilizing a stirred pressure vessel were observed after numerous runs. It was observed that tiny, golden fibers with a cross section of about 0.002 inches-0.005 inches, and of a variable length, were present within the interlinked substituted rubber material. The fibers are expected to only be destroyed by excessive heat (temperatures higher than those employed in the interlinked substitution process described herein, and higher than those characteristic of hot mix processes) and will not dissolve in trichloroethylene (TCE).

The fibers' presence can be expected to not add significant mass to the insoluble component of the sub-micron interlinked substituted rubber material but it is expected to plug a one-micron filter pore, making the actual filter medium less porous, and thereby leading to a false reading of the filtrate concentration quanta. Samples of interlinked substituted rubber material in a form of a slurry were passed through a high temperature-high pressure piston-diaphragm pump and through a high strength, sintered filter capable of handling up to 50,000 psi through a 1.0 micron orifice. This further processing, which is believed to reduce the overall length of the fibers, yielded a smooth mixture capable of passing through a one-micron filter pore. The further processing readily disintegrated the rubber into an easily dispersible, sub-micron moiety, with some release of carbon black.

This fiber component derived from recycled tire may greatly improve the strength of the bond between the asphalt to which the interlinked substituted rubber material is added (e.g., as a binder or adhesive) and the aggregate, thereby improving overall pavement performance, yielding a superior pavement when compared to one prepared from aggregate and asphalt containing virgin rubber.

PTR in Black Master Batch

Interlinked substituted rubber material, generated using lab scale equipment analogous to the apparatus depicted in FIG. 1 under conditions similar to those set forth in FIG. 2, was added to a known-property base black master batch of virgin rubber at an amount of 10 wt. %, (after adjustment for filler materials in the interlinked substituted rubber material). The resulting 10 wt. % mixture was subjected to thermogravimetrical analysis and other testing. The resulting 10 wt. % mixture was observed to be near-equivalent in homogenizable, physical properties to the known-property base black master batch of virgin rubber, such that it will not affect the final performance of a new tire, or can be used in a base black master batch at a higher loading than the upper limit of 3 wt. % that has traditionally been employed for small-particle (200 mesh), fully-vulcanized, ground tire rubber. In other words, the interlinked substituted rubber material was observed to be suitable for use in fabricating tires as the sole rubber source, or it can be used in combination with base black master batch at loadings above 3%, e.g., 4, 5, 6, 7, 8, 9, 10, 15, 20, 25, 30, 35, 40, 45, 50, 55, 60, 65, 70, 75, 80, 85, 90, or 95 wt. % or more.

The interlinked substituted rubber material was observed to be near elemental sulfur-free, to have a morphology similar to composite virgin rubber, to be <50 micron in particle size, with substantial elastomer retention of the carbon black. The material is suitable for use as at least 20% and up to 50, 60%, 70, 80, 90%, or more (e.g., as much as 100%) of the sidewall of new, light truck and auto tires. Such an interlinked substituted rubber material is also suitable for use in membranes and industrial rubber goods.

IPREX Rubber Polymer

InterPenetrating Regenerative Elastomer Xlink (IPREX) Rubber Polymer (IRP) is a microlaminated, anisotropic structural rubber sheet. It is composed of multiple, vacuum-heat fused and cross linked layers, each being in the range of 10-70 microns thick. The material comprises carbon filled, interpenetrating polyisoprene-polybutadiene elastomer chains, regenerative, realigned crosslinks by transverse sulfidic bridges. The individual laminae exhibit a near-zero loop probability and bias-directional, parallel-reptated, intertwined, elastomer backbone structure(s) which, when progressively laid-up during construction at 30-45 degrees to the anisotropic 'grain' of each preceding laminae, produces a finished sheet exhibiting superior torsional strength and resilience to comparable isotropic sheets of similar material and cross-section thickness. Pre-cross linked feedstock is processed into thin laminae through a variable nip, high pressure roll mill. IPREX Rubber may be fabricated in two steps from previously cross linked, black master batch virgin feedstock prepared for tire or other engineered rubber products and/or EOL whole tire scrap which has subsequently been parted into small rubber particles (typically 30 mesh, ambient ground tire rubber), which are then subsequently re-compounded according to predetermined, PRISM Reactor process parameters as described herein. IPREX Rubber may be compounded to form an interpenetrating and cross linked, elastomer network with other elastomers, such as functionalized SiR, for enhanced chemical and heat resistance. IPREX rubber is suitable for use in tire wall construction, code compliant electrical tape and potting compounds, industrial belting and hoses, high temperature fabrics and gaskets, geo-liners, roofing and waterproofing membranes, colloidal suspensions for industrial adhesives, and super-pave, PG hot-melt, asphalt binder modification.

Post-Reactor GTRP-Containing Vehicle Tire Performance

The post-reactor GTRP has a clumpy, non-uniform appearance exiting the reactor. After drying and compounding with cross-link agents and other optional hybrid elastomers, typically accomplished in a high shear, internal mixer such as a twin arm Banbury or sigma blade mixer, the GTRP is passed through a narrow, roll mill nip where it becomes a thin sheet. This thin sheet, unlike conventional, virgin, black master batch (VBMB) elastomer composite compounds, similarly processed, may exhibit an anisotropy in length tensile strength to width tensile strength of up to approx. 3:1. The factors that may contribute to the degree of anisotropy include the reactor-controlled loop probability reduction, manipulation of the degree of crosslink dislocation, and/or reduction of internal mixing time.

Reactor Controlled Loop Probability Reduction

This factor can statistically add, on average, 12.5% by weight of additional, effective elastomer to the resulting matrix, inasmuch as once the same-backbone, methyl carbocation precursor-bonded, sulfuric bridge is dislocated, the elastomer is released to dynamically orient (and remain so) as a reptation-bias, along the lateral axis of compression-travel (which is perpendicular the face of the roll mill nip).

Manipulation of the Degree of Cross Link Dislocation

The resilience of remaining, EOL tire cross-links induce a variable, residual resistance to size reduction during compounding and final sheet preparation, wherein the not-fully dislocated particle resists being flattened by the roll mill pressure. This appendage acts as an anchor, being drug along by that portion of the elastomer matrix that more readily achieves reptate-like dynamics. The effect is a reptate-bias in the lateral direction of compression-travel between the rolls.

Reduction of Internal Mixing Time

Post-reactor, GTRP particle, final particle size reduction is a function of the number of wiping cycles the particle endures within the mixer (e.g., twin arm mixer). Since typically only minimal amounts of additives are employed to prepare the GTRP for milling into a sheet for many applications, excessive high shear is not necessitated except when the taking the clumps into progressively smaller dimensions is desired. This manipulation in mixing time can have a similar, but slightly less pronounced, dragging-anchor-effect to that previously described herein.

Where isotropism is advantageous, the GTRP can be handled in a manner which is the inverse of these three discriminators. However, unlike VBMB, the anisotropic quality can have great advantage in structures which must undergo persistent flexing, yet remain dimensionally stable, such as the sidewall of a vehicle tire.

Treated Rubber for Tire Applications

Industry averages place approx. 15% of the vehicle's operational fuel consumption upon overcoming the rolling resistance of the vehicle tire. Most of that resistance is due to tire squirm as, with each revolution, the tread wanders back and forth in an irregular, sinusoidal pattern to the direction of travel as the tread section comes in contact with the pavement. This distortion is restrained by the resilient, torsional properties of the tire sidewall, transmitted to the solid rim and suspension of the vehicle. Tire manufacturing design and construction utilizes a reinforcement fabric, placed at 15-90 degrees to the vertical, rolling tire plane, which is laminated between the isotropic VBMB to achieve a composite structure that maintains a safe, effective rolling structure. However, it takes significant energy to overcome the broad range of torsional mechanics associated with traveling over a variety of surface conditions at variable speeds.

A 40 mil (~1 mm) thick micro-laminated, GTRP sheet, composed of four 0.010" thick sheets laid-up as a four, micro-ply assembly, with each sub-ply placed at approximately 45 degrees to the succeeding laminate, demonstrates an increase of approximately 30% or more in resistance to torsional distortion as compared to a similarly prepared VBMB micro-laminate. Using quantified foot-pound force, torsional mechanical models, a tire construction utilizing this anisotropic micro-laminate, particularly as a component in the two outer-most laminates of tire construction, where the stress from dimensional radius of distortion is the greatest, predicts rolling resistance reduction per unit of tire carcass weight of between 9.5% and 16%. A ten percent (10%) reduction in tire rolling resistance, based upon current global fuel consumption, equates to an annual savings of over six billion gallons (6,000,000,000 gal) of fuel. Accordingly, the treated rubber of the embodiments is particularly useful in tire applications, e.g., as microlaminated sheets (e.g., 2-100 or more sheets, e.g., 2-20, 2-20, or 2-5 sheets laminated together) for use in tire sidewall applications.

Treated Rubber for High Performance Applications

The rubbers and rubber-containing materials of the various embodiments may be manufactured to meet one or more of the following specifications. In certain embodiments, rubber and rubber goods meeting one or more of the MIL-R specifications listed below are provided. These can include but are not limited to tire tread, tire sidewall, roofing membrane, high dielectric electrical tape, tank lining, reservoir lining, trench lining, bridge underlayment, foundation waterproofing, parking garage waterproofing, hose, belt, molding, or other rubber goods prepared from molded rubber or rubber sheeting (e.g., gaskets, tubing, shock absorbing materials, floor mats and bed liners for vehicles, mats and flooring materials for commercial and residential construction, underlayments for floors, decking, and concrete, sound proofing, etc.) Other products include elasticized bands in clothing and hair ties, dishwashing gloves, toys, jar seals and tires, welcome mats, garden hoses. Other household rubber items include boots, raincoats, pond liners, mattresses and cushions, pillows, grips on garden tools, bathtub plugs, doorstops, earplugs, hot water bottles, aquarium tubing, faucet washers and backing for rugs. Stoppers for lab flasks and vials, chemical resistant mats and pads, prosthetics and other specialized products and equipment can be made from the rubber of the embodiments, as can rubber food and water bowls, chew toys and balls, foam rubber mattress pads, stall mats, elasticized vet wraps, flea collars, shed mitts and rubber combs, mouse pads, keyboards, adhesives and rolling chair wheels, anti-fatigue mats, carpet underlayment, head phone pads and rubber stamps, inflatable beds for camping, playground tiles, rubber ducks, sportswear, scuba suits, vehicle components for civilian and military use; boat, ship, and submarine components for civilian or military use; airplane, passenger plane, and fighter jet components, railcar and train engine components, residential and commercial building products, factory or industrial or manufacturing components, clothing and footwear components.

The treated rubber of the embodiments may be employed in rubber products that meet or exceed one or more of the following ASTM specifications, military specifications (MIL), aerospace material specifications (AMS), and/or other specifications as are employed in various industries using rubber goods.

ASTM C542 (ASTM C 1166 Procedure)—Low Smoke, Low Flame, Low Toxicity Neoprene

ASTM E662—Low Smoke, Low Flame, Low Toxicity Neoprene

ASTM D1330 Grade 1—Premium SBR—Style 22

ASTM D1330 Grade 2—Red Rubber SBR—Style 20

ASTM D2000 1AA 430—Natural Rubber—Style 28

ASTM D2000 1AA 704 Z1 (Z1=75±5 Durometer)—Red Rubber SBR—Style 20

ASTM D2000 M1AA 407—Butyl

ASTM D2000 M1AA 417—Natural Rubber, Pure Gum Floating Natural Rubber, EZ Cut Non-Floating Gum Natural Rubber, Protein Free (Synthetic Polyisoprene) Natural Rubber ASTM D2000 M1AA 503—Commercial EPDM ASTM D2000 M1AA 507—Butyl ASTM D2000 M1AA 517—Natural Rubber ASTM D2000 M1AA 606—Commercial EPDM ASTM D2000 M1AA 607—Butyl ASTM D2000 M1AA 617—Natural Rubber ASTM D2000 M1AA 703 Z1 (Z1=75±5 Durometer)—Specification Grade SBR (Red)

ASTM D2000 M1AA 706—Commercial EPDM

ASTM D2000 M1AA 710—Butyl

ASTM D2000 M4AA 407 A13 B13 C12 F17

ASTM D2000 M4AA 421 F17 G21—Tuff-Stuff® Natural Rubber

ASTM D2000 M4AA 510 A13 B13 C12 F17—ASTM D2000 M4AA Specification Grade (EPDM)

ASTM D2000 M4AA 610 A13 B13 C12 F17

ASTM D2000 M4AA Specification Grade (EPDM)

ASTM D2000 M4AA 710 A13 B13 C12 F17

ASTM D2000 M4AA Specification Grade (EPDM)

ASTM D2000 M2BA 407 C12 F17—Premium EPDM—Style 45

ASTM D2000 3BA 508 C12—Commercial EPDM—Style 40

ASTM D2000 3BA 515 A14 B13 C12 F17—Premium EPDM—Style 45

ASTM D2000 3BA 608 C12—Commercial EPDM—Style 40

ASTM D2000 3BA 615 A14 B13 C12 F17—Premium EPDM—Style 45

ASTM D2000 3BA 708 C12—Commercial EPDM—Style 40

ASTM D2000 3BA 715 A14 B13 C12 F17—Premium EPDM—Style 45

ASTM D2000 3BA 815 A14 B13 C12 F17—Premium EPDM—Style 45

ASTM D2000 1BC 408—Commercial Neoprene—Style 10

ASTM D2000 1BC 508—Commercial Neoprene—Style 10, Matte Finish Neoprene—Style 12

ASTM D2000 1BC 515—Mid-Grade Neoprene—Style 15

ASTM D2000 1BC 609—Commercial Neoprene—Style 10, Matte Finish Neoprene—Style 12

ASTM D2000 1BC 615—Mid-Grade Neoprene—Style 15

ASTM D2000 1BC 710—Commercial Neoprene—Style 10, Matte Finish Neoprene—Style 12

ASTM D2000 1BC 715—Mid-Grade Neoprene—Style 15

ASTM D2000 1BC 810—Commercial Neoprene—Style 10, Matte Finish Neoprene—Style 12

ASTM D2000 M1BC 303—Mid-Grade Neoprene—5100 Series, Premium Neoprene

ASTM D2000 M1BC 403—Mid-Grade Neoprene—5100 Series, Neoprene Molded Slabs

ASTM D2000 M1BC 407—Premium Neoprene

ASTM D2000 M1BC 507—Mid-Grade Neoprene—5100 Series, Neoprene Molded Slabs

ASTM D2000 M1BC 510—Premium Neoprene

ASTM D2000 M1BC 607—Mid-Grade Neoprene—5100 Series, Neoprene Molded Slabs

ASTM D2000 M1BC 610—Premium Neoprene

ASTM D2000 M1BC 707—Mid-Grade Neoprene—5100 Series, Neoprene Molded Slabs

ASTM D2000 M1BC 710—Premium Neoprene

ASTM D2000 M1BC 807—Mid-Grade Neoprene—5100 Series, Neoprene Molded Slabs

ASTM D2000 M1BC 810—Premium Neoprene
ASTM D2000 M1BC 907—Premium Neoprene
ASTM D2000 M2BC 407 A14 B14 C12 F17 Z1—(Z1=Fungus Resistance per MIL STD 810, Method 508), Anti-Microbial Neoprene
ASTM D2000 M2BC 410 A14 B14 C12 E034 F17
ASTM D2000 M2BC Specification Grade (Neoprene)
ASTM D2000 M2BC 510 A14 B14 C12 F17 Z1—(Z1=Fungus Resistance per MIL STD 810, Method 508), Anti-Microbial Neoprene
ASTM D2000 M2BC 510 A14 B14 C12 E034 F17
ASTM D2000 M2BC Specification Grade (Neoprene)
ASTM D2000 M2BC 610 A14 B14 C12 F17 Z1—(Z1=Fungus Resistance per MIL STD 810, Method 508), Anti-Microbial Neoprene
ASTM D2000 M2BC 610 A14 B14 C12 E034 F17
ASTM D2000 M2BC Specification Grade (Neoprene)
ASTM D2000 M2BC 710 A14 B14 C12 E034 F17
ASTM D2000 M2BC Specification Grade (Neoprene)
ASTM D2000 MICA 410—Peroxide Cure EPDM
ASTM D2000 MICA 510—Peroxide Cure EPDM
ASTM D2000 MICA 610—Peroxide Cure EPDM
ASTM D2000 MICA 710—Peroxide Cure EPDM
ASTM D2000 MICA 810—Peroxide Cure EPDM
ASTM D2000 1BF 408 Z1 (Z1=Meets basic requirements of BF materials), Commercial Nitrile (Buna-N)—Style 35
ASTM D2000 1BF 508 Z1 (Z1=Meets basic requirements of BF materials), Commercial Nitrile (Buna-N)—Style 35
ASTM D2000 1BF 609—Commercial Nitrile (Buna-N)—Style 35
ASTM D2000 1BF 710—Commercial Nitrile (Buna-N)—Style 35
ASTM D2000 1BF 810—Commercial Nitrile (Buna-N)—Style 35
ASTM D2000 1BG 610—FDA Nitrile (Buna-N)—Style 37
ASTM D2000 M1BG 407—Premium Nitrile (Buna-N)
ASTM D2000 M1BG 503 Z1 (Z1=45±5 Durometer), WARCO White® FDA Nitrile (Buna-N)
ASTM D2000 M1BG 507—Premium Nitrile (Buna-N)
ASTM D2000 M1BG 607 Z1 (Z1=55±5 Durometer), WARCO White® FDA Nitrile (Buna-N)
ASTM D2000 M1BG 610—Premium Nitrile (Buna-N)
ASTM D2000 M1BG 707 Z1 (Z1=65±5 Durometer), WARCO White® FDA Nitrile (Buna-N)
ASTM D2000 M1BG 710—Premium Nitrile (Buna-N)
ASTM D2000 M1BG 803—WARCO White® FDA Nitrile (Buna-N)
ASTM D2000 M1BG 810—Premium Nitrile (Buna-N)
ASTM D2000 M1BG 910—Premium Nitrile (Buna-N)
ASTM D2000 5BG 613 A14 B14 E014 F17—Premium Nitrile (Buna-N)—Style 36
ASTM D2000 5BG 620 A14 B14 E034—Transformer Oil Nitrile (Buna-N)
ASTM D2000 5BG 720 A14 B14 E034—Transformer Oil Nitrile (Buna-N)
ASTM D2000 M5BG 407 A14 B14 E014 E034 F17—ASTM D2000 M5BG Specification Grade (Nitrile/Buna-N)
ASTM D2000 M5BG 507 A14 B14 E014 E034 F17—ASTM D2000 M5BG Specification Grade (Nitrile/Buna-N)
ASTM D2000 M5BG 610 A14 B14 E014 E034 F17—ASTM D2000 M5BG Specification Grade (Nitrile/Buna-N)
ASTM D2000 M5BG 710 A14 B14 E014 E034 F17—ASTM D2000 M5BG Specification Grade (Nitrile/Buna-N)
ASTM D2000 M1HK 607—Premium Viton® A: 66% Fluorine
ASTM D2000 M1HK 707—Premium Viton® A: 66% Fluorine, Premium Viton® B: 68% Fluorine
ASTM D2000 M1HK 807—Premium Viton® A: 66% Fluorine
ASTM D2000 M1HK 807 Z1 (Z1=75±5 Durometer), Premium Viton® B: 68% Fluorine
MIL-R-900—MIL-R-900 Specification Grade
MIL-G-1149—MIL-G-1149 Type 1 Class 1 Grade 50—MIL-R-1149 Specification Grade (Neoprene)
MIL-G-1149 Type 1 Class 2 Grade 50—MIL-R-1149 Specification Grade (SBR)
MIL-G-1149 Type 1 Class 5 Grade 50—MIL-R-1149 Specification Grade (Nitrile/Buna-N)
MIL-R-2765—MIL-R-2765 Specification Grade (Nitrile/Buna-N)
MIL-R-3065 SB 410 F2—MIL-R-3065 SB Specification Grade (Nitrile/Buna-N)
MIL-R-3065 SB 515 F2—MIL-R-3065 SB Specification Grade (Nitrile/Buna-N)
MIL-R-3065 SB 615 F2—MIL-R-3065 SB Specification Grade (Nitrile/Buna-N)
MIL-R-3065 SB 715 F2—MIL-R-3065 SB Specification Grade (Nitrile/Buna-N)
MIL-R-3065 SB 815 F2—MIL-R-3065 SB Specification Grade (Nitrile/Buna-N)
MIL-R-3065 SC 310 F1—MIL-R-3065 SC Specification Grade (Neoprene)
MIL-R-3065 SC 408 Z1 (Z1=350% minimum Elongation), Commercial Neoprene—Style 10
MIL-R-3065 SC 410 F2—MIL-R-3065 SC Specification Grade (Neoprene)
MIL-R-3065 SC 508—Commercial Neoprene—Style 10, Matte Finish Neoprene—Style 12
MIL-R-3065 SC 515 F2—MIL-R-3065 SC Specification Grade (Neoprene)
MIL-R-3065 SC 609—Commercial Neoprene—Style 10, Matte Finish Neoprene—Style 12
MIL-R-3065 SC 615 F2—MIL-R-3065 SC Specification Grade (Neoprene)
MIL-R-3065 SC 710—Commercial Neoprene—Style 10, Matte Finish Neoprene—Style 12
MIL-R-3065 SC 715 F2—MIL-R-3065 SC Specification Grade (Neoprene)
MIL-R-3065 SC 810—Commercial Neoprene—Style 10, Matte Finish Neoprene—Style 12
MIL-R-3065 SC 815 F1—MIL-R-3065 SC Specification Grade (Neoprene)
MIL-R-3065 RS 508 C1—Commercial EPDM—Style 40
MIL-R-3065 RS 515 C1 F1—Premium EPDM—Style 45
MIL-R-3065 RS 608 C1—Commercial EPDM—Style 40
MIL-R-3065 RS 615 C1 F1—Premium EPDM—Style 45
MIL-R-3065 RS 708 C1—Commercial EPDM—Style 40
MIL-R-3065 RS 715 C1 F1—Premium EPDM—Style 45
MIL-R-3065 RS 815 C1 F1—Premium EPDM—Style 45
MIL-R-6855 Class 1 Grade 40—MIL-R-6855 Class 1 Fuel Resistant Specification Grade (Nitrile/Buna-N)
MIL-R-6855 Class 1 Grade 50—MIL-R-6855 Class 1 Fuel Resistant Specification Grade (Nitrile/Buna-N)
MIL-R-6855 Class 1 Grade 60—MIL-R-6855 Class 1 Fuel Resistant Specification Grade (Nitrile/Buna-N)
MIL-R-6855 Class 1 Grade 70—MIL-R-6855 Class 1 Fuel Resistant Specification Grade (Nitrile/Buna-N)
MIL-R-6855 Class 1 Grade 80—MIL-R-6855 Class 1 Fuel Resistant Specification Grade (Nitrile/Buna-N)
MIL-R-6855 Class 2, Grade 30—MIL-R-6855 Class 2 Oil Resistant Specification Grade (Neoprene)

MIL-R-6855 Class 2, Grade 40—MIL-R-6855 Class 2 Oil Resistant Specification Grade (Neoprene)

MIL-R-6855 Class 2, Grade 50—MIL-R-6855 Class 2 Oil Resistant Specification Grade (Neoprene)

MIL-R-6855 Class 2, Grade 60—MIL-R-6855 Class 2 Oil Resistant Specification Grade (Neoprene)

MIL-R-6855 Class 2, Grade 70—MIL-R-6855 Class 2 Oil Resistant Specification Grade (Neoprene)

MIL-R-6855 Class 2, Grade 80—MIL-R-6855 Class 2 Oil Resistant Specification Grade (Neoprene)

MIL-R-21252—MIL-R-21252 Specification Grade (EPDM)

MIL-R-83248C Type 2 Class 1—Fluorozone® Mil-Spec Performance FKM, Military Specification Grade Viton® A, MIL-R-83285

MIL-R-83285 Grade 80—MIL-R-83285 Grade 80 Specification Grade (EPDM)

AMS 3205—Aerospace Material Specification (AMS) Grade Low Temperature (Neoprene)

AMS 3208—Aerospace Material Specification (AMS) Grade Weather Resistant (Neoprene)

AMS 3215—Aerospace Material Specification (AMS) Grade Fuel Resistant (Nitrile/Buna-N)

AMS 3216—Fluorozone® Mil-Spec Performance FKM, Military Specification Grade Viton® A AMS 3301—INFINISIL™ Spec-Grade Performance Silicone AMS 3302—INFINISIL™ Spec-Grade Performance Silicone AMS 3303—INFINISIL™ Spec-Grade Performance Silicone AMS 3304—INFINISIL™ Spec-Grade Performance Silicone FDA Approved Ingredients per 21 CFR 177.2600—FDA Neoprene, WARCO White® FDA Nitrile, Natural Rubber—Style 28, Pure Gum Floating Natural Rubber, Fluorozone® FDA Performance FKM, FDA Viton® A: 66% Fluorine, FDA Red Silicone, FDA White Silicone, FDA Approved Grade TPE (Black), FDA Approved Grade TPE (Neutral)

NSF 51—NSF 51 & NSF 61 Approved Grade TPE

NSF 61—NSF 51 & NSF 61 Approved Grade TPE

A-A-59588 2A & 2B—INFINISIL™ Spec-Grade Performance Silicone

SAE J200 1AA 430—Natural Rubber—Style 28

SAE J200 3BA 508 C12—Commercial EPDM—Style 40

SAE J200 3BA 515 A14 B13 C12 F17—Premium EPDM—Style 45

SAE J200 3BA 608 C12—Commercial EPDM—Style 40

SAE J200 3BA 615 A14 B13 C12 F17—Premium EPDM—Style 45

SAE J200 3BA 708 C12—Commercial EPDM—Style 40

SAE J200 3BA 715 A14 B13 C12 F17—Premium EPDM—Style 45

SAE J200 3BA 815 A14 B13 C12 F17—Premium EPDM—Style 45

SAE J200 1BC 408—Commercial Neoprene—Style 10

SAE J200 1BC 508—Commercial Neoprene—Style 10, Matte Finish Neoprene—Style 12

SAE J200 1BC 609—Commercial Neoprene—Style 10, Matte Finish Neoprene—Style 12

SAE J200 1BC 710—Commercial Neoprene—Style 10, Matte Finish Neoprene—Style 12

SAE J200 1BC 810—Commercial Neoprene—Style 10, Matte Finish Neoprene—Style 12

SAE J200 1BF 608 Z1 (Z1=40±5 Durometer)—Commercial Nitrile (Buna-N)—Style 35

SAE J200 1BF 608 Z1 (Z1=50±5 Durometer)—Commercial Nitrile (Buna-N)—Style 35

SAE J200 1BF 609—Commercial Nitrile (Buna-N)—Style 35

SAE J200 1BF 710—Commercial Nitrile (Buna-N)—Style 35

SAE J200 1BF 810—Commercial Nitrile (Buna-N)—Style 35

AASHTO Grade 2—AASHTO Unsupported Neoprene Bearing Pads—Style 71, AASHTO Unsupported Calendered Neoprene Bearing Pads, AASHTO Unsupported Molded Neoprene Bearing Pads, AASHTO Unsupported Neoprene Bearing Pads—Style 72

AASHTO Grade 3—AASHTO Unsupported Calendered Neoprene Bearing Pads, AASHTO Unsupported Molded Neoprene Bearing Pads Caltrans 51-1.14 Waterstops—Cal-Trans Strip Water Stops Boeing BSS 7239—Low Smoke, Low Flame, Low Toxicity Neoprene Bombardier SMP 800-C—Low Smoke, Low Flame, Low Toxicity Neoprene GMP.E/P.002—General Purpose Grade TPE (Neutral)

GMP.E/P.003—General Purpose Grade TPE (Neutral)

GMP.E/P.004—General Purpose Grade TPE (Neutral)

GMP.E/P.005—General Purpose Grade TPE (Neutral)

GMP.E/P.006—General Purpose Grade TPE (Neutral)

GMP.E/P.007—General Purpose Grade TPE (Neutral)

MSAR20A—General Purpose Grade TPE (Black)

MSAR20B—General Purpose Grade TPE (Neutral)

MSAR20C—General Purpose Grade TPE (Neutral)

MSAR20D—General Purpose Grade TPE (Neutral)

MSAR20E—General Purpose Grade TPE (Neutral)

MSAR30A—General Purpose Grade TPE (Neutral)

MSAR30B—General Purpose Grade TPE (Neutral)

MSAR40A—Flame Retardant Grade TPE

MSAR40B—Flame Retardant Grade TPE

WSD-M2D379-A1—General Purpose Grade TPE (Neutral)

WSD-M2D380-A1—General Purpose Grade TPE (Neutral)

WSD-M2D381-A1—General Purpose Grade TPE (Neutral)

WSD-M2D382-A1—General Purpose Grade TPE (Neutral)

WSD-M2D441-A—General Purpose Grade TPE (Neutral)

WSD-M2D712-A1—General Purpose Grade TPE (Neutral)

HHP-151F—HHP-151F Cloth-Inserted (CI), Fungus Resistant, Anti-Microbial Neoprene General Electric EA12C11E7—Transformer Oil Nitrile (Buna-N)

ASTM D 178-93 Type 1 Class 2—ASTM Switchboard Type 1 Rubber Matting

ASTM D2000 1AA—Corrugated Matting, Heavy Corrugated Matting, Lightweight KleenRite® Matting, Molded Slabs AASHTO Grade 2—AASHTO Unsupported Molded Neoprene Bearing Pads AASHTO Grade 3—AASHTO Unsupported Molded Neoprene Bearing Pads PRISM™ Rubber Polymer The treated rubber of certain embodiments may be employed in PRISM™ Rubber Polymer, a polybutadiene-butyl rubber hybrid master batch material incorporating Phase Reticulation Induced Sulfidic Metathesis (PRISM).

PRISM™ Rubber Polymer may be compounded to have as many as eight additional polymers mixed in, but more typically not more than three additional polymers (e.g., SBR, natural rubber, and/or EPDM), depending upon the end use. PRISM™ Rubber Polymer incorporates an interpenetrating, dual elastomer network where two distinctly different backbone chemistries have been woven together and then cross linked separate from one another. This process achieves superior triaxial and torsional mechanical properties when compared to conventional master batch material for superior stability in all applications. Advantages for PRISM™ Rubber Polymer include a high performance to cost ratio, improved mechanical, chemical and electrical properties, excellent oxidation resistance, significant reduction of carbon footprint, sustainable polymer chemistry. PRISM™ Rubber Polymer is suitable for use in tire sidewall, roofing membranes, high dielectric electrical tape, tank lining, reservoir lining, trench lining, bridge underlayment, foundation waterproofing, parking garage waterproofing, rubber hoses, rubber belts, and rubber molding.

GTR Polymer/Complementary Polymer Matrix

A method is provided that allows one to achieve the objective of preparing, augmenting, and then recombining the polymer of the GTR particle(s) (the "GTR polymer") and another polymer (the "complementary polymer") in such a manner that the individual, complex, heterogeneous, cross linked moieties are built into a re-entangled, monolithic structure, substantially composed of the original GTR and polymer ("polymeric matrix") and encapsulating the carbon component ("encapsulated carbon") derived from the original GTR.

The methods described herein involve 1) gently unpacking the dense GTR composite structure, 2) dislocating the least stable attachment point of the transverse crosslink of the GTR polymer without negatively altering the elastomer molecule or the sulfur bridge, 3) install a complimentary polymer receptor upon a dislocation site, then 4) following subparticle mechanically induced leafing, re-crosslink the original hinged, sulfur bridge at susceptible, dislocation sites along the elastomer backbone to yield a polymeric matrix comprising crosslinked GTR derived polymer and complementary polymer and encapsulated carbon.

When a crosslink occurs between neighboring polymer chains it provides elasticity and shear modulus to the polymeric matrix (referred to herein as "free looping"). However whenever the crosslink forms within the same polymer chain it forms a loop and it is elastically ineffective and may be characterized as a flaw or weak spot in the structure of the rubber matrix ("closed looping"). Detailed analysis of the looping probability reveals that the occurrence of this unwanted condition occurs within a range of 5-15% of the total number of crosslinks in a given commercially vulcanized rubber. Dependent upon the location of the unwanted crosslink the looped polymer molecular chain can relegate from 5% to 20% of the rubber polymer to an ineffective cyclic hydrocarbon. The repeated elastomer morphology of a GTRP processed by the methods of the embodiments has reduced susceptibility to this phenomena.

Regenerating an Interpenetrating Elastomer Network from Ground Tire Rubber Particles In one embodiment, various elements are employed to regenerate a monolithic, macro-structural, interpenetrating elastomer network morphology, e.g., a polymeric matrix, from ground tire rubber particles.

Water-based processing methods as described in PCT Intl. Appl. No. PCT/US2018/028656 filed Apr. 20, 2018, the contents of which are hereby incorporated by reference in its entirety, can be employed in the manufacture of polymeric matrices. However, a dry processing method can also be employed advantageously. The dry processing method involves combining crumb rubber particles, an organometallic compound, and a complementary polymer, and subjecting a mixture of these components to pressure, e.g., in a roller mill, a stuffing box of an extruder, or the like. In such a method, crumb rubber is combined with the organometallic compound and a complementary polymer having reactive sites. Suitable complementary polymers can include those having hydroxyl groups, groups that can be a source of hydroxyl groups (e.g., esters such as fatty acid esters, e.g., of glycerol or other polyols), or other functional groups with low reactivity towards the organometallic compound but capable of crosslinking or otherwise forming a bond with itself or the GTR polymer. When combined under high wiping forces, the sulfur linked chains of the GTR polymer become unplugged at the carbocation sites, creating reactive sites that can interact with hydroxyl groups or other groups of the complementary polymer to form an interpenetrating network of GTR polymer chains and complementary polymer chains encapsulating carbon derived from the crumb rubber. The polymeric matrix can be pelletized, formed into sheets, or otherwise shaped to employ in the resulting form (e.g., as a shaped rubber good or as an additive, e.g., to an asphalt) or can be further processed (e.g., applied to a substrate or combined with other materials, e.g., a diluted form or a doped form or a composite form). The resulting material offers advantages in that it can be subjected to further post processing while maintaining its elastomeric properties and its ability to hold carbon black within the polymeric matrix.

Crumb Rubber Particles

Crumb rubber particles as are conventionally obtained from recycled EOL tires can advantageously be employed in the methods of the embodiments. These particles are typically 30 mesh in size. The crumb rubber particles contribute carbon black and/or graphene as a component of the resulting polymeric matrix.

It is generally preferred that the resulting polymeric matrix comprise at least 60% by weight of tire rubber-derived polymer; however, in certain embodiments less tire rubber-derived polymer can be employed. When 90% tire rubber is employed, a system superior to conventional black master batch is obtained. A mixture containing from 80-90% by weight tire rubber with the remainder virgin polymer can be considered a suitable substitute for black master batch.

Organometallic Compound

An organometallic compound is employed as a reactive component to dislocate attachment points in the crumb rubber polymer. The organometallic compound comprises a metal having octahedral molecular geometry. As an example, the organometallic compound can be provided in a form of a metal salt that undergoes a phase change from solid to liquid in a range of 115-150° C., e.g., copper acetate. The reactant is typically employed at from 0.1 to 5.0 parts reactant per hundred parts vulcanized rubber (by weight); however, higher or lower amounts may also be employed in certain embodiments. While not wishing to be bound by any theory, it is believed that in the reaction, metal acetate ion dissociative substitution occurs at the methyl carbocation. This disrupts the vulcanization precursor, and the insertion forms a new functional site at the elastomer pendent structure for subsequent sulfidic bridge realignment. In the process, $O^{2-}$ is converted to $CO_2$ with a phase space particle charged carbon aggregate. Strong interactions between $M^{2+}$ and $S^{2-}$ form a precipitate, which liberates a rigid sulfidic bridge to a 'tether' state, bound only at the original allylic carbocation. Various metal ions are suitable for use, including but not limited to $Co^{2+}$ (ligand exchange rate for an $H_2O$ metal coordination matrix of $3\times10^6$), $Cu^{2+}$ (ligand exchange rate for an $H_2O$ metal coordination matrix of $5\times10^9$), $Ni^{2+}$ (ligand exchange rate for an $H_2O$ metal coordination matrix of $3\times10^4$), $Zn^{2+}$ (ligand exchange rate for an $H_2O$ metal coordination matrix of $2\times10^7$), and $Mn^{2+}$ (ligand exchange rate for an $H_2O$ metal coordination matrix of $2\times10^7$). Substantial data exists in literature that a copper based organometallic molecule can manifest up to a coordination number of ten (10) in a heated, water environment. This coordination capacity provides for the intermediate formation of a super-floppy matrix to assist the process by capturing a ligand from the inhibiting isomer 'debris' near the methyl carbocation reactive site. The ligand capture and release rates are many times faster than other metals as well. These impressive capabilities lead to the possibility that a variety of copper based, reaction isomers may be created from the heterogeneous maw of molecules present during the GTRP unpacking-metathesis sequence. By selecting an organometallic compound that exhibits a phase change at a temperature close to that of elemental sulfur, it may be possible to facilitate the metathesis reaction; however, organometallic compounds having different phase change temperatures can also be employed. The metal can be provided in ionic form with an organic anion, e.g., acetate. Copper acetate is suitable for use as an organometallic compound in the methods of the embodiment.

Complementary Polymer

The complementary polymer can be a hydroxyl-containing polymer or other polymer having limited reactivity with the organometallic compound. Such polymers include but are not limited to, triglycerides, polyhydroxylated polymers (polyols, branched and/or linear), polysaccharides (xanthan gum, guar gum, carboxymethylated polysaccharides, hydroxypropyl polysaccharides, carboxymethyl, hydroxypropyl polysaccharides, cellulose, arabic gum, guar gum, locust bean gum, tara gum, *cassia* gum, agar, alginates, carrageenans, chitosan, scleroglucan, diutan, or modified starches such as n-octenyl succinated starch, porous starch, and hydroxypropyl- and/or carboxymethyl-derivatives), carbohydrates, partially hydrolyzed polyvinyl alcohol, and poly amino acids such as polyserine. Other suitable complementary polymers include copolymers containing vinyl alcohol or other monomers containing hydroxyl-substituted side chains, or hydroxyl-containing versions of polymers such as polyesters, polycarbonates, polycaprolactones, polyethers, polythioethers, polyesteramides, polyacrylates, polymethacrylates, polyvinyl alcohols, polyurethanes, polyacetals, polyvinylphenol, polyvinyl alcohol, or copolymers thereof. Polymers suitable for use can have an OH number (determined in accordance with DIN 53240-2) of 20 or less to 500 mg KOH/g or more, and an average molar mass of 250 or less to 10000 g/mol or more.

Particularly suitable for use as complementary polymers are esters, e.g., fatty acid esters, e.g., vegetable oils. Vegetable oils are lipids (esters) derived from plants, typically in a form of triglycerides. Suitable vegetable oils include, but are not limited to, coconut oil, corn oil, cottonseed oil, olive oil, palm oil, peanut oil, rapeseed oil, safflower oil, soybean oil, sunflower oil, almond oil, castor oil, cashew oil, hazelnut oil, macadamia oil, mongongo nut oil, pecan oil, pine nut oil, pistachio oil, walnut oil, bottle gourd oil, buffalo gourd oil, pumpkin seed oil, watermelon seed oil, acai oil, blackcurrant seed oil, borage oil, evening primrose oil, amaranth oil, apricot oil, apple seed oil, argan oil, artichoke oil, avocado oil, babassu oil, ben oil, borneo tallow nut oil, cape chestnut oil, carob pod oil, *cassia* oil, cocoa butter oil, cocklebur oil, cohune oil, coriander seed oil, dika oil, false flax oil, flax seed oil, grape seed oil, hemp oil, kapok seed oil, kenaf seed oil, lallemantia oil, linseed oil, marula oil, meadowfoam seed oil, mustard oil, nutmeg butter, okra seed oil, *papaya* seed oil, *perilla* seed oil, pequi oil, pine nut oil, poppyseed oil, prune kernel oil, *quinoa* oil, ramtil oil, rice bran oil, royle oil, sacha inchi oil, tea seed oil, thistle oil, tigernut oil, tomato seed oil, wheat germ oil, algae oil, copaiba, honge oil, jatropha oil, jojoba oil, milk bush, and petroleum nut oil. Such vegetable oils can be employed in their original state, or can be subjected to other procedures, such as hydrogenation. Also contemplated are animal-derived oils, e.g., oils derived from lard. While naturally occurring vegetable oils obtained from plant or animal sources are advantageously employed, synthetic versions of such oils are also contemplated.

While hydroxyl-containing complementary polymers can advantageously be employed, other polymers are also amenable to use. These polymers are capable of forming cross-links into the polymeric matrix, and exhibit minimal reactivity towards the organometallic compound. Certain process oils are suitable for use, as are polymeric materials containing no carbon black, e.g., virgin rubber. These materials include but are not limited to styrene-butadiene rubber, styrene-butadiene-styrene, e.g., radially branched SBS, silicone polymers, and butadiene homopolymer. Examples include polyalkylsiloxane, polyarylsiloxane, polyalkoxysiloxane, and polyaryloxysiloxane oils and silicone oils. Specific examples of polysiloxanes include methyl phenyl silicone, methyl tolyl silicone, methyl ethylphenyl silicone, ethyl phenyl silicone, propyl phenyl silicone, butyl phenyl silicone, and hexyl propylphenyl silicone, or silicones such as alkyl phenyl silicones. Alkyl groups for alkyl phenyl silicones include aliphatic groups, e.g., methyl, propyl, pentyl, hexyl, decyl, and the like; alicyclic groups, e.g., cyclohexyl, cyclopentyl, and the like; aryl groups, e.g., phenyl, naphthyl, and the like; aralkyl groups; and alkaryl groups, e.g., tolyl, xylyl, and the like; and halogenated, oxygen-containing, and nitrogen-containing organyl groups such as halogenated aryl groups, alkyl and aryl ether groups, aliphatic ester groups, organic acid groups, cyanoalkyl groups, and the like. The alkyl groups can contain from 1 to about 30 carbon atoms or more.

Any suitable amount of complementary polymer can be employed, typically from about 1 part by weigh complementary polymer to 1 to 99 parts by weight crumb rubber, or 1 part by weight complementary polymer to 2 to 20 parts by weight of crumb rubber, or 1 part by weight complementary polymer to 4 to 9 parts by weight of crumb rubber, or any ratio therebetween. In certain embodiments, however, ratios outside of the abovereferenced ratios may be employed. When the term "complementary polymer" is used herein, it is employed to refer to either a pure polymeric material or polymeric material comprising a single polymer, or a combination of polymers of different chemistries and/or size distributions. For example, one exemplary complementary polymer can comprise components have a peak molecular weight ranging from 150k-200k Daltons.

Exemplary Dry Reaction Process $Cu(Ac)_2$ and castor oil were added to crumb rubber in a roller mill having cylindrical rollers pinching together. The mixture was cycled through the mill under ambient conditions. After 30 cycles, the material stuck to itself. The resulting material was observed to be highly elastic (e.g., stretchable to over two times its resting length without tearing or changing its resting length) and translucent when stretched.

In certain embodiments a mixture of crumb rubber and organometallic reactant is employed wherein the mixture comprises 1.5 to 2.5% by weight organometallic reactant, however higher or lower amounts of the organometallic reactant can also be employed in certain embodiments. This mixture can be added to the complementary polymer, or vice versa. Any order of addition of the components, in any grouping, can advantageously be employed.

Morphology of the Polymeric Matrix

The polymeric matrix prepared by the method described above functions to encapsulate the carbon black derived from the crumb rubber, thereby maintaining carbon black in the polymeric matrix. The morphology can be described as an organized, encapsulated carbon component (e.g., carbon black and/or graphene derived from EOL tire) distributed within a polymer matrix. The encapsulation can be viewed of as an enteric envelope for the carbon black, preventing it from being released from the polymeric matrix.

This is in contrast to GTR polymer as the sole polymeric material subjected to the same process, i.e., without a complementary polymer. When GTR is the sole polymer in a polymeric matrix, it is observed to lose carbon black from the matrix when the effective particle size approaches 5 microns. Accordingly, in order to maintain the carbon black in the matrix, it is necessary to maintain effective particle size at a higher level (greater than 5 microns, e.g., 6, 7, 8, 9, or 10 or more microns. Materials can be fabricated from pure GTR polymer including multiple laminates having an open crosslinked matrix down to 10 microns in thickness. At smaller thicknesses, a "smearable" structure results, indicating destruction of the interpenetrating structure with corresponding release of carbon black. While not wishing to be bound by theory, it is believed that some degree of free looping is necessary in order for a pure GTR polymer-containing matrix to exhibit elastomeric properties. Below this effective particle size of 5 microns, the free loop radius of pure GTR polymer-containing matrix is impacted such that carbon black can become freed from loops of crosslinked PTR in the matrix.

By integrating a thin film of GTR polymer into a complementary polymer at the point where carbon black begins to be released from the polymer matrix, a reinforcing effect is observed. While not wishing to be bound by theory, it is believed that the complementary polymer links to open sites of the GTR polymer to provide superior elastomeric properties. By adding a complementary polymer, such as described herein, during processing, retention of carbon black at even smaller effective particle sizes can be observed (i.e., less than 5 microns, e.g., 4, 3, 2, or 1 micron or less). By reducing the effective particle size to 5 microns or less, the polymeric matrix can be grafted without extra milling, with the surface area and number of reactive sites obtained yielding a satisfactory material. Accordingly, the use of a complementary polymer in conjunction with crumb rubber enables the production of a polymeric matrix with an effective particle size less than 5 microns, along with improved elastomeric properties when compared to conventional black master batch.

The much smaller equivalent particle size of the polymeric matrices of the embodiments offers a number of advantages, especially in forming homogeneous mixtures with asphalt. Tire rubber exhibits a specific gravity of approximately 1.1, while asphalt exhibits a specific gravity of approximately 1.02. Accordingly, tire crumb rubber can settle out of suspension with asphalt. In contrast to such a conventional mixture of tire crumb rubber in asphalt, the polymeric matrices of the embodiments will maintain a suspension in asphalt. While not wishing to be bound by theory, it is believed that this ability to maintain a suspension is related to the smaller effective particle size (less than 5 microns) that can be obtained for the polymeric matrices compared to conventional tire crumb rubber or pure GTR polymer subjected to treatment as described herein in the absence of a complementary polymer. The process yields a material suitable for mixing in asphalt, in that it can pass through a 1 micron filter, and in that it exhibits elastic recovery.

As noted above, the complementary polymer added can include process oils as known in the art. At suitable amounts, e.g., 1-20% by weight of the mixture, the resulting material exhibits greater strength and no softening, e.g., improved tensile strength and elongation. While not wishing to be bound by theory, it is believed that the process oil induces swelling in the PTR, opening up reactive sites on the surface that can crosslink. The resulting high tensile strength material exhibits strength properties that are similar to, or superior to those of virgin rubber. For example, an extremely thin film exhibiting superior elastomeric properties can be prepared from a mixture of 90% PTR and 10% polymer. Such a material exhibits properties similar to those of virgin rubber, except for the black color due to the presence of carbon black.

By selecting the co-polymer to be included with PTR, the resulting properties of the crosslinked polymer matrix can be selected. For example, using a polyurethane as the complementary polymer with a toluene diisocyanate crosslinking agent having, e.g., 2.7 reactive units per molecule, one can obtain a thermoplastic material. If 2.4 reactive units per molecule are present, then the resulting material exhibits thermoset properties. By reducing the amount of NCO groups present in such a complementary polymer, a material suitable for use as a plasticizer is obtained. By pre-reacting the polyol with a crosslinking agent (e.g., toluene diisocyanate), crosslinking with the GTR polymer can be facilitated. Other polymeric materials can be incorporated as well, e.g., styrene-butadiene rubber, to yield engineered rubber products having predetermined properties.

The polymeric matrices of the embodiments can be fabricated into radiation shielding materials. The organized, encapsulated carbon component (e.g., carbon black and/or graphene) provides radiation shielding. The organized, encapsulated carbon component can include dopants in addition to carbon black and/or graphene, e.g., barite, borates, boroncarbide, barium, metals such as transition metals, tungsten, copper, vanadium, gold, lead, doped polypyrrole, titanium dioxide, radiation shielding glass particles, e.g., glass microspheres containing dopants such as $CeO_2$, PbO, $Tm^{3+}$, and other dopants as known in the art for use in radiation shielding (e.g., for radiofrequency radiation and/or thermal radiation shielding).

The radiation shielding properties of the polymeric matrix are advantageous in applications where aging can present issues, e.g., in paving or roofing. Over time, a conventional paving or roofing material containing virgin polymer or other polymer not containing carbon black will undergo aging upon exposure to the elements, including thermal and radiofrequency radiation. In the example of paving, the presence of 5% by weight of crumb rubber as starting material in the polymeric matrices of the embodiments will noticeably improve the aging resistance of the paving material containing the polymeric matrix due to the presence of carbon black. When 10% by weight crumb rubber is employed as a starting material, pavement lifetime can be increased substantially (i.e., to 40 years or more). When 20% by weight crumb rubber is employed as a starting material in, e.g., asphalt, a material suitable for radiation shielding is obtained. Such a material can advantageously be applied to a surface by spraying, or overlayed in sheet form alone or in a form of a composite with other materials.

One embodiment for radiation shielding employs a layer of polymeric matrix applied to a supporting, insulating, or other backing material (e.g., membrane or fabric (woven or nonwoven)), wherein the polymeric matrix layer is applied by spraying, dipping, lamination or other techniques. For example, a layer of polymeric matrix having a thickness of 0.25 to 1 mm applied to a supporting material is suitable for use as a radiation shielding material, e.g., in electronics. Such a layer is particularly useful in shielding cell phones, where it is desirable to minimize radiation exposure to a user due to proximity to the body in use. Other uses where radiation shielding is desirable include structures performing as faraday cages, e.g., to prevent entry or exit of radiofrequency radiation, or for privacy, security or protection of sensitive electronics. Additional advantages of the material include shock absorption abilities and water resistance. In such embodiments, it can be desired to employ a silicone component in the radiation shielding material, e.g., a silicon-based process oil.

Figure 15:
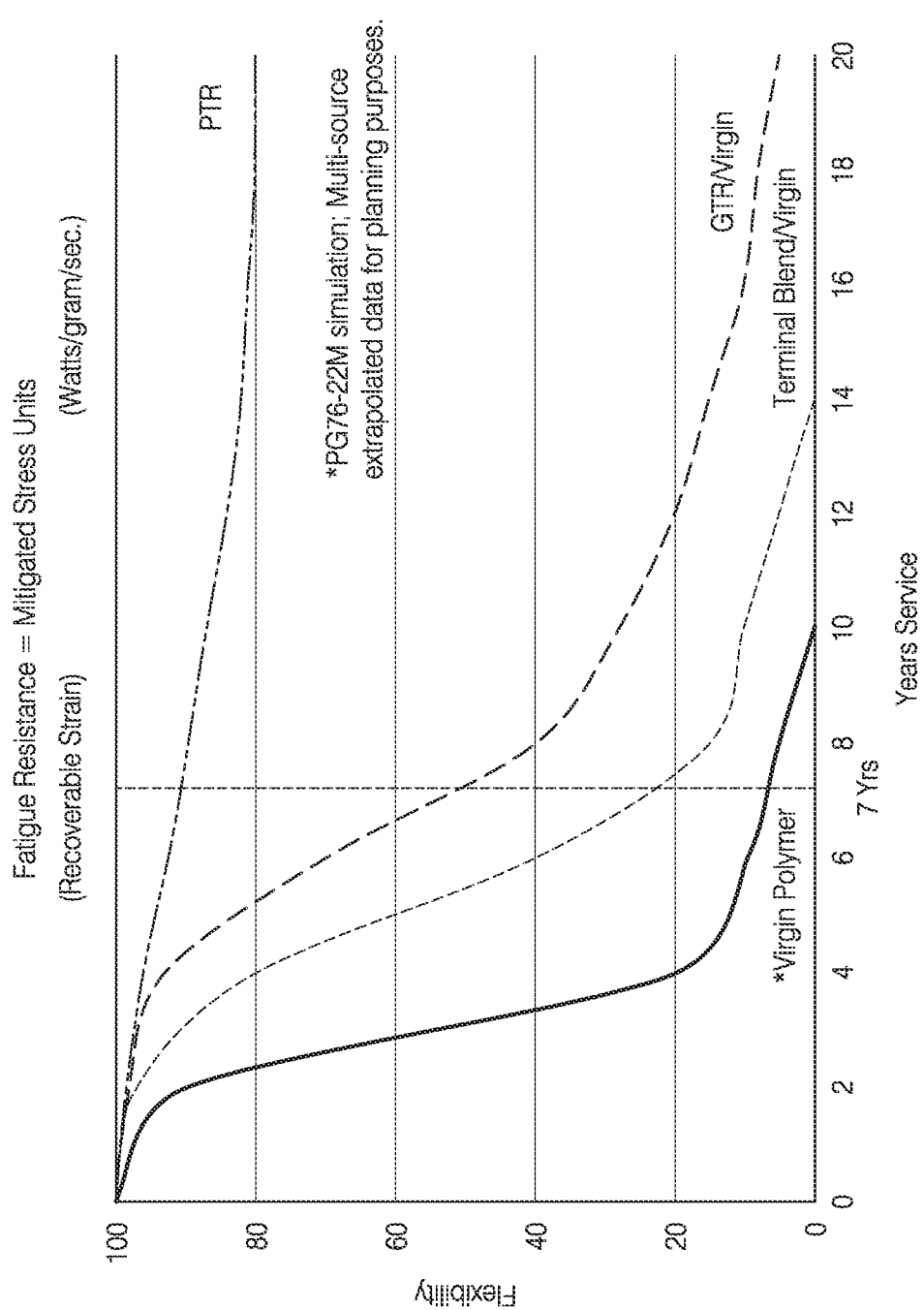
FIG. 15 depicts fatigue resistance (recoverable strain) as mitigated stress units (Watts/gram/sec.) for a virgin polymer, a terminal blend/virgin polymer, a GTR/virgin polymer, and PTR. As the data shows, the PTR exhibits superior fatigue resistance when compared to conventional materials, imparting a longer service life (in years of service).

FIG. 15 depicts fatigue resistance (recoverable strain) as mitigated stress units (Watts/gram/sec.) for a virgin polymer, a terminal blend/virgin polymer, a GTR/virgin polymer, and PTR. As the data shows, the PTR exhibits superior fatigue resistance when compared to conventional materials, imparting a longer service life (in years of service).

Mitigating Pavement Embrittlement

Flexible roads are composed of asphalt concrete (AC) that typically contains approximately 8 parts by weight bituminous binder to 95 parts by weight of an aggregate (e.g., stone) matrix. An AC pavement is typically covered over or ground down in 15-20 year intervals due to safety issues and rising maintenance costs associated with excessive cracking and stone loss—a loss attributed to the binder becoming brittle. AASHTO PG Pressure Aging Vessel Standards (PAV R28 Test) are designed to artificially age fresh bitumen mixtures at an elevated atmospheric pressure and temperature for intervals of 20 hours up to 60 hours, after which ductility measurements are performed to determine the predicted useful life.

This PAV environment, which utilizes a heated vessel at approximately 235° F., comprising peak wavelengths of from about 1,800-3,000 nm, does not sufficiently simulate the damaging electrochemical environment within which the asphalt binder functions as a component of the AC pavement. Depending upon this method of analysis inevitably leads to suboptimal conclusions about a bitumen's potential long term performance.

There are much more powerful electrochemical forces at work than those simulated in the PAV R28 or similar tests which employ a conventional accelerated aging methodology. New information and conclusions derived from the information have been obtained that offer a better understanding of the mechanisms at work in asphalt aging in paving materials. A better understanding of these mechanisms and how they propagate the chemical changes which signal a pavement's end-of-life can provide a targeted solution to asphalt aging that substantially extends the useful service life of flexible roads.

Aggregate Quanta

Crushed aggregate used in asphalt concrete is graded along a "0.45 Power Gradation Chart" (PGC) as employed in the paving industry. Approved aggregate is hard and sound and when uniformly mixed and compacted pursuant to the PGC will nest with a minimum of air voids. When coated with an asphalt which promotes a sliding between the crushed surfaces, followed by a densifying by vibratory compaction, air void densities of 5-6% by volume can be achieved.

The surface area of aggregate in a dense graded pavement mix will vary but when calculated pursuant to the Asphalt Institute MS-2 Model a 2 inch lift of asphalt concrete, graded along the PGC, will have approximately 1100000 square inches of surface area per square yard of horizontal, finished pavement driving surface. Since the surface of crushed aggregate exhibits profound asperity, the true stress transfer surface (TSTS) is much less. Careful measuring reveals that contact area between the surfaces of compaction-nested, dense graded aggregate is about $1/10000$ of the theoretical area, or about 100 square inches per square yard of driving surface per stone, with a stone-to-stone couplet equal to 200 square inches of load transfer area moving all the rolling load stress through a thin adsorptive asphalt adhesive binding membrane sandwiched between the interlocking aggregate asperities.

Rolling Load Stress Transfer Macro-Dynamics

AC pavement design is built around anticipated traffic loads (ESALs) and vehicle trips during the service life of the road. An Equivalent Single Axle Loading (ESAL) is 18000 lbs, or equal to about a single truck axle with four tires. The approximate surface area of four (loaded) truck tires touching the pavement is approximately 90 square inches or about 200 psi load upon the pavement surface. Depending upon the speed of travel, the load footprint may be spread out up to an average of 45 degrees, which increases the area, at one inch of pavement depth, to about twice that experienced at the point of contact between the tire and the pavement, or about 180 inches of bulk transfer area.

1.0 psi corresponds to 195 Joules of energy. Thus, a single 18000 pound rolling truck axle load (one ESAL), traveling at a speed of 60 mph, is continuously transmitting into and through the top 2 inches of driving surface 39000 Joules of energy.

Assuming a TSTS width of 0.005", at a surface speed of 60 mph the dwell time for each energy transfer point is about 13 milliseconds. Converting the 39000 Joules by the TSTS quotient ($1/10000$) the energy transmitted is 390000000 Joules (390 Mega Joules). 1.0 Joule/second=1.0 watts, therefore the dissipated energy (potential) is equivalent to the energy used by a 30 watt light bulb—all done through an asphalt polymer membrane point of contact no larger than the diameter of a human hair. Expressed another way, as this single truck axle travels across each three feet of wheel track, it dissipates enough energy through the underlying pavement adhesive to illuminate 670 light bulbs. This much energy transmitted and dissipated through a well known conductor, such as copper, could be expected to severely overheat a reliable metal structure, leading to rapid bum-out. This energy quanta, transmitted on a recurring basis over many years, would be expected to immediately melt, char and destroy the organic structure of asphalt. It does, at a molecular level, but the appearance of degradation and the failure mechanism is a chronic, progressive destruction which requires examination to understand and thereby to chart innovation that will mitigate the failure mechanism.

Rolling Load Stress Transfer Atomic Scale Dynamics

Figure 16:
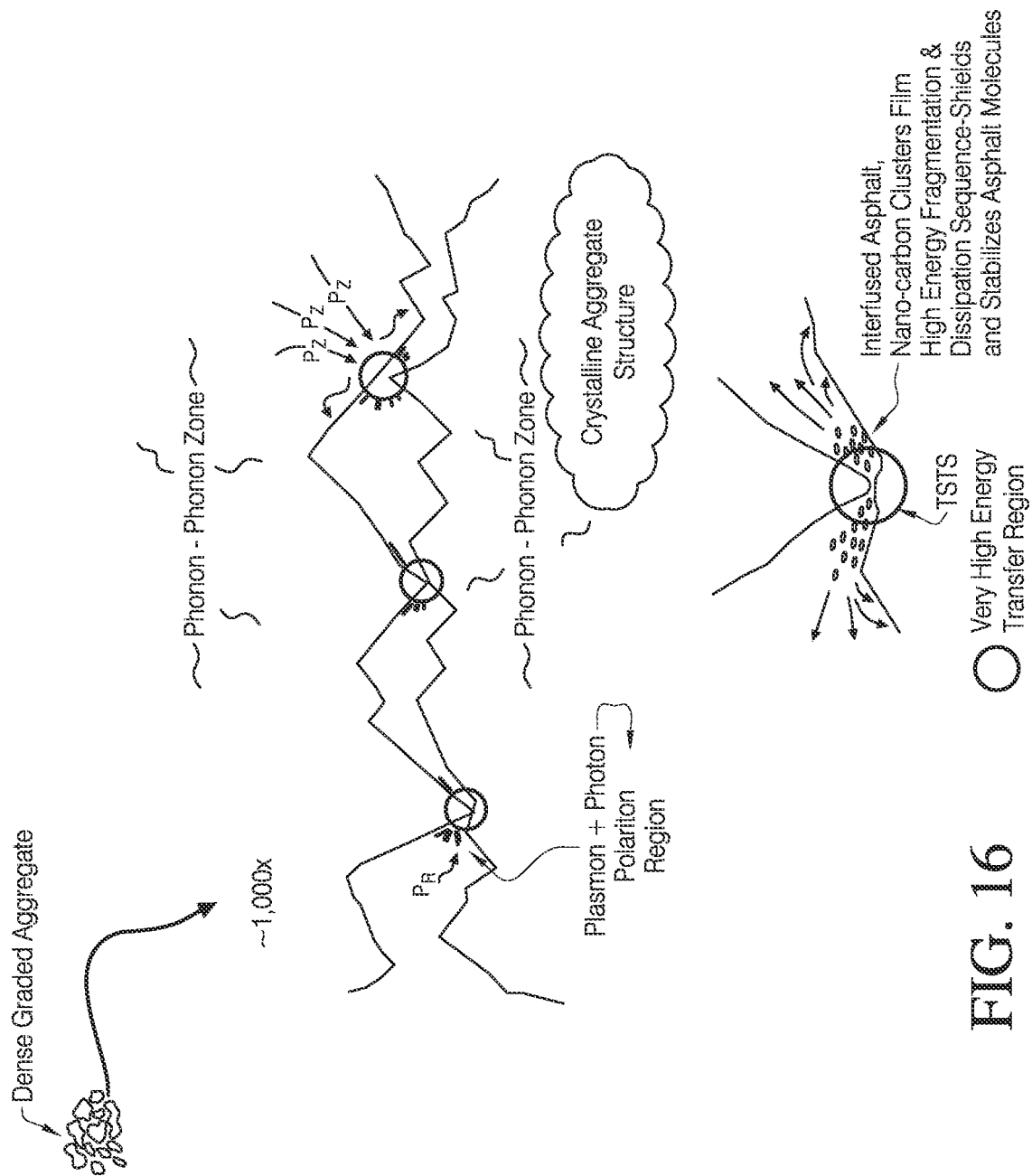
FIG. 16 depicts the process of high energy fragmentation and dissipation for interfused asphalt/nanocarbon clusters in a very high energy transfer region in a pavement under rolling load.

The vast majority of surfaces are not atomically flat, and when two such surfaces touch, contact between them takes place only at their interlocking asperities. The result is that while energy transfer is independent of apparent (macroscopic) contact area, it is in fact proportional to true contact area. While there are many levels of geometric complexity at which dissipative energy can be evaluated, a fundamental understanding of the stone-on-binder-on-stone is depicted in FIG. 16.

While the pre-load through post-load geography at the point of touching between adjacent, load bearing contacts experiences minute mechanical deflections, flexible films between those points and emanating outward behave like particles which roll or migrate to the open niches of an incommensurate interface composed of irregular topologies. The molecules always find a local energy minimum. Therefore while the high intensity burst of energy associated with the passage of the rolling load on the pavement surface initiates passage at the contact bridge, a much larger portion of the surrounding gap is activated to spread out and dissipate the 'work'. It is here that both the failure mechanism associated with asphalt embrittlement is best understood and it is here that the opportunity to mitigate that mechanism has its best chance of optimal effectiveness.

The ESAL rolling load mechanically translates into a vibration of the stone crystalline structure setting in motion a phononic wave. The energy of this vibration transfers to adjacent stones in the densely compacted aggregate structure through the TSTS. The TSTS becomes a rapid transfer for accumulated phononic waves which begin to jam, density then reflect back into the stone whereupon a counter-wave is formed which will either convert to stored energy within that stone moiety or pass into the adjacent stone at a tower wave intensity along the adhesive bond line in the form of an acoustic wave. As the road surface and the underlying substrate experience increased solar or traffic load the energy within the system will continue to seek equilibrium.

Asphalt may be characterized in four categories: Saturates, Aromatics, Resins and Asphaltenes (SARA). Road asphalts generally are composed of these molecular elements in the following range: Saturates 1-4%, Aromatics 18-30%, Resins 18-30% and Asphaltenes 8-35%. The SARA composition is generally discussed as a two phase material with the SAR being referred as the continuous phase or Maltene Phase and the Asphaltene being the suspended phase. In the very high energy transfer region of the TSTS the phononic wave will form a polariton-precursor in the form of plasmons. It has been documented that the resins, which are polar aromatics and the aromatics which are principally naphthenic structures and which is non-polar actually will form super agglomeration in the form of a mantel around an asphaltene core. With the asphaltenes being polar, their influence to induce and maintain mantle thickness attenuates at about 2-3× its sub-agglomerate dimension. When the very high pressure created within the TSTS transmits a 'forced wavelength' from a plasmon thicket, which falls in the region of 450-550 nanometers (nm), the transmission of this wavelength into the nearest molecular regions of resin and aromatic structures(s) will photoilluminate, causing a phonon-polariton cascade.

This initial photo-illumination back into the immediate, surrounding stone asphalt interface, which also has a pre-potentiated-plasmon environment, causes a chain reaction yielding multiple polariton-discharges; something akin to multiple, concurrent lighting strikes, as the temperature of these polaritons, though short in duration, is expected to be in a range of 1600-2000° F., or more. Polariton peak-wavelenths are in the range 700-900 nm with watt densities which are exponentially greater than the PAV watt densities generated by current AASHTO accelerated oxidative aging protocol.

Polariton-emissions have sufficient energy to rapidly dehydrogenate the ductile, lower molecular weight hydrocarbon chains of the resin and aromatic structures, if only a few molecules at a time. Thousands of vehicle trips per day eventually result in a persistent loss of bulk properties in a pavement. As can be expected (and is actually the case), due to asymmetrical energy dissipation from top to bottom of the pavement cross-section, embrittlement of pavement begins in the uppermost region of the road surface. By ten years the top ½" is brittle with surface cracking and raveling. By year twelve it has progressed to 1" in depth, and by year fifteen it reaches or extends below the 2" in depth.

Most of the asphalt's adhesive and flexibility characteristics are provided by the resins and aromatic molecular structures. Asphaltenes are supercoiled, high molecular weight (>50,000 Daltons), highly carbonaceous structures not affected by the energy of polariton-emissions. This dehydrogenation shortens these vulnerable resin and aromatic molecules, thereby inducing the progressive loss of pavement flexibility. The stages of dehydrogenation include the formation of $H_2O$ as a byproduct of the liberated hydrogen atom in combination with air trapped in the stone-to-stone interstitial region. The presence of water deep in the asphalt-stone boundary layer progressively degrades the asphalt-to-stone adhesive integrity by forming —OH groups with the metal oxide chemistry of the aggregate. Carboxylate and sulfoxide ions are also deleterious by-products which are also generated during this process. The process is characterized as oxidative embrittlement.

Polymer Modifiers

The Long Term Paving Program (LTPP) summarizes 25 years of study with the statement that "Flexible pavement fails due to oxidative embrittlement. The introduction of virgin polymers such as, SBS, EVA, etc. help to stabilize migration and separation of the two phases of asphalt but generally do not add sufficient electro-chemical mitigation to this oxidative embrittlement process."

The introduction of an asphalt modifier which contains a sufficient density of nano-carbon clusters can substantially mitigate the oxidative embrittlement process. Thereby extending the flexibility and fatigue resistance of the AC pavement for many years beyond that of conventional polymer modified asphalt design mixtures.

Nano-Carbon Clusters

Black master batch (BMB-1) tire rubber is the classic material which has demonstrated the effective, high energy attenuating effects of, in particular, infrared energy in the 700-20000 nm range. BMB-1 is typically a 30:70 composition of carbon black:rubber. The carbon black is milled into the rubber, which often is a blend of natural rubber and styrene butadiene elastomers, by use of high shearing force internal mixers such as a sigma blade or Banbury design. The target cluster configuration is full distribution with dispersement down to a 10-50 nm packet, fully embedded in an interpenetrating elastomer network. After the primary carbon black processing is complete, crosslink agents are added to achieve BMA-2.

The behavior of carbon black clusters so formed adheres to the growing body of understanding about nano-carbon cluster (NCC) physics. Most notably is that NCC exhibit extremely high atomic surface area with internal passageways by which electromagnetic energy transmitted into the cluster, in particular in the IR region, are fragmented as time-of-flight is interrupted on a scale of femtoseconds, with the reemission as much less energetic wavelengths in the far IR to microwave bandwidth.

This is precisely what is needed to mitigate the electromagnetic driver to resin and aromatic dehydrogenation. But a dispersive intimacy, at an atomic level, between the asphalt medium and the BMB is necessary to achieve optimal asphalt stress shielding and stabilization (S3).

While nano-carbon clusters are contemplated, other nano-clusters can also be employed, e.g., silicon clusters or other solid clusters of nanometer dimensions (e.g., 1-10 nm).

Method of Processing

A BMB-1 structure will soften and disperse into a suspended phase within heated asphalt. Very high or ultra high shear between a stator and rotor mechanism is a commercially available means to integrate these mediums, but the resilient, BMB-1 material will reach a particle equilibrium at about 100 microns in size, with the result that most intimate is surface adsorption. This is insufficient intimacy to achieve an effective result. A new method of combining a BMB-1 type of material into a low viscosity material such as heated asphalt has been devised.

Figure 17A:
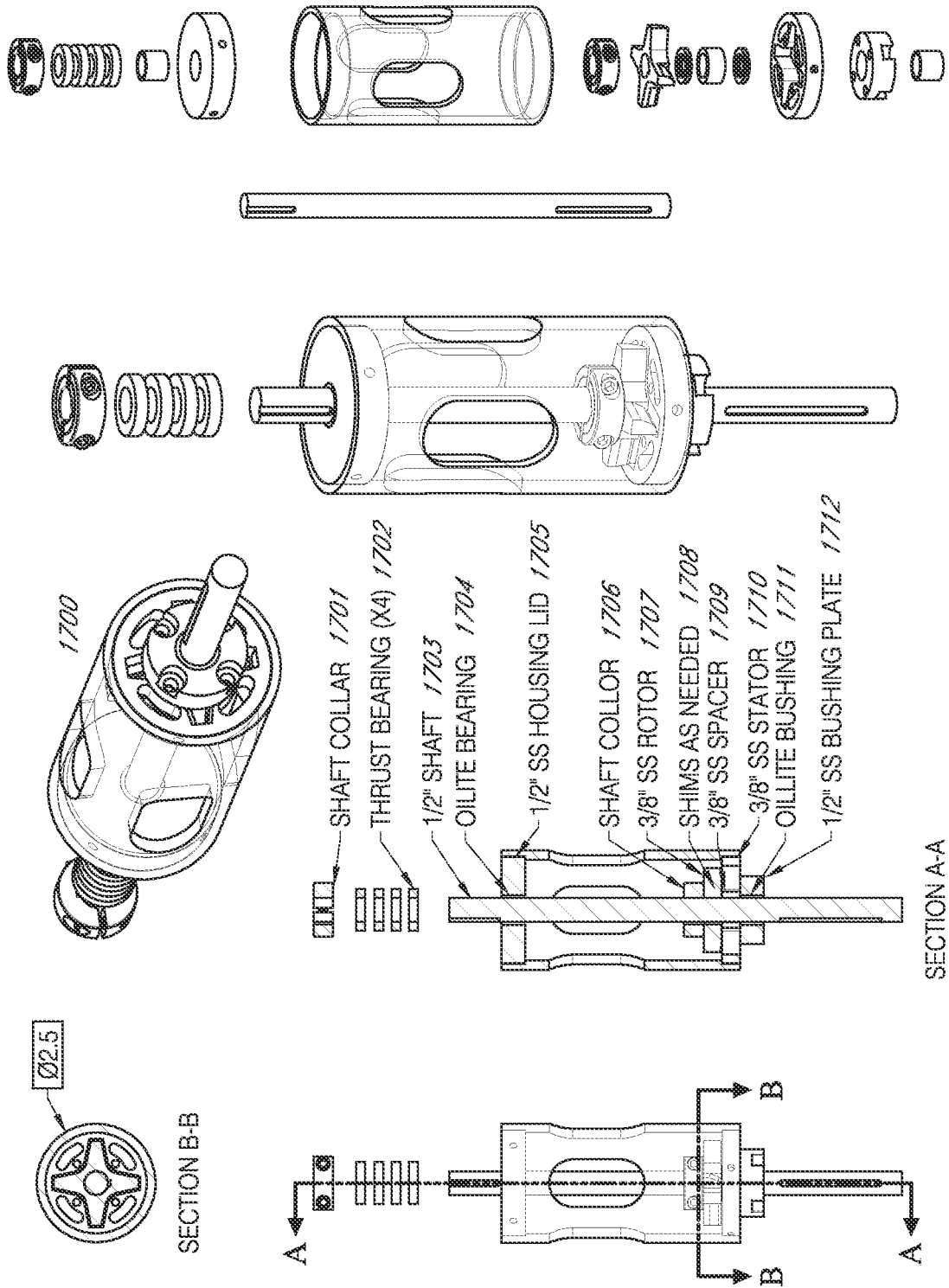
FIGS. 17A and 17B depict views of an interfusion reactor 1700 incorporating a shaft collar 1701, four thrust bearings 1702, a ½ inch shaft 1703, an oilite bearing 1704, a ½ inch stainless steel (ss) housing lid 1705, a shaft collor 1706, a ⅜ inch stainless steel rotor 1707, shims 1708 (as needed), a ⅜ inch stainless steel spacer 1709, a ⅜ inch stainless steel stator 1710, an oilite bushing 1711, and a ½ inch bushing plate 1712.
Figure 17B:
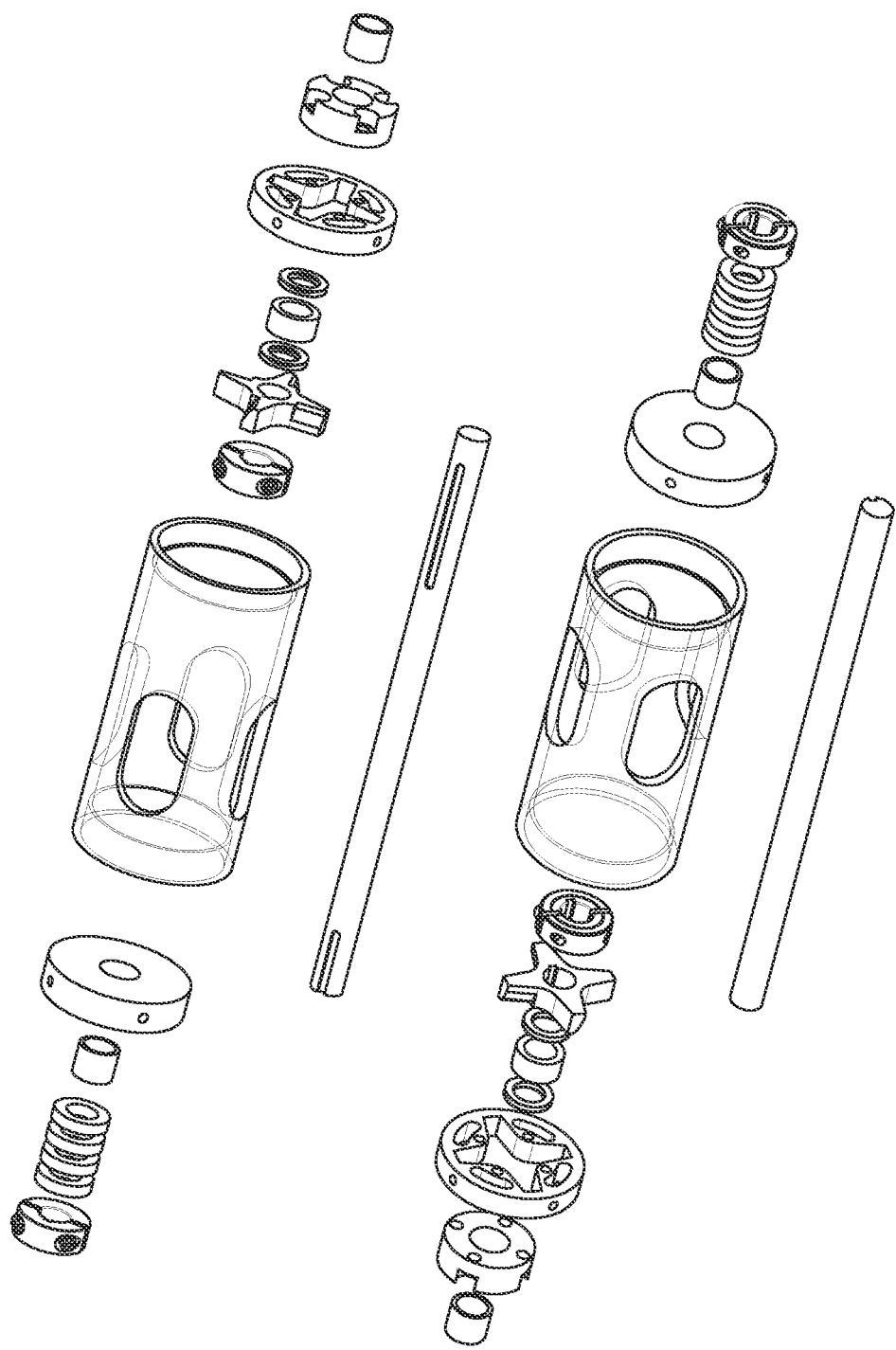

The device is referred to as an interfusion Reactor (IFR). It has been engineered to have two, otherwise unexpected capabilities: 1) the high speed mixing action of an open blade mixer, and 2) the impinging wedge action of a mixing extruder. A single stage device is depicted in FIGS. 17A and 17B.

NNC and IFR Yields S3 Asphalt

The molecular interfusion of a 20:80 BMB (PTR):asphalt de-mantelizes the resin-aromatic-asphaltene and micro-leafs the nano-cluster, inter-penetrating BMB and fully homogenizes/disperses the blend into a uniform bitumen-filled elastomer which uniformly distributes the energy dissipation across the stone-to-stone interstitial interface. Photo-luminescence activity is disrupted such that damaging polariton-emissions and other high energy concentrations cannot attack the bitumen component. The disruption of the oxidative embrittlement process results in substantial improvement of: 1) AC pavement fatigue resistance, 2) extended maintenance cycles, 3) useful life and 4) life-cycle-costs.

High Rubber Concentration Process

The copper acetate (or other organometallic compound (OMC) as described herein) is mixed into warm water (e.g., ambient temperature, or other suitable temperature, e.g., greater than 0° C. and less than 100° C., or from 5-45° C., or from 10-35° C., or from 20-25° C.) at approximately 20 wt. % concentration (e.g., approximately 20 grams copper acetate to approximately 80 grams water), then optionally blended with a waterborne version of an auxiliary polymer (AP), then 'dry mixed' with crumb rubber (e.g., 30 mesh end-of-life tire crumb rubber) in suitable mixer, e.g., a ribbon blender or any other mixing apparatus as described herein, thereby making a damp, non-agglomerating mixture. While 20% concentration for the copper acetate can advantageously be employed, in other embodiments higher or lower concentrations can be employed, e.g., 10-30 wt. %, or 15-25 wt. %. Any suitable ratio of AP to OMC solution can be employed, e.g., 1 part by weight AP to 0.01 part by weight OMC solution, or 1:0.1, or 1:1, or 1:10, or 1:100, or any ratio in between. The process for mixing the OMC solution (e.g., with or without AP) and crumb rubber offers a number of advantages. For example, the use of selected auxiliary polymers provides the ability to sequester polyaromatic hydrocarbons (PAH). The final crosslink requirements can be tailored for a particular end use (e.g., a blend with virgin material to make a better tire, or to achieve higher tensile or elongation properties for an adhesive).

Once the damp, non-agglomerating mixture is prepared, it can be processed into a monolithic rubber macrostructure, e.g., as described elsewhere herein. The high rubber concentration process can also provide improved processability through the compression and shearing action of a roll mill and/or a twin screw, co-rotating, self-wiping mixing extruder to form the monolithic rubber macrostructure. In certain embodiments, an 80:20 (by weight) blend of dry crumb rubber:aqueous OMC/AP solution (e.g., having a solids residue range of 27-75 wt. %, or 35-50 wt. %) yields a satisfactory product having acceptable properties. While an 80:20 (by weight) blend of dry crumb rubber:aqueous OMC/AP compound can advantageously be employed, other ratios can also be employed, e.g., 1:20, 2:20, 5:20, 10:20, 20:20, 30:20, 40:20, 60:20, 90:20, 100:20, 120:20, 140:20, or 160:20. The low moisture content evaporates from the infused energy during the compression/shearing/compression excursion, offering benefits in terms of a dry product having minimal water content.

A further advantage of the process is that less reactor processing time can be needed, as the OMC/AP mixture is uniformly distributed over the initial surface of the crumb rubber, and as the rubber moiety is opened up it assists in minimizing chemical reactant displacement on reactor parts due to 'buttering'. This free OMC/AP assists in the re-wiping of the freshly exposed inner crumb rubber structure as it is leafed by the mechanical elements.

Polyaromatic Hydrocarbon Sequestration

Polycyclic aromatic hydrocarbons (PAHs) are composed of multiple aromatic rings. PAHs typically are non-polar and lipophilic (uncharged) due to delocalized electrons associated with the organic rings. Generally, PAHs are insoluble in water and poorly soluble in organic solvents.

A dominant global source for PAH generation is emissions from coal and biofuels combustion associated with power plants, industrial processes, and vehicle operation. PAH production is associated with metals production, coal gasification, shale oil extraction, carbon black production, asphalt manufacturing, and rubber tire manufacturing. PAHs disperse from atmospheric circulation, and point sources include, e.g., soil and sediment near industrial sites, highway ditchlines, and spills.

PAHs readily bio-accumulate in living tissue and, dependent upon the ring configuration versus the ingesting organism, may be degraded, excreted, or react therein. Most vertebrates metabolize and excrete PAHs rapidly. But they may also bio-magnify into the food chain. Atmospheric and/or surface water or abiotic degradation may functionalize the parent PAH into a more toxic and more mobile compound by nitrogenation, hydroxylation, etc.

Cancer is a primary human health risk of exposure to PAHs. Smoking, second hand smoke and concentrations of industrial air pollution are some of the more captive concentrated forms of pulmonary insults. The structure of the PAH influences the level of carcinogenic threat. When the DNA sequence is genetically altered, cell replication is disrupted and cancer can result. Mutagenic PAHs most often have four or more aromatic rings inclusive of a well defined structural alcove, often referred to as a "bay region", which increases reactivity with metabolizing enzymes. By way of example, enzymes in the cytochrome family form stable bonds to PAHs and thereby alter PAHs into DNA damaging, diol epoxides. These potent, low molecular weight PAHs are prevalent in the environment and present a significant health risk for promoting cancer.

The following are examples of PAHs that vary in the number and arrangement of rings:

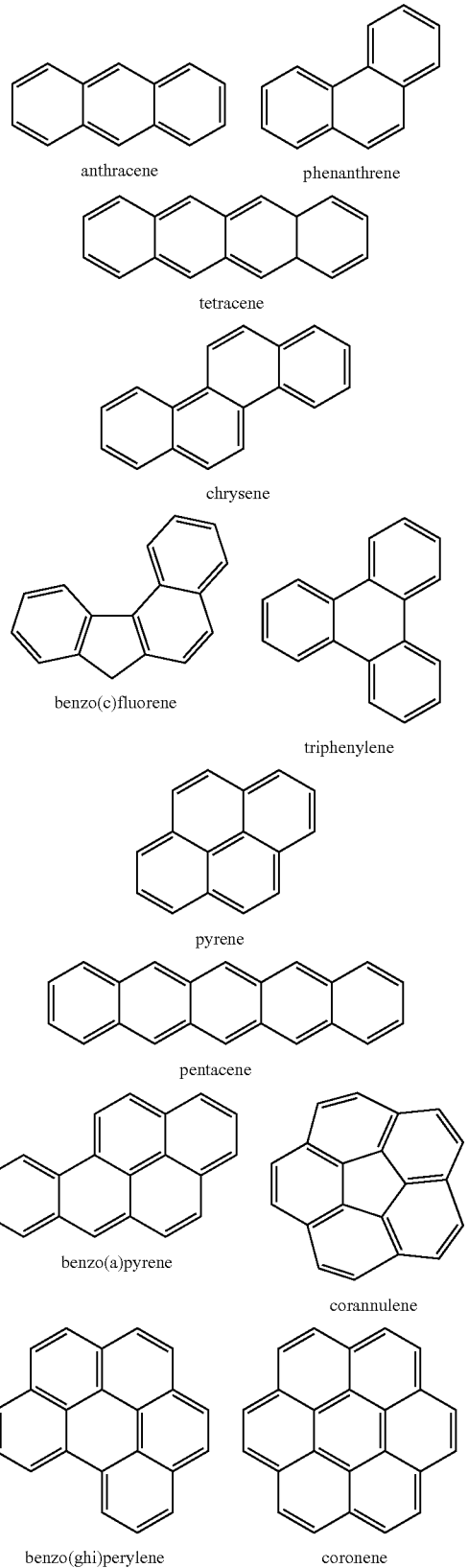

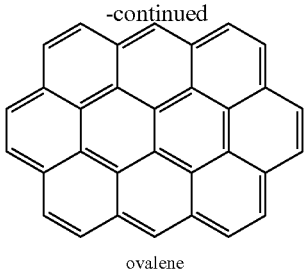

ovalene

Major governmental bodies regulate concentrations of PAHs in air, water, and soil. Priority PAHs are identified by the US EPA, the US Agency for Toxic Substances and Disease Registry (ATSDR) and the European Food Safety Authority (EFSA) due to their carcinogenicity or genotoxicity and or ability to be monitored. They include the following, as presented in Table 5:

TABLE 5

| Compound | Agency |
| --- | --- |
| Acenaphthene | EPA, ATSDR |
| Acenaphthylene | EPA, ATSDR |
| Anthracene | EPA, ATSDR |
| Benz[a]anthracene* | EPA, ATSDR, EFSA |
| Benzo[b]fluoranthene* | EPA, ATSDR, EFSA |
| Benzo[j]fluoranthene | ATSDR, EFSA |
| Benzo[k]fluoranthene* | EPA, ATSDR, EFSA |
| Benzo[c]fluorene | EFSA |
| Benzo[g,h,i]perylene* | EPA, ATSDR, EFSA |
| Benzo[a]pyrene* | EPA, ATSDR, EFSA |
| Benzo[e]pyrene | ATSDR |
| Chrysene* | EPA, ATSDR, EFSA |
| Coronene | ATDSR |
| Cyclopenta[c,d]pyrene | EFSA |
| Dibenz[a,h]anthracene* | EPA, ATSDR, EFSA |
| Dibenzo[a,e]pyrene | EFSA |
| Dibenzo[a,h]pyrene | EFSA |
| Dibenzo[a,i]pyrene | EFSA |
| Dibenzo[a,l]pyrene | EFSA |
| Fluoranthene | EPA, ATSDR |
| Fluorene | EPA, ATSDR |
| Indeno[1,2,3-c,d]pyrene* | EPA, ATSDR, EFSA |
| 5-Methylcrysene | EFSA |
| Naphthalene | EPA |
| Phenanthrene | EPA, ATSDR |
| Pyrene | EPA, ATSDR |

*Considered probable or possible human carcinogen

A spectral database exists for PAHs. Detection of PAHs in materials is done using gas chromatography-mass spectrometry, liquid chromatography with UV or fluorescence spectroscopic methods. Most PAHs are also fluorescent when excited.

Carbon Black is used in tires at approximately 30% per hundred weight (phr) of the rubber elastomer component. Tire carbon black provides heat stability and mechanical strength when uniformly distributed and dispersed into the free molecular space of the non-vulcanized tire rubber masterbatch. Carbon black is formed by harvesting the smoke-vapor of combustion of acetylene, fuel oil, and coal tar. The more toxic forms of PAHs will exist as a result of the combusted but more economical fuel oil and coal tar. Typically, as many as seven species of carbon black will be used in the construction of the black master batch.

Properly prepared tire black master batch compounds, when first composed and integrated into a cured (vulcanized) tire carcass, fully constrain any detectable migration of PAHs into the environment as the carbon black is dispersed down to clusters in chambers of 10-50 nm. Once the tire is placed into service, the scuffing of the tire as it wears down will begin to release the PAH-laden carbon black into the environment. Once a tire has reached an end-of-life (EOL) status, further PAH release is nominal.

An EOL tire which is subsequently processed into smaller particles, such as into a crumb form, will release carbon black and thereby PAHs. Substance flow analysis (SFA) of PAHs in road runoff, playing field and running surface applications reveal a broad range of environmental threats from PAHs. Coating the crumb rubber with a durable latex elastomer for application in playing field and running surface recycle substantially mitigates the PAH release, but is not suitable for applications wherein the crumb rubber is transformed (chemically or physically).

During the processing of a 30 mesh crumb rubber in the process of the embodiments, a significant leafing of the 600 micron crumb rubber moiety occurs, and with such leafing a partial loss of elastomer constraint of the confined carbon black occurs. Subsequent to completing the process, the disintegrated, non-vulcanized moiety is subjected to reaction with a chemical additive which sequesters any PAHs resident in the surface carbon black. A representative form of an effective chemical structure which has been successfully evaluated is a butadiene homopolymer (BHP) to which various functional groups may be attached, as in the following illustrations.

Structural Formula

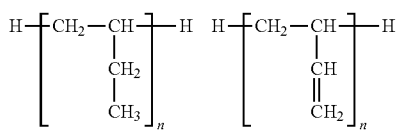

Structural Formula

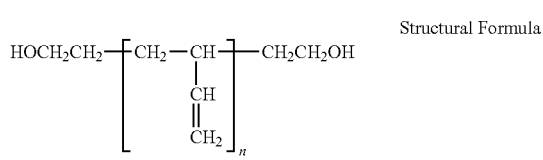

Structural Formula

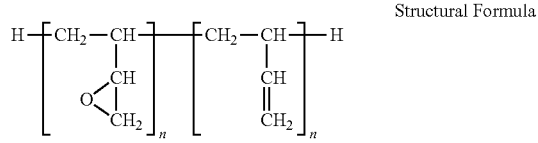

Structural Formula

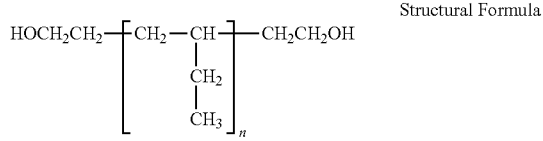

Viscosity Epoxidized Polybutadiene I

Structural Formula

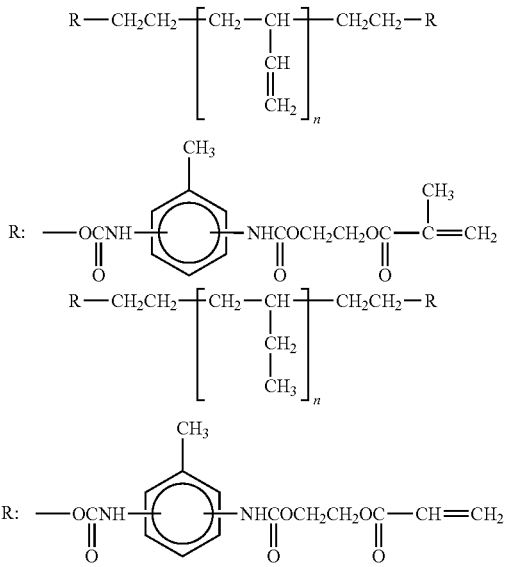

Urethane Acrylic Polybutadiene—Improved UV Resistance I

Structural Formula

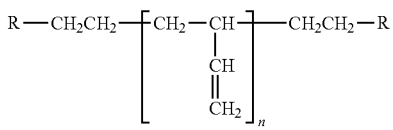

Butyl acetate

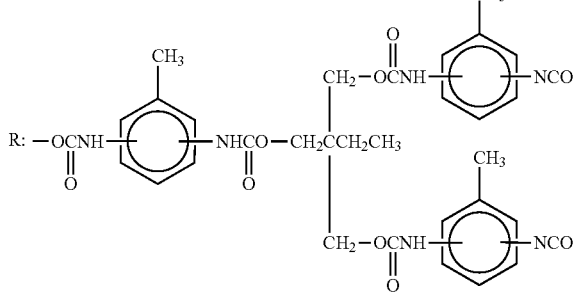

The choice of functional group can depend upon the final use of the processed tire rubber. For example, a hydroxyl or butyl acetate functional group works well if the final use is an engineered rubber product or vehicle tire. Epoxide or urethane functionality will work well where the final use is a paint or adhesive. However, any suitable functional group known to be capable of reacting with a PAH (so as to bind or otherwise sequester it) can be employed.

Backbone chemistries analogous to butadiene homopolymer can also be employed (e.g., mercapto and/or vinyl functionality), as can functionalized polymers such as natural rubber (NR) or styrene butadiene rubber, isobutylene-isoprene rubber, styrene-1,4-cis polybutadiene polymer, trans-1,4-polyisoprene, cis-1,4-polyisoprene, natural polyisoprene, synthetic polyisoprene, chloroprene rubber, halogenated butyl rubber, nonhalogenated butyl rubber, silicone rubber, hydrogenated nitrile rubber, nonhydrogenated nitrile rubber, 1,2-high vinyl butadiene, or other polymeric components, e.g., elastomers, incorporating a moiety capable of forming a bond with a PAH, thereby sequestering it in the polymeric matrix.

Generally, sufficient AP is employed to neutralize/sequester any unbound PAH present. Determining the stoichiometric balance (or amount to achieve an excess) to neutralize the unbound PAH content may be empirically determined using a streamlined fluorescence test prior to large batch preparation.

A free radical initiated reaction with the PAH structure(s) so exposed can compete with the formation of a non-reactive organic compound, whereby the toxic identity of the PAH is terminated. A side by side test of a coal tar sample before (Table 6) and after (Table 7) treatment using an epoxide compound (analogous to the viscosity epoxidized butadiene I AP depicted schematically above, the epoxide being available from Mitsubishi Corp. as a functional group attached to a butadiene homopolymer) is provided below. The test was EPA's method 8270D entitled "Semivolatile Organic Compounds by Gas Chromatography/Mass Spectrometry (GC/MS)". As the data show, reaction with the epoxide compound results in a product with PAH levels reduced below the detection limit of the method. These results would also comply with the European Commission issued Regulation No. 1272.

TABLE 6

| Analyte | Result | RL | SPK Value | Ref. Val. | % REC | Low Limit | High Limit |
|---|---|---|---|---|---|---|---|
| Acenaphthene | 0.775 | 0.0500 | 1.00 | 0 | 77.5 | 46 | 125 |
| Acenaphthylene | 0.783 | 0.0500 | 1.00 | 0 | 78.3 | 44 | 125 |
| Anthracene | 0.853 | 0.0500 | 1.00 | 0 | 85.3 | 53 | 125 |
| Benzo[a]anthracene | 0.743 | 0.0500 | 1.00 | 0 | 74.3 | 52 | 125 |
| Benzo[a]pyrene | 0.797 | 0.0500 | 1.00 | 0 | 79.7 | 50 | 125 |
| Benzo[b]fluoranthene | 0.793 | 0.0500 | 1.00 | 0 | 79.3 | 45 | 125 |
| Benzo[g,h,i]perylene | 0.757 | 0.0500 | 1.00 | 0 | 75.7 | 38 | 125 |
| Benzo[k]fluoranthene | 0.837 | 0.0500 | 1.00 | 0 | 83.7 | 45 | 125 |
| Chrysene | 0.820 | 0.0500 | 1.00 | 0 | 82.0 | 53 | 125 |
| Dibenz[a,h]anthracene | 0.818 | 0.0500 | 1.00 | 0 | 81.8 | 41 | 125 |
| Fluoranthene | 0.807 | 0.0500 | 1.00 | 0 | 80.7 | 54 | 125 |
| Fluorene | 0.801 | 0.0500 | 1.00 | 0 | 80.1 | 49 | 125 |
| Indeno[1,2,3-cd]pyrene | 0.755 | 0.0500 | 1.00 | 0 | 75.5 | 38 | 125 |
| Naphthalene | 0.793 | 0.0500 | 1.00 | 0 | 79.3 | 40 | 125 |
| Phenanthrene | 0.744 | 0.0500 | 1.00 | 0 | 74.4 | 50 | 125 |
| Pyrene | 0.841 | 0.0500 | 1.00 | 0 | 84.1 | 46 | 125 |
| Surr: 2-Fluorbiphenyl | 3.67 | | 4.0 | | 91.6 | 43 | 125 |
| Surr: 4-Terphenyl-d14 | 4.11 | | 4.0 | | 103 | 32 | 125 |

TABLE 7

| Analyte | Result | RL | SPK Value | Ref. Val. | % REC | Low Limit | High Limit |
|---|---|---|---|---|---|---|---|
| Acenaphthene | ND | 0.0500 | — | — | — | — | — |
| Acenaphthylene | ND | 0.0500 | — | — | — | — | — |
| Anthracene | ND | 0.0500 | — | — | — | — | — |
| Benzo[a]anthracene | ND | 0.0500 | — | — | — | — | — |
| Benzo[a]pyrene | ND | 0.0500 | — | — | — | — | — |
| Benzo[b]fluoranthene | ND | 0.0500 | — | — | — | — | — |
| Benzo[g,h,i]perylene | ND | 0.0500 | — | — | — | — | — |
| Benzo[k]fluoranthene | ND | 0.0500 | — | — | — | — | — |
| Chrysene | ND | 0.0500 | — | — | — | — | — |
| Dibenz[a,h]anthracene | ND | 0.0500 | — | — | — | — | — |
| Fluoranthene | ND | 0.0500 | — | — | — | — | — |
| Fluorene | ND | 0.0500 | — | — | — | — | — |
| Indeno[1,2,3-cd]pyrene | ND | 0.0500 | — | — | — | — | — |
| Naphthalene | ND | 0.0500 | — | — | — | — | — |
| Phenanthrene | ND | 0.0500 | — | — | — | — | — |
| Pyrene | ND | 0.0500 | — | — | — | — | — |

ND - not detected at the method detection limit

Exemplary Methods, Apparatus and Compositions

Method 1: A method for preparing a modified rubber, comprising: introducing an aqueous slurry comprising vulcanized rubber particles and an organometallic compound into an electromechanical reactor configured to generate a phase space environment with cavitation, so as to induce delamination of a rubber matrix within the vulcanized rubber particles as coordinated with disrupting sulfidic linkages.

Method 2: The method of Method 1, further comprising reestablishing dislocated sulfidic linkages to establish within the matrix sulfur bridge cross linked, re-aligned, laminates.

Method 3: The method of Method 1, wherein delamination is associated with a portion of rigid sulfidic bridges of the vulcanized rubber particles becoming unbound at an original methyl carbocation while remaining tethered at an original allylic carbocation.

Method 4: The method of Method 1, wherein the organometallic compound comprises a metal having octahedral molecular geometry.

Method 5: The method of Method 1, wherein the organometallic compound comprises a metal ion selected from the group consisting of $Co^{2+}$, $Cu^{2+}$, $Ni^{2+}$, $Zn^{2+}$, and $Mn^{2+}$.

Method 6: The method of Method 1, wherein the organometallic compound comprises an organic anion as a ligand to the metal ion.

Method 7: The method of Method 6, wherein the organic anion comprises acetate ion.

Method 8: The method of Method 1, wherein the organometallic compound is copper acetate.

Method 9: The method of Method 1, wherein the organometallic compound is a metal salt that undergoes a phase change from solid to liquid in a range of 115-150° C.

Method 10: The method of Method 1, wherein a temperature in the electromechanical reactor is maintained at ambient by use of a cooling jacket or cooling coils.

Method 11: The method of Method 1, wherein the vulcanized rubber crumbs have a particle size greater than 200 mesh.

Reactor 12: An electromechanical reactor comprising: a rotor having a plurality of slots; and a stator, wherein the electromechanical reactor is configured to create a phase space environment by generating a mixture of entrained air, an organometallic compound, and ground tire rubber particles in a liquid subject to cavitation.

Matrix 13: A rubber-based heterogeneous matrix comprising an interpenetrating network of two or more elastomers, the network comprising sulfur bridge cross linked, re-aligned, intermingled laminates having an average spacing of from 10 nm to 5 microns, wherein each laminate comprises one of the two or more elastomers.

Matrix 14: The matrix of Matrix 13, further comprising carbon black particles dispersed amongst the laminates.

Matrix 15: The matrix of Matrix 13, wherein the two or more elastomers comprise virgin natural rubber and an elastomer derived from ground tire rubber.

Matrix 16: The matrix of Matrix 13, wherein the two or more elastomers comprise virgin styrene butadiene/butadiene rubber and an elastomer derived from ground tire rubber.

Matrix 17: The matrix of Matrix 13, wherein two of the two or more elastomers have different backbone chemistries.

Matrix 18: The matrix of Matrix 13, wherein the two of the two or more elastomers having the different backbone chemistries are woven together and then cross linked separate from one another.

Sheet 19: A sheet of the rubber-based heterogeneous matrix of Matrix 13.

Sheet 20: The sheet of Sheet 19, exhibiting an anisotropy in length tensile strength to width tensile strength, wherein the anisotropy in length tensile strength to width tensile strength is from 1.1:1 to 3:1.

Laminate 21: A laminate comprising a plurality of the sheets of Sheet 19.

Laminate 22: The laminate of Laminate 21, wherein each of the sheets has a thickness in a range of 10 to 70 microns.

Laminate 23: The laminate of Laminate 21, wherein each of the sheets is vacuum-heat fused and cross linked to an adjacent sheet.

Laminate 24: The laminate of Laminate 21, wherein each of the sheets is oriented 30 to 45 degrees to an anisotropic grain of an adjacent sheet.

Structure 25: A ground tire rubber composite structure having an unbound, reptated internal morphology, wherein a portion of the rigid sulfidic linkages therein are each tethered at an original allylic carbocation and unbound at an original methyl carbocation.

Vulcanized Rubber 26: A vulcanized rubber, wherein a portion of the rigid sulfidic linkages therein are each tethered at an original allylic carbocation and unbound at an original methyl carbocation, and wherein a portion of polymer backbones within the vulcanized rubber are substituted by an acetate moiety.

Interlinked Substituted Rubber 27: An interlinked substituted rubber substantially as described herein.

Article 28: A tire tread, tire sidewall, roofing membrane, high dielectric electrical tape, tank lining, reservoir lining, trench lining, bridge underlayment, wire harness wrap, self-bonding wire harness wrap, shoe soles, rubber boots, electrical tape, foundation waterproofing, parking garage waterproofing, hose, belt, or molding comprising an interlinked substituted rubber product as described herein.

Rubber Tire 29: A rubber tire, wherein from 3% by weight to 15% by weight of the rubber in the tire is prepared by a method substantially as described herein.

Rubber Tire 30: A rubber tire, wherein from 15% by weight to 100% by weight of the rubber in the tire is prepared by a method substantially as described herein.

Tire Tread 31: A tire tread comprising from 10% by weight to 50% by weight of an interlinked substituted rubber substantially as described herein.

Tire Sidewall 32: A tire sidewall comprising from 5% by weight to 100% by weight of an interlinked substituted rubber substantially as described herein.

Asphalt-Rubber Binder 33: An asphalt-rubber binder comprising from 5% by weight to 95% by weight of an interlinked substituted rubber substantially as described herein.

Asphalt Emulsion 34: An asphalt emulsion comprising from 5% by weight to 95% by weight of an interlinked substituted rubber substantially as described herein.

Asphalt Roofing Material 35: An asphalt roofing material comprising from 5% by weight to 95% by weight of an interlinked substituted rubber substantially as described herein.

Method 36: A method for preparing a polymeric matrix, comprising: combining vulcanized rubber particles, a complementary polymer, and an organometallic compound into a mixture, so as to induce delamination of a rubber matrix within the vulcanized rubber particles as coordinated with disrupting sulfidic linkages, and so as to induce cross-linking of the complementary polymer into the polymeric matrix, whereby the polymeric matrix encapsulates carbon black particles.

Method 37: The method of Method 36, wherein combining comprises applying pressure to the mixture.

Method 38: The method of Method 36, wherein combining comprises combining in a roller mill.

Method 39: The method of Method 36, wherein combining takes place in an absence of water as a carrier fluid.

Method 40: The method of Method 36, further comprising reestablishing dislocated sulfidic linkages to establish within the matrix sulfur bridge cross linked, re-aligned, laminates.

Method 41: The method of Method 36, wherein delamination is associated with a portion of rigid sulfidic bridges of the vulcanized rubber particles becoming unbound at an original methyl carbocation while remaining tethered at an original allylic carbocation.

Method 42: The method of Method 36, wherein the organometallic compound comprises a metal having octahedral molecular geometry.

Method 43: The method of Method 36, wherein the organometallic compound comprises a metal ion selected from the group consisting of $Co^{2+}$, $Cu^{2+}$, $Ni^{2+}$, $Zn^{2+}$, and $Mn^{2+}$.

Method 44: The method of Method 36, wherein the organometallic compound comprises an organic anion as a ligand to the metal ion, optionally wherein the organic anion comprises acetate ion.

Method 45: The method of Method 36, wherein the organometallic compound is copper acetate.

Method 46: The method of Method 36, wherein the organometallic compound is a metal salt that undergoes a phase change from solid to liquid in a range of 115-150° C.

Method 47: The method of Method 36, wherein a temperature in the electromechanical reactor is maintained at ambient by use of a cooling jacket or cooling coils.

Method 48: The method of Method 36, wherein the vulcanized rubber crumbs have a particle size greater than 200 mesh.

Polymeric Matrix 49: A polymeric matrix comprising a crosslinked network of end-of-life tire-derived rubber and at least one complementary polymer, wherein the polymeric matrix encapsulates carbon black and/or graphene particles.

Polymeric Matrix 50: The polymeric matrix of Polymeric Matrix 49, wherein the complementary polymer comprises virgin natural rubber.

Polymeric Matrix 51: The polymeric matrix of Polymeric Matrix 49, wherein the complementary polymer comprises styrene butadiene/butadiene rubber.

Polymeric Matrix 52: The polymeric matrix of Polymeric Matrix 49, wherein the end-of-life tire-derived rubber and the complementary polymer have different backbone chemistries.

Polymeric Matrix 53: The polymeric matrix of Polymeric Matrix 49, having an effective particle size of less than 5 microns.

Polymeric Matrix 54: The polymeric matrix of Polymeric Matrix 49, wherein the at least one complementary polymer comprises a hydroxyl-containing polymer.

Polymeric Matrix 55: The polymeric matrix of Polymeric Matrix 49, wherein the at least one complementary polymer comprises a vegetable oil.

Polymeric Matrix 56: The polymeric matrix of Polymeric Matrix 49, wherein the at least one complementary polymer comprises a soybean oil, a castor oil, a linseed oil, a sunflower oil, or a hydrogenated soy oil.

Polymeric Matrix 57: The polymeric matrix of Polymeric Matrix 49, wherein the at least one complementary polymer comprises a virgin styrene-butadiene-styrene or virgin butadiene rubber.

Article 58: A sheet of the polymeric matrix of Polymeric Matrix 49.

Article 59: The sheet of Article 58, exhibiting an anisotropy in length tensile strength to width tensile strength, wherein the anisotropy in length tensile strength to width tensile strength is at least 1.1:1, optionally from 1.1:1 to 3:1.

Article 60: A laminate comprising a plurality of the sheets of Article 58.

Article 61: The laminate of Article 60, wherein each of the sheets has a thickness of from 10 to 70 microns.

Article 62: The laminate of Article 60, wherein each of the sheets is vacuum-heat fused and cross linked to an adjacent sheet.

Article 63: The laminate of Article 60, wherein each of the sheets is oriented 30 to 45 degrees to an anisotropic grain of an adjacent sheet.

Article 64: A tire tread, tire sidewall, roofing membrane, high dielectric electrical tape, tank lining, reservoir lining, trench lining, bridge underlayment, wire harness wrap, self-bonding wire harness wrap, shoe soles, rubber boots, electrical tape, foundation waterproofing, parking garage waterproofing, hose, belt, or molding comprising the polymeric matrix of Polymeric Matrix 49.

Article 65: A radiation shielding material comprising the polymeric matrix of Polymeric Matrix 49.

Article 66: A paving material comprising the polymeric matrix of Polymeric Matrix 49.

Article 67: A suspension of the polymeric matrix of Polymeric Matrix 49 in asphalt.

Article 68: A paving material comprising: a dense graded aggregate, wherein the aggregate has a crystalline structure; and a film of interfused asphalt molecules and nano-carbon clusters at energy transfer regions associated with impingement points of the dense graded aggregate, wherein the nano-carbon clusters are adapted to shield and/or stabilize the asphalt molecules from energy of polariton discharges generated at the energy transfer regions by rolling load on the paving material.

Article 69: A paving material of Article 68, wherein the film of interfused asphalt molecules and nano-carbon clusters at energy transfer regions associated with impingement points of the dense graded aggregate, wherein the nano-carbon clusters are derived from end-of-life tire crumb rubber, optionally where the film comprises Article 67.

Article 70: A black masterbatch comprising the polymeric matrix of Polymeric Matrix 49.

Polymeric Matrix 71: A polymeric matrix comprising a crosslinked network of end-of-life tire-derived rubber and at least one auxiliary polymer, wherein a reactive moiety of the auxiliary polymer is reacted with a polyaromatic hydrocarbon so as to form a chemical bond, whereby the polymeric matrix sequesters the polyaromatic hydrocarbon.

Polymeric Matrix 72: The polymeric matrix of Polymeric Matrix 71, wherein the auxiliary polymer is selected from the group consisting of a functionalized butadiene, a functionalized virgin natural rubber and, a functionalized styrene butadiene/butadiene rubber.

Polymeric Matrix 73: The polymeric matrix of Polymeric Matrix 71, wherein the end-of-life tire-derived rubber and the auxiliary polymer have different backbone chemistries.

Polymeric Matrix 74: The polymeric matrix of Polymeric Matrix 71, having an effective particle size of less than 5 microns.

Polymeric Matrix 75: The polymeric matrix of Polymeric Matrix 71, wherein the at least one auxiliary polymer comprises an epoxide group as the moiety.

Polymeric Matrix 76: The polymeric matrix of Polymeric Matrix 71, in a form of a sheet.

Polymeric Matrix 77: The polymeric matrix of Polymeric Matrix 71, exhibiting an anisotropy in length tensile strength to width tensile strength, wherein the anisotropy in length tensile strength to width tensile strength is at least 1.1:1.

Polymeric Matrix 78: The polymeric matrix of Polymeric Matrix 71, in a form of laminated sheets, wherein each of the sheets has a thickness of from 10 to 70 microns, and wherein each of the sheets is oriented 30 to 45 degrees to an anisotropic grain of an adjacent sheet.

Polymeric Matrix 79: The polymeric matrix of Polymeric Matrix 71, in a form of an article selected from the group consisting of tire tread, tire sidewall, roofing membrane, high dielectric electrical tape, tank lining, reservoir lining, trench lining, bridge underlayment, wire harness wrap, self-bonding wire harness wrap, shoe soles, rubber boots, electrical tape, foundation waterproofing, parking garage waterproofing, hose, belt, and molding.

Polymeric Matrix 80: The polymeric matrix of Polymeric Matrix 71, in a form of a radiation shielding material.

Article 81: A paving material comprising the polymeric matrix of Polymeric Matrix 71.

Article 82: A suspension of the polymeric matrix of Polymeric Matrix 71 in asphalt.

Method 83: A method for preparing a polymeric matrix, comprising: combining vulcanized rubber particles, an auxiliary polymer comprising a reactive moiety, and an organometallic compound into a mixture, so as to induce delamination of a rubber matrix within the vulcanized rubber particles as coordinated with disrupting sulfidic linkages, so as to induce crosslinking of the auxiliary polymer into the polymeric matrix, and so as to induce a chemical reaction between the reactive moiety and a polyaromatic hydrocarbon, whereby the polymeric matrix sequesters the polyaromatic hydrocarbon.

Method 84: Method 83, wherein the organometallic compound is copper acetate.

Method 85: Method 83, wherein the auxiliary polymer is a polybutadiene and wherein the reactive moiety is an epoxide group.

Method 86: Method 83, wherein the reactive moiety is selected from the group consisting of an epoxide group and a urethane group.

Method 87: Method 83, wherein the reactive moiety is an acetate group.

Method 88: Method 83, wherein the auxiliary polymer is an elastomer.

Method 89: Method 83, wherein the elastomer is selected from the group consisting of butadiene, natural rubber, styrene butadiene rubber, isobutylene-isoprene rubber, styrene-1,4-cis polybutadiene polymer, trans-1,4-polyisoprene, cis-1,4-polyisoprene, natural polyisoprene, synthetic polyisoprene, chloroprene rubber, halogenated butyl rubber, nonhalogenated butyl rubber, silicone rubber, hydrogenated nitrile rubber, nonhydrogenated nitrile rubber, and 1,2-high vinyl butadiene.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

All references cited herein are incorporated herein by reference in their entirety. To the extent publications and patents or patent applications incorporated by reference contradict the disclosure contained in the specification, the specification is intended to supersede and/or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. A method for preparing a polymeric matrix, comprising:
    combining into a damp, non-agglomerating mixture vulcanized rubber particles, a waterborne auxiliary polymer comprising a reactive moiety, and an aqueous mixture of copper acetate, wherein 10-30 wt. % of the aqueous mixture is copper acetate, wherein 1 part by weight of the waterborne auxiliary polymer is present for every 0.01 to 100 parts by weight of the aqueous mixture, and wherein 20 parts by weight of the aqueous mixture and waterborne auxiliary polymer combined are present for every 1 to 160 parts by weight of the vulcanized rubber particles; and
    applying compression and shearing action to the damp, non-agglomerating mixture, whereby a monolithic rubber macrostructure is obtained.

2. The method of claim 1, wherein the auxiliary polymer is a polybutadiene and wherein the reactive moiety is an epoxide group.

3. The method of claim 1, wherein the reactive moiety is selected from the group consisting of an epoxide group and a urethane group.

4. The method of claim 1, wherein the reactive moiety is an acetate group.

5. The method of claim 1, wherein the auxiliary polymer is an elastomer.

6. The method of claim 5, wherein the elastomer is selected from the group consisting of butadiene, natural rubber, styrene butadiene rubber, isobutylene-isoprene rubber, styrene-1,4-cis polybutadiene polymer, trans-1,4-polyisoprene, cis-1,4-polyisoprene, natural polyisoprene, synthetic polyisoprene, chloroprene rubber, halogenated butyl rubber, nonhalogenated butyl rubber, silicone rubber, hydrogenated nitrile rubber, nonhydrogenated nitrile rubber, and 1,2-high vinyl butadiene.

7. The method of claim 1, wherein 15-20 wt. % of the aqueous mixture is copper acetate.

8. The method of claim 1, wherein 1 part by weight of the waterborne auxiliary polymer is present for every 0.01 parts by weight of the aqueous mixture.

9. The method of claim 1, wherein 20 parts by weight of the aqueous mixture and waterborne auxiliary polymer combined are present for every 80 parts by weight of the vulcanized rubber particles.

10. The method of claim 1, wherein the aqueous mixture and waterborne auxiliary polymer combined has a solids residue range of 27-75 wt. %.

11. The method of claim 1, wherein the monolithic rubber macrostructure has an effective particle size of less than 5 microns.

12. The method of claim 1, further comprising fabricating the monolithic rubber macrostructure into a form of a sheet.

13. The method of claim 12, wherein the sheet exhibits an anisotropy in length tensile strength to width tensile strength, wherein the anisotropy in length tensile strength to width tensile strength is at least 1.1:1.

14. The method of claim 13, further comprising fabricating a plurality of sheets from the monolithic rubber macrostructure and laminating the sheets together, wherein each of the sheets has a thickness of from 10 to 70 microns, and wherein each of the sheets is oriented 30 to 45 degrees to an anisotropic grain of an adjacent sheet.

15. The method of claim 1, further comprising fabricating the monolithic rubber macrostructure into an article selected from the group consisting of tire tread, tire sidewall, roofing membrane, high dielectric electrical tape, tank lining, reservoir lining, trench lining, bridge underlayment, wire harness wrap, self-bonding wire harness wrap, shoe soles, rubber boots, electrical tape, foundation waterproofing, parking garage waterproofing, hose, belt, and molding.

16. The method of claim 1, further comprising fabricating the monolithic rubber macrostructure into a radiation shielding material.

17. The method of claim 1, further comprising fabricating the monolithic rubber macrostructure into a paving material.

18. The method of claim 1, further comprising fabricating the monolithic rubber macrostructure into a suspension in asphalt.

* * * * *